(12) United States Patent
Haseba et al.

(10) Patent No.: US 7,879,413 B2
(45) Date of Patent: Feb. 1, 2011

(54) OPTICALLY ISOTROPIC LIQUID CRYSTAL MEDIUM AND OPTICAL DEVICE

(75) Inventors: Yasuhiro Haseba, Chiba (JP); Takafumi Kuninobu, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 224 days.

(21) Appl. No.: 12/195,125

(22) Filed: Aug. 20, 2008

(65) Prior Publication Data

US 2009/0059157 A1 Mar. 5, 2009

(30) Foreign Application Priority Data

Aug. 29, 2007 (JP) ............................. 2007-222349
Jun. 27, 2008 (JP) ............................. 2008-168289

(51) Int. Cl.
C09K 19/30 (2006.01)
C09K 19/34 (2006.01)
C09K 19/32 (2006.01)
C09K 19/20 (2006.01)
C09K 19/12 (2006.01)

(52) U.S. Cl. ............... 428/1.1; 252/299.61; 252/299.62; 252/299.63; 252/299.66; 252/299.67

(58) Field of Classification Search .................. 428/1.1; 252/299.61, 299.62, 299.63, 299.66, 299.67
See application file for complete search history.

(56) References Cited

U.S. PATENT DOCUMENTS

| 5,728,319 A * | 3/1998 | Matsui et al. ........... 252/299.63 |
| 5,858,270 A * | 1/1999 | Matsui et al. ........... 252/299.01 |
| 7,419,706 B2 * | 9/2008 | Heckmeier et al. ........... 428/1.1 |
| 7,531,106 B2 * | 5/2009 | Kirsch et al. ........... 252/299.01 |
| 7,722,783 B2 * | 5/2010 | Haseba et al. ........... 252/299.01 |
| 2006/0006363 A1 | 1/2006 | Heckmeier et al. |
| 2006/0050354 A1 | 3/2006 | Heckmeier et al. |
| 2009/0237610 A1* | 9/2009 | Saito et al. .................. 349/182 |
| 2010/0127211 A1* | 5/2010 | Tanaka .................. 252/299.61 |

FOREIGN PATENT DOCUMENTS

| EP | 1690917 | 8/2006 |
| JP | 2000-327632 | 11/2000 |
| JP | 2003-327966 | 11/2003 |
| JP | 2004-059772 | 2/2004 |
| JP | 2004-182949 | 7/2004 |
| JP | 2005-157109 | 6/2005 |
| JP | 2005-336477 | 12/2005 |
| JP | 2006-089622 | 4/2006 |
| JP | 2006-127707 | 5/2006 |
| JP | 2006-299084 | 11/2006 |
| WO | 2005-080529 | 9/2005 |
| WO | 2005-090520 | 9/2005 |
| WO | 2006-063662 | 6/2006 |

OTHER PUBLICATIONS

Article Titled "Polymer-Stabilized Liquid Crystal Blue Phases" jointly authored by Kikuchi et al., in Nature Materials, vol. 1, 2002. (pp. 64).
Article Titled "Large Electro-Optic Kerr Effect in Polymer-Stabilized Liquid-Crystalline Blue Phases" jointly authored by Hisakado et al., in Advanced Materials, vol. 17, 2005. (pp. 96).
Article Titled "Electro-Optic Effects of the Optically Isotropic State Induce by the Incorporative Effects of a Polymer Network and the Chirality of Liquid Crystal" jointly authored by Haseba et al., in Journal of the SID, vol. 14/6, 200. (pp. 551).

* cited by examiner

*Primary Examiner*—Shean C Wu
(74) *Attorney, Agent, or Firm*—J.C. Patents

(57) ABSTRACT

A liquid crystal medium is described, which has stability to heat, light and so on, a wide temperature range of liquid crystal phase, a large optical anisotropy and a large dielectric anisotropy, and exhibits an optically isotropic liquid crystal phase. The liquid crystal medium includes a liquid crystal compound represented by formula (1) and a chiral reagent and exhibits an optically isotropic liquid crystal phase.

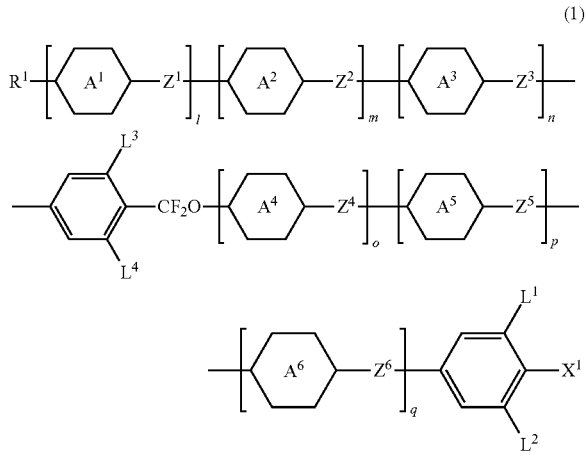

(1)

For example, $R^1$ is $C_1$-$C_{20}$ alkyl; the rings $A^1$-$A^6$ are each 1,4-cyclohexylene, 1,3-dioxan-2,5-diyl, 1,4-phenylene, or 1,4-phenylene with arbitrary hydrogen atom being replaced by a halogen atom; $Z^1$-$Z^6$ are each a single bond; $L^1$-$L^4$ are each a hydrogen atom or a halogen atom; $X^1$ is a hydrogen atom or a halogen atom; each of l, m, n, o, p and q is 0 or 1, and the sum of them is 3.

35 Claims, 1 Drawing Sheet

OPTICALLY ISOTROPIC LIQUID CRYSTAL MEDIUM AND OPTICAL DEVICE

CROSS-REFERENCE TO RELATED APPLICATION

This application claims the priority benefits of Japanese patent application Ser. No. 2007-222349, filed on Aug. 29, 2007, and also 2008-168289, filed on Jun. 27, 2008. The entirety of each of the above-mentioned patent applications is hereby incorporated by reference herein and made a part of specification.

BACKGROUND OF THE INVENTION

1. Field of the Invention

The invention relates to a liquid crystal medium useful as a material for an optical device, particularly a liquid crystal medium having a wide temperature range of liquid crystal phase, a large dielectric anisotropy and a large optical anisotropy. The invention also relates to an optical device that utilizes the liquid crystal medium, particularly an optical device that can be used in a wide temperature range and driven at a low voltage and is capable of obtaining a rapid electrooptical response.

2. Description of Related Art

Liquid crystal display (LCD) devices using liquid crystal compositions are widely used for display of clocks, calculators, word processors and so on. These LCD devices utilize the optical anisotropy and dielectric anisotropy of liquid crystal compounds. The operation modes of LCD devices mainly include phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and so on, which use one or more polarizers for display purposes. Also, many studies have recently been done to the mode wherein an electric field is applied to an optically isotropic liquid crystal phase to induce electric birefringence (Patent Documents 1-9, Non-patent Documents 1-3).

Moreover, wavelength tuneable filters, wavefront control devices, liquid crystal lenses, aberrational correction devices, aperture control devices, optical head devices and so on that utilize the electric birefringence of a blue phase as one of the optically isotropic liquid crystal phases have been proposed (Patent Documents 10-12). According to the driving mode, LCD devices can be classified into passive matrix (PM) and active matrix (AM) types. The PM type is further classified into static type, multiplex type and so on, and the AM type is classified into thin film transistor (TFT) type and metal insulator metal (MIM) type, etc.

Each of these LCD devices contains a liquid crystal composition with suitable properties. To improve the characteristics of an LCD device, it is preferred that the liquid crystal composition has suitable properties. General properties necessary for a liquid crystal compound as a component of a liquid crystal composition include: 1) chemical and physical stability, 2) a high clearing point (liquid crystal phase-isotropic phase transition temperature), 3) a low lower-limit temperature of liquid crystal phase (nematic phase, cholesteric phase, smectic phase, and optically isotropic liquid crystal phases like blue phase, etc.), 4) good compatibility with other liquid crystal compounds, 5) a suitable dielectric anisotropy, and 6) a suitable optical anisotropy. Particularly, for an optically isotropic liquid crystal phase, a liquid crystal compound large in the dielectric anisotropy and optical anisotropy is preferred from the viewpoint of lowering the driving voltage.

When a liquid crystal composition including a liquid crystal compound with chemical and physical stability ($1^{st}$ property) is used in an LCD device, the voltage holding ratio can be improved. In addition, a liquid crystal composition including a liquid crystal compound having a high clearing point or a low lower-limit temperature of liquid crystal phase ($2^{nd}$ and $3^{rd}$ properties) can have a wide temperature range of nematic phase or optically isotropic liquid crystal phase, and therefore can be used in display devices in a wide temperature range. To develop better properties that are difficult to develop by a single compound, a liquid crystal compound is usually mixed with a number of other liquid crystal compounds to prepare a liquid crystal composition for use. Therefore, a liquid crystal compound used in an LCD device preferably has good compatibility with other liquid crystal compounds ($4^{th}$ property). Recently, LCD devices with superior properties, especially display performances like contrast, display capacity, response time and so on, are required. In addition, regarding the liquid crystal material used, a liquid crystal composition with a low driving voltage is required. Also, in order to drive at a low voltage an optical device that is driven in an optically isotropic liquid crystal phase, a liquid crystal compound large in the dielectric anisotropy and the optical anisotropy is preferred.

As the optically isotropic polymer/liquid crystal composites disclosed in Patent Documents 1-3 and Non-patent Documents 1-3 are used, the voltage required to operate the device is high. Patent Documents 4-9 disclose optically isotropic liquid crystal compositions and polymer/liquid crystal composites that are expected to have an operating voltage lower than that of the above material, but an optically isotropic liquid crystal composition or a polymer/liquid crystal composite containing a 5-ring compound of this application is not mentioned therein.

[Patent Document 1] Japanese Patent Publication No. 2003-327966
[Patent Document 2] International Publication Pamphlet No. 2005/90520
[Patent Document 3] Japanese Patent Publication No. 2005-336477
[Patent Document 4] Japanese Patent Publication No. 2006-89622
[Patent Document 5] Japanese Patent Publication No. 2006-299084
[Patent Document 6] Japanese Patent Publication No. 2006-506477
[Patent Document 7] Japanese Patent Publication No. 2006-506515
[Patent Document 8] International Publication Pamphlet No. 2006/063662
[Patent Document 9] Japanese Patent Publication No. 2006-225655
[Patent Document 10] Japanese Patent Publication No. 2005-157109
[Patent Document 11] International Publication Pamphlet No. 2005/80529
[Patent Document 12] Japanese Patent Publication No. 2006-127707
[Non-patent Document 1] *Nature Materials*, 1, 64, (2002)
[Non-patent Document 2] *Adv. Mater.*, 17, 96, (2005)
[Non-patent Document 3] *Journal of the SID*, 14, 551, (2006)

SUMMARY OF THE INVENTION

Accordingly, an object of the invention is to provide a liquid crystal medium having stability to heat, light and so on, a wide temperature range of liquid crystal phase, a large optical anisotropy, a large dielectric anisotropy and an optically isotropic liquid crystal phase. Another object is to provide a variety of optical devices including the liquid crystal medium, which can be used in a wide temperature range and have a short response time, a large contrast and a low driving voltage.

The invention also provides a liquid crystal medium (liquid crystal composition or polymer/liquid crystal composite) and an optical device containing the liquid crystal medium, which are described in the following items.

The 1st item is a liquid crystal composition including a compound represented by formula (1) and a chiral dopant and exhibiting an optically isotropic liquid crystal phase.

—N=C=S, —$SF_5$, or $C_1$-$C_{10}$ alkyl wherein arbitrary —$CH_2$— may be replaced by —O—, —S— or —CH=CH— and arbitrary hydrogen atom may be replaced by a halogen atom. In addition, l, m, n, o, p and q are each independently 0 or 1, and l+m+n+o+p+q=3.

The $2^{nd}$ item is a liquid crystal composition of the $1^{st}$ item wherein $R^1$ is $C_1$-$C_{20}$ alkyl, $C_2$-$C_{21}$, alkenyl, $C_1$-$C_{19}$ alkoxy, $C_2$-$C_{20}$ alkenyloxy, $C_1$-$C_{19}$ alkylthio or $C_1$-$C_{19}$ alkenylthio, and $X^1$ is a hydrogen atom, a halogen atom, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F,

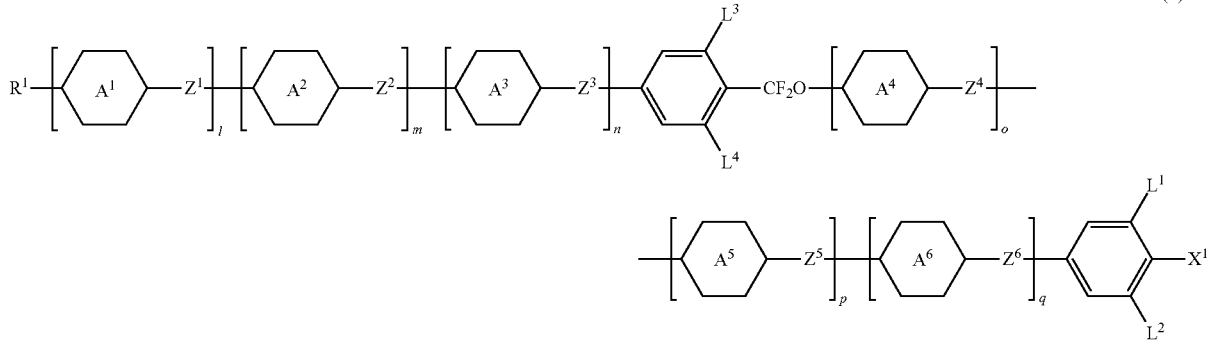

In formula (1), $R^1$ is $C_1$-$C_{20}$ alkyl wherein arbitrary —$CH_2$— may be replaced by —O—, —S— or —CH=CH—. The ring $A^1$ is 1,4-cyclohexylene, 1,3-dioxan-2,5-diyl, 1,4-phenylene, or 1,4-phenylene with arbitrary hydrogen atom being replaced by a halogen atom. The rings $A^2$, $A^3$, $A^4$, $A^5$ and $A^6$ are each independently 1,4-phenylene, or 1,4-phenylene with arbitrary hydrogen atom being replaced by a halogen atom. $Z^1$, $Z^2$, $Z^3$, $Z^4$, $Z^5$ and $Z^6$ are each independently a single bond, —$CH_2CH_2$—, —CH=CH—, —C≡C—, —COO—, —OCO—, —$CF_2O$—, —$OCF_2$—, —$CH_2O$—, —$OCH_2$—, —CF=CF—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH=CH—$(CH_2)_2$— or —$(CH_2)_2$—CH=CH—. $L^1$, $L^2$, $L^3$ and $L^4$ are each independently a hydrogen atom or a halogen atom. $X^1$ is a hydrogen atom, a halogen atom, —C≡N, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ or —CH=$CHCF_2CF_3$.

The 3rd item is a liquid crystal composition of the $1^{st}$ or $2^{nd}$ item wherein $Z^1$, $Z^2$, $Z^3$, $Z^4$, $Z^5$ and $Z^6$ are each independently a single bond, —$CH_2CH_2$—, —CH=CH—, —C≡C—, —COO—, —$CF_2O$—, —$CH_2O$— or —$OCH_2$—.

The $4^{th}$ item is a liquid crystal composition of the $1^{st}$ item that includes at least one compound selected from the group consisting of the compounds respectively represented by formulae (1-1)-(1-4).

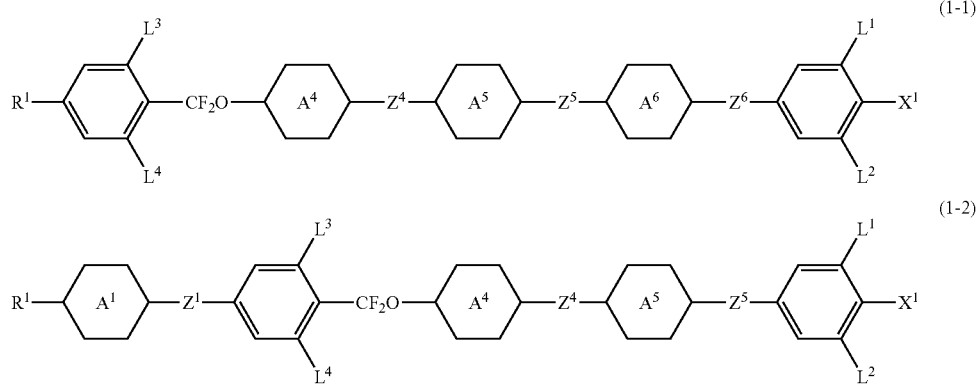

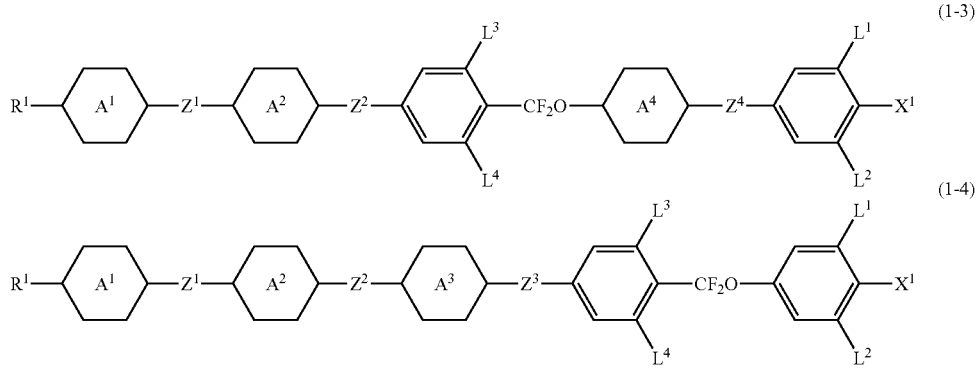

(1-3)

(1-4)

In these formulae, $R^1$ is $C_1$-$C_{15}$ alkyl, $C_2$-$C_{15}$ alkenyl, $C_1$-$C_{15}$ alkoxy or $C_2$-$C_{15}$ alkenyloxy. The ring $A^1$ is 1,4-cyclohexylene, 1,3-dioxan-2,5-diyl, 1,4-phenylene, or 1,4-phenylene with arbitrary hydrogen atom being replaced by a halogen atom. The rings $A^2, A^3, A^4, A^5$ and $A^6$ are each independently 1,4-phenylene, or 1,4-phenylene with arbitrary hydrogen atom being replaced by a halogen atom. $Z^1, Z^2, Z^3, Z^4, Z^5$ and $Z^6$ are each independently a single bond, —$CH_2CH_2$—, —CH═CH—, —C≡C—, —COO—, —$CF_2O$—, —$CH_2O$— or —$OCH_2$—. $L^1, L^2, L^3$ and $L^4$ are each independently a hydrogen atom or a fluorine atom. $X^1$ is a fluorine atom, a chlorine atom, —C≡N, —$CF_3$, —$CHF_2$, —$CH_2F$, —$OCF_3$, —$OCHF_2$ or —$OCH_2F$.

The 5$^{th}$ item is a liquid crystal composition of the 1$^{st}$ item that includes at least one compound selected from the group consisting of the compounds respectively represented by formulae (1-5)-(1-8).

In these formulae, $R^1$ is $C_1$-$C_{15}$ alkyl or $C_2$-$C_{15}$ alkenyl. The ring $A^1$ is 1,4-cyclohexylene, 1,3-dioxan-2,5-diyl, 1,4-phenylene, or 1,4-phenylene with arbitrary hydrogen atom being replaced by a halogen atom. The rings $A^2, A^3, A^4, A^5$ and $A^6$ are each independently 1,4-phenylene, or 1,4-phenylene with arbitrary hydrogen atom being replaced by a halogen atom. $L^1, L^2, L^3$ and $L^4$ are each independently a hydrogen atom or a fluorine atom. $X^1$ is a fluorine atom, a chlorine atom, —C≡N, —$CF_3$, —$CHF_2$, —$CH_2F$, —$OCF_3$, —$OCHF_2$, or —$OCH_2F$.

The 6$^{th}$ item is a liquid crystal composition of the 1$^{st}$ item that includes at least one compound selected from the group consisting of the compounds respectively represented by formulae (1-9)-(1-16).

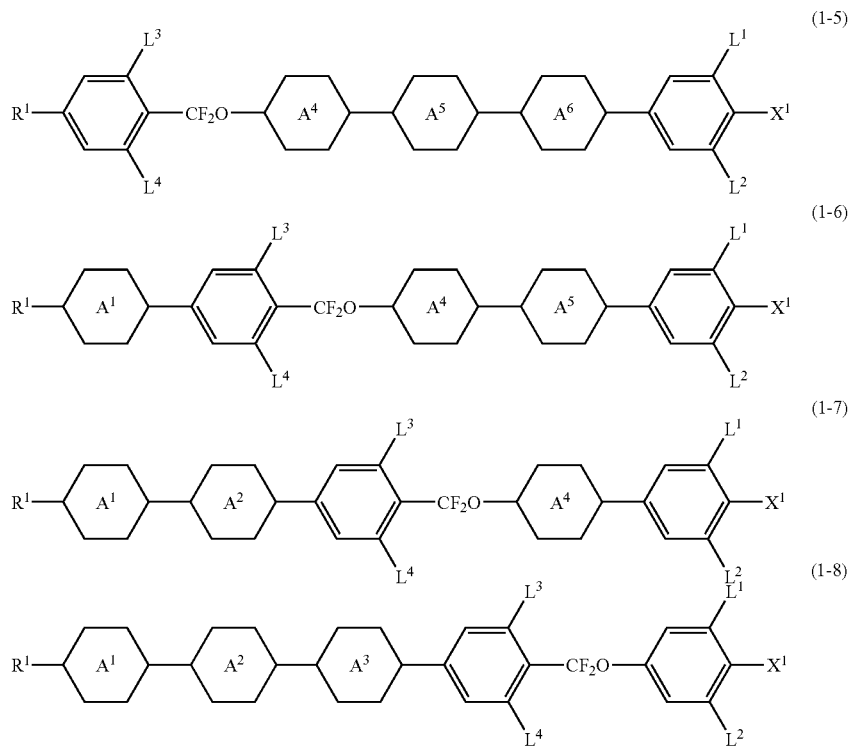

(1-5)

(1-6)

(1-7)

(1-8)

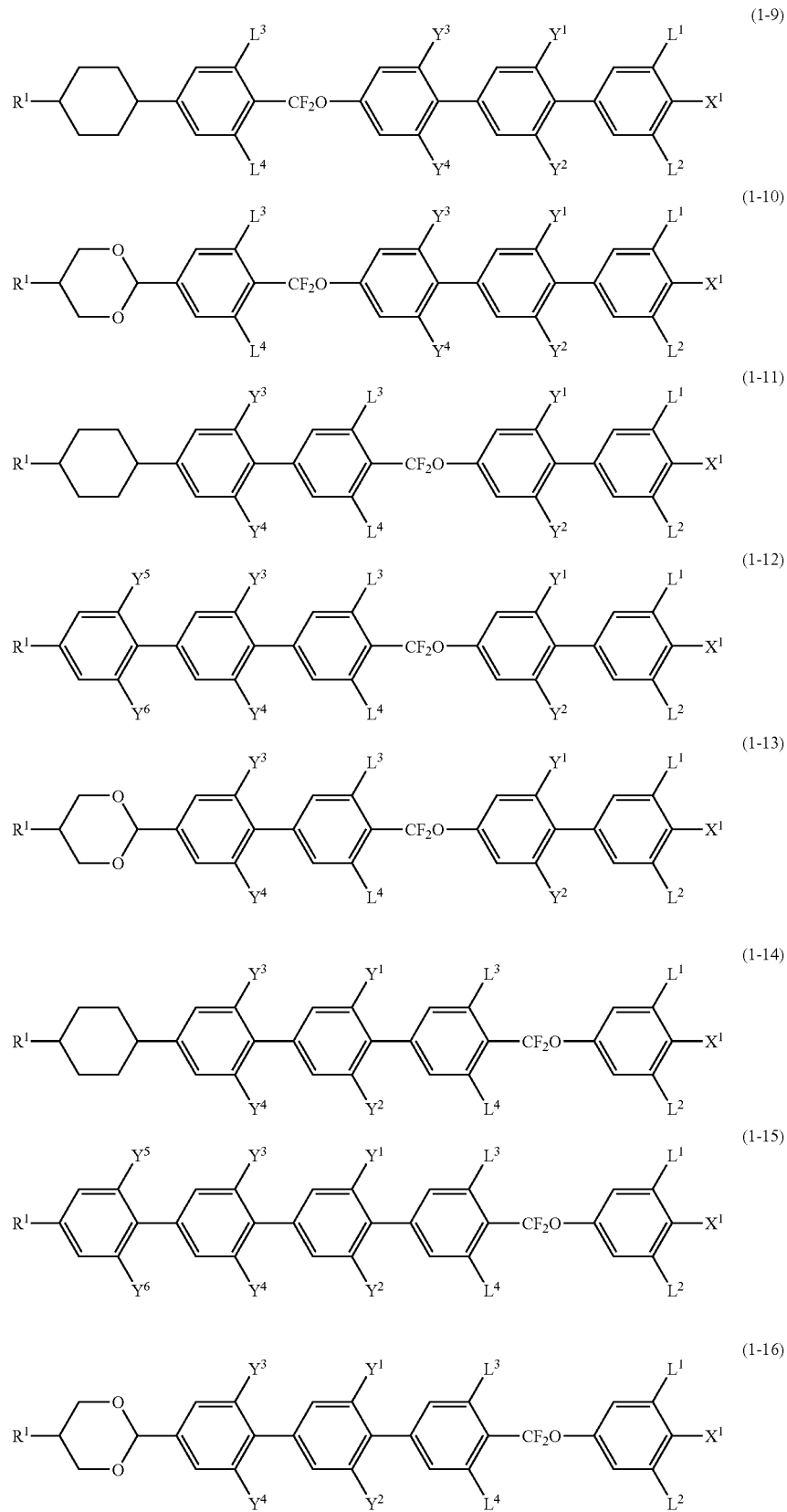

In these formulae, $R^1$ is $C_1$-$C_{15}$ alkyl, $L^1$, $L^2$, $L^3$, $L^4$, $Y^1$, $Y^2$, $Y^3$, $Y^4$, $Y^5$ and $Y^6$ are each independently a hydrogen atom or a fluorine atom, and $X^1$ is a fluorine atom or —$OCF_3$.

The 7$^{th}$ item is a liquid crystal composition of the 1$^{st}$ item that includes at least one compound selected from the group consisting of the compounds respectively represented by formulae (1-17)-(1-32).

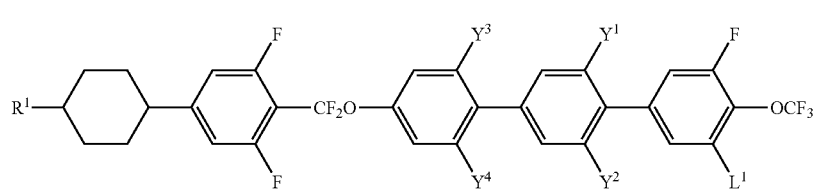
(1-17)

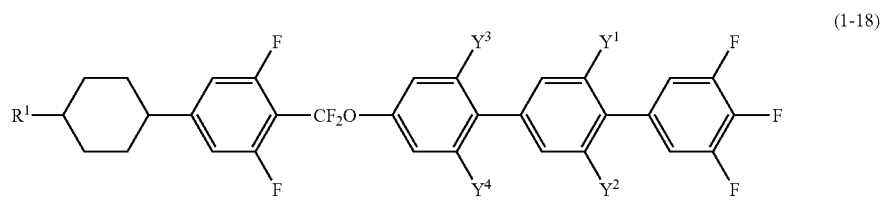
(1-18)

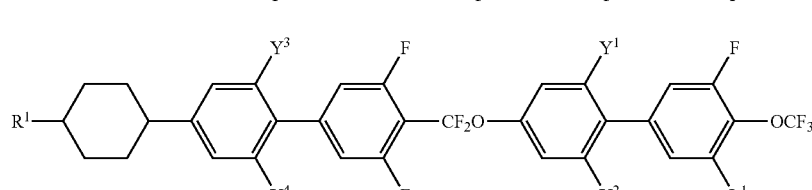
(1-19)

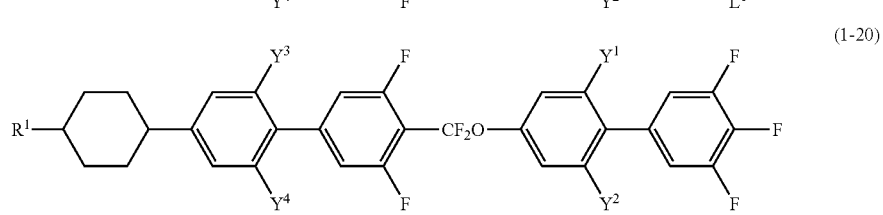
(1-20)

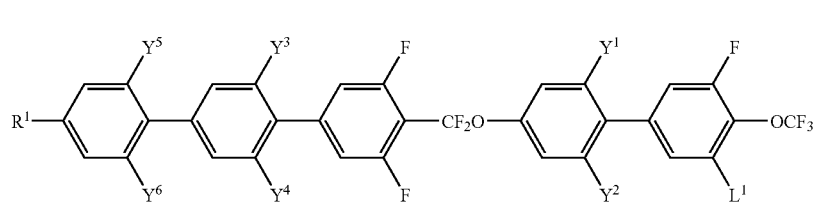
(1-21)

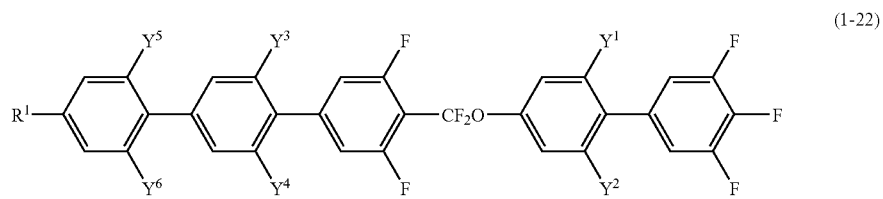
(1-22)

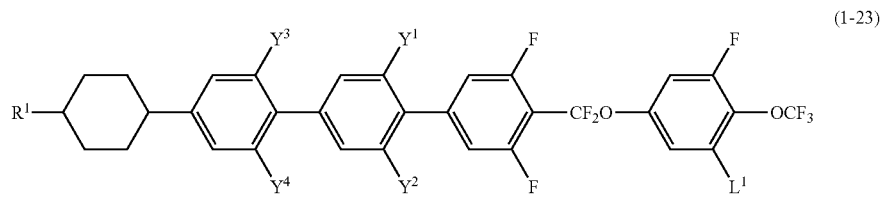
(1-23)

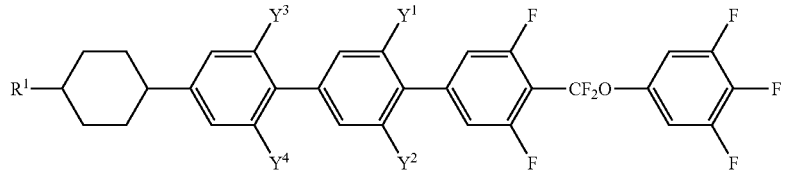
(1-24)
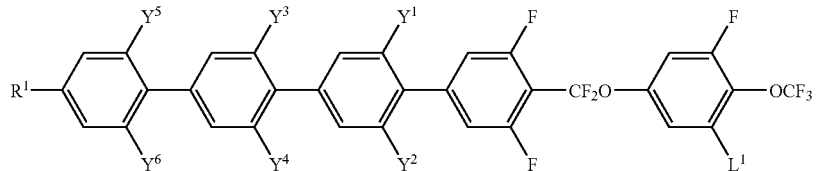
(1-25)
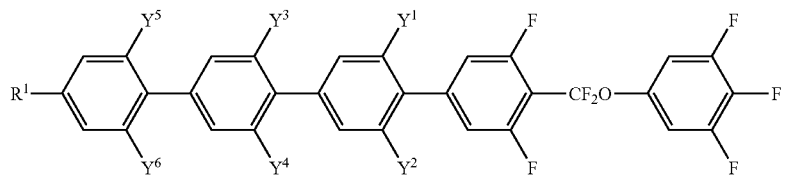
(1-26)
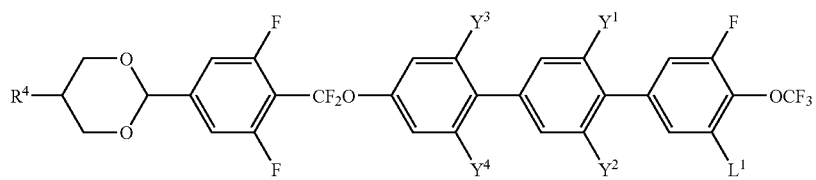
(1-27)
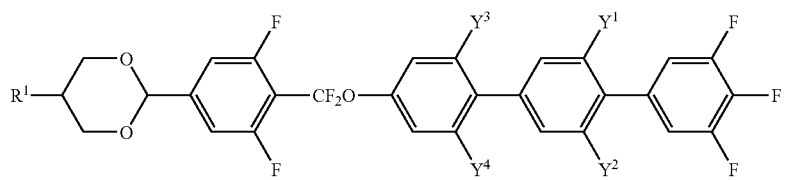
(1-28)
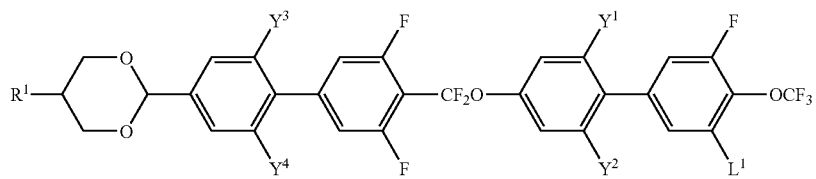
(1-29)
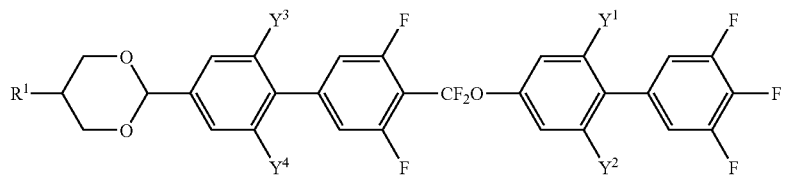
(1-30)
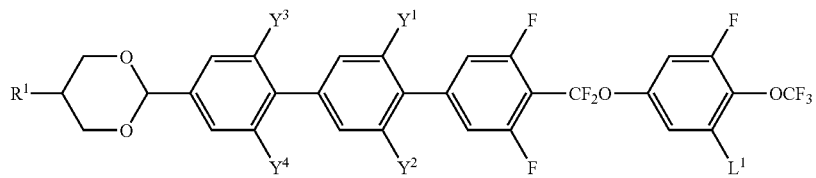
(1-31)

-continued (1-32)

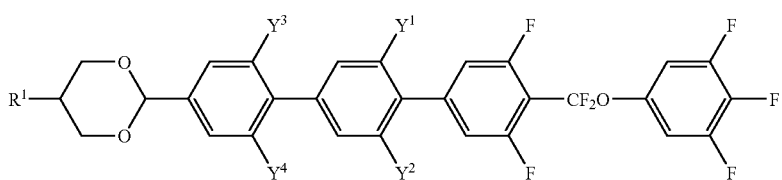

In these formulae, $R^1$ is $C_1$-$C_{15}$ alkyl, and $L^1$, $Y^1$, $Y^2$, $Y^3$, $Y^4$, $Y^5$ and $Y^6$ are each independently a hydrogen atom or a fluorine atom.

The 8$^{th}$ item is a liquid crystal composition of any of the 1$^{st}$ to 7$^{th}$ items that further includes at least one compound selected from the group consisting of the compounds respectively represented by formulae (2), (3) and (4).

(2)

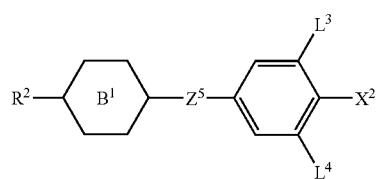

(3)

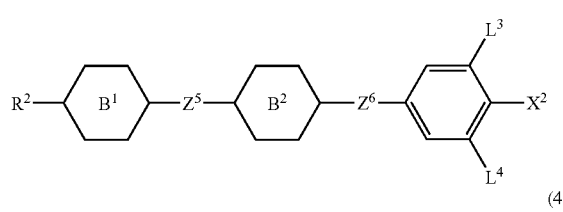

(4)

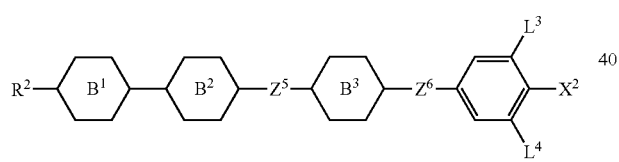

In these formulae, $R^2$ is $C_1$-$C_{10}$ alkyl, $C_2$-$C_{10}$ alkenyl or $C_2$-$C_{10}$ alkynyl, wherein arbitrary hydrogen atom of $R^2$ may be replaced by a fluorine atom and arbitrary —$CH_2$— of $R^2$ may be replaced by —O—. $X^2$ is a fluorine atom, a chlorine atom, —$SF_5$, —$OCF_3$, —$OCHF_2$ or —$CF_3$. The rings $B^1$, $B^2$, $B^3$ and $B^4$ are each independently 1,4-cyclohexylene, 1,3-dioxan-2,5-diyl, pyrimidin-2,5-diyl, tetrahydropyran-2,5-diyl, piperidin-1,4-diyl, 1,4-phenylene, naphthalen-2,6-diyl, 1,4-phenylene with arbitrary hydrogen atom being replaced by a fluorine atom or a chlorine atom, or naphthalen-2,6-diyl with arbitrary hydrogen atom being replaced by a fluorine atom or a chlorine atom. $Z^5$ and $Z^6$ are each independently —COO—, —$CF_2O$—, —C≡C— or a single bond. $L^3$ and $L^4$ are each independently a hydrogen atom or a fluorine atom.

The 9$^{th}$ item is a liquid crystal composition of any of the 1$^{st}$ to 7$^{th}$ items that further includes at least one compound selected from the group consisting of the compounds represented by formula (5).

(5)

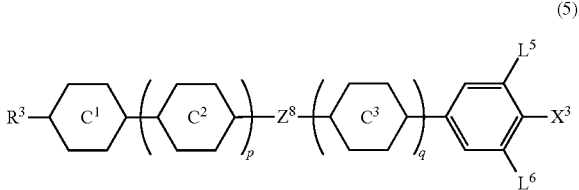

In formula (5), $R^3$ is $C_1$-$C_{10}$ alkyl or $C_2$-$C_{10}$ alkenyl, wherein arbitrary hydrogen atom of $R^3$ may be replaced by a fluorine atom and arbitrary —$CH_2$— of $R^3$ may be replaced by —O—. $X^3$ is —C≡N or —C≡C—C≡N. The rings $C^1$, $C^2$ and $C^3$ are each independently 1,4-cyclohexylene, 1,4-phenylene, naphthalen-2,6-diyl, 1,3-dioxan-2,5-diyl, tetrahydropyran-2,5-diyl, pyrimidin-2,5-diyl, 1,4-phenylene with arbitrary hydrogen atom being replaced by a fluorine atom, or naphthalen-2,6-diyl with arbitrary hydrogen atom being replaced by a fluorine atom. $Z^8$ is —$(CH_2)_2$—, —COO—, —$CF_2O$—, —$OCF_2$—, —C≡C—, —$CH_2O$— or a single bond. $L^5$ and $L^6$ are each independently a hydrogen atom or a fluorine atom, p is 1 or 2, q is 0 or 1, and p+q=0, 1 or 2.

The 10$^{th}$ item is a liquid crystal composition of any of the 1$^{st}$ to 7$^{th}$ items that further includes at least one compound selected from the group consisting of the compounds respectively represented by formulae (6), (7) and (8).

(6)

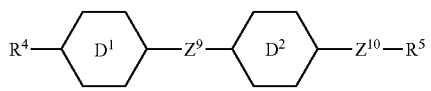

(7)

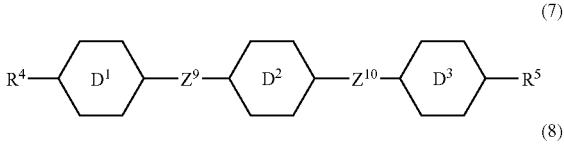

(8)

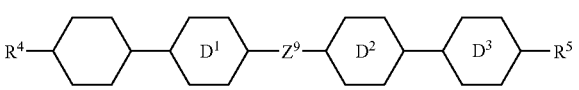

In these formulae, $R^4$ and $R^5$ are each independently $C_1$-$C_{10}$ alkyl or $C_2$-$C_{10}$ alkenyl, wherein arbitrary hydrogen atom of $R^4$ and $R^5$ may be replaced by a fluorine atom and arbitrary —$CH_2$— of $R^4$ and $R^5$ may be replaced by —O—. The rings $D^1$, $D^2$ and $D^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene. $Z^9$ and $Z^{10}$ are each independently —C≡C—, —COO—, —$(CH_2)_2$—, —CH=CH— or a single bond.

The 11$^{th}$ item is a liquid crystal composition of the 8$^{th}$ item that further includes at least one compound selected from the group consisting of the compounds represented by formula (5) of the 9$^{th}$ item.

The 12th item is a liquid crystal composition of the 8th item that further includes at least one compound selected from the group consisting of the compounds respectively represented by formulae (6), (7) and (8).

The 13th item is a liquid crystal composition of any of the 1st to 12th items that further includes at least one antioxidant and/or ultraviolet absorbent.

The 14th item is a liquid crystal composition of any of the 1st to 13th items that includes 1-40 wt % of the chiral dopant relative to the total weight thereof.

The 15th item is a liquid crystal composition of any of the 1st to 13th items that includes 5-15 wt % of the chiral dopant relative to the total weight thereof.

The 16th item is a liquid crystal composition of the 14th or 15th item that exhibits a chiral nematic phase at any temperature in the range of 70 to −20° C. and has a pitch of 700 nm or less at a temperature in at least a part of the range of 70 to −20° C.

The 17th item is a liquid crystal composition of any of the 14th to 16th items wherein the chiral dopant includes one or more of the compounds respectively represented by formulae (K1)-(K5).

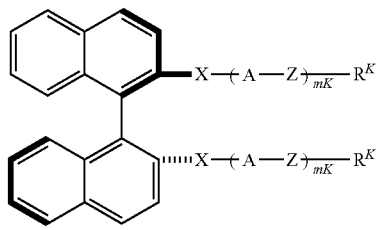
(K1)

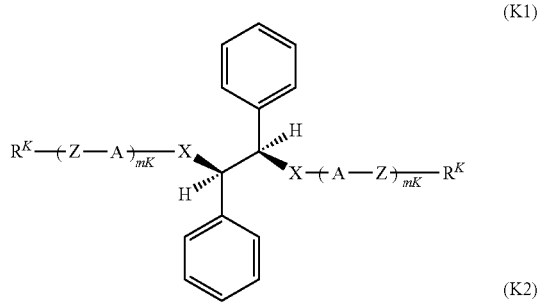
(K2)

(K3)

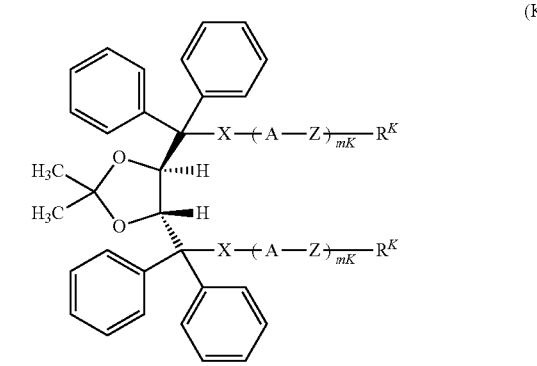

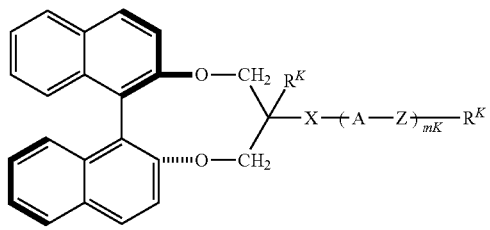
(K4)

(K5)

In formulae (K1)-(K5), each $R^K$ is independently a hydrogen atom, a halogen atom, —C≡N, —N=C=O, —N=C=S, or $C_1$-$C_{20}$ alkyl wherein arbitrary —$CH_2$— may be replaced by —O—, —S—, —COO—, —OCO—, —CH=CH—, —CF=CF— or —C≡C— and arbitrary hydrogen atom may be replaced by a halogen atom. Each A is independently an aromatic or non-aromatic 3- to 8-membered ring or a fused ring of 9 or more carbon atoms, wherein arbitrary hydrogen atom may be replaced by a halogen atom, or alkyl or haloalkyl of 1-3 carbon atoms, —$CH_2$— may be replaced by —O—, —S— or —NH— and —CH= may be replaced by —N=. Each Z is independently a single bond, or $C_1$-$C_8$ alkylene wherein arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom. X is a single bond, —COO—, —OCO—, —$CH_2$O—, —O$CH_2$—, —$CF_2$O—, —O$CF_2$— or —$CH_2CH_2$—, and mK is an integer of 1-4.

The 18th item is a liquid crystal composition of any of the 14th to 16th items wherein the chiral dopant comprises one or more of the compounds respectively represented by formulae (K2-1)-(K2-8) and (K5-1)-(K5-3).

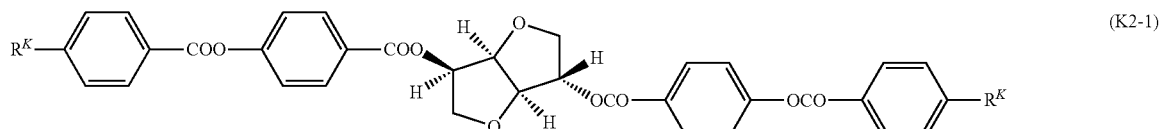
(K2-1)

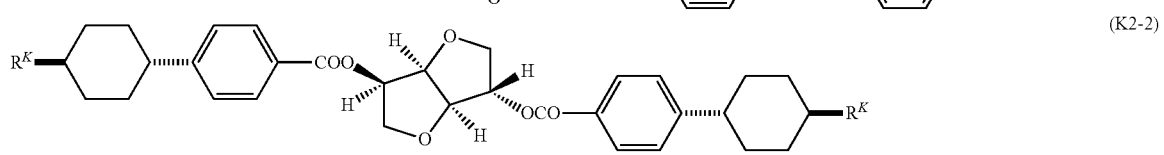
(K2-2)

-continued

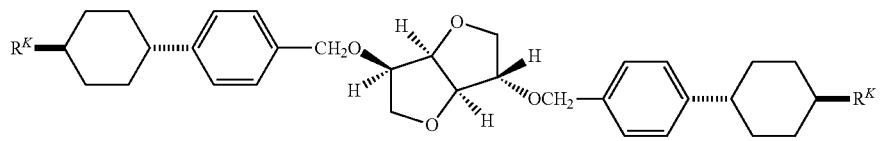
(K2-3)

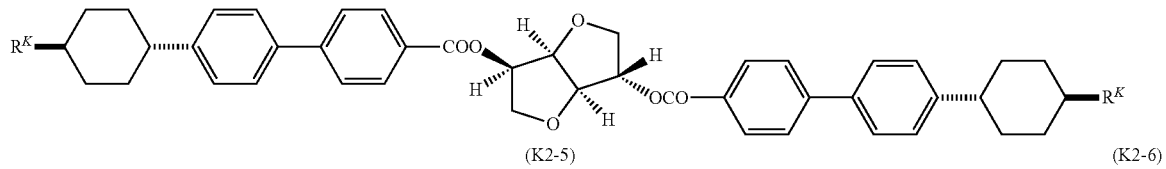
(K2-4)

(K2-5)    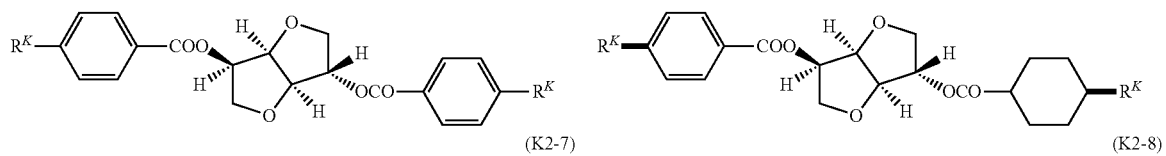    (K2-6)

(K2-7)    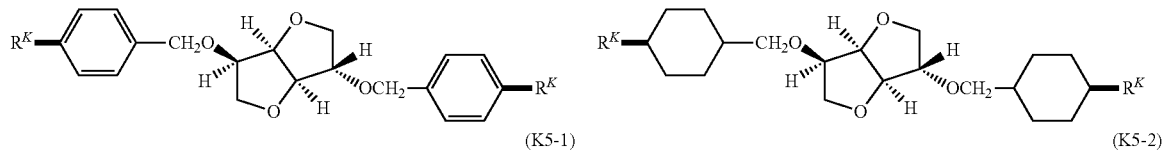    (K2-8)

(K5-1)    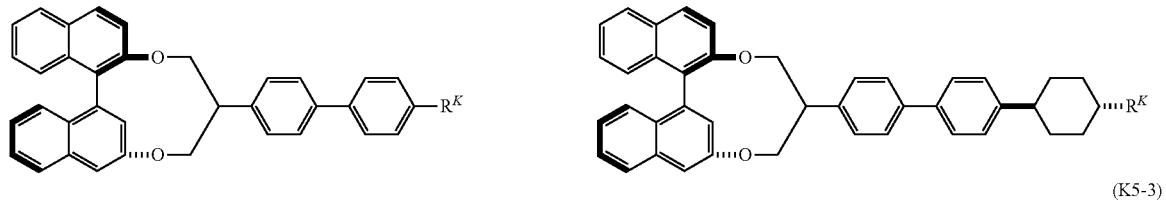    (K5-2)

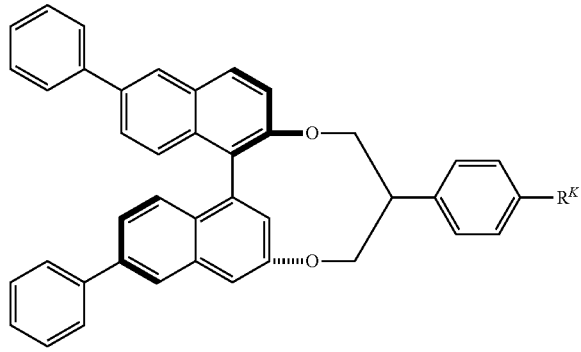
(K5-3)

In these formulae, each $R^K$ is independently $C_3$-$C_{10}$ alkyl wherein the —$CH_2$— directly bonded to a ring may be replaced by —O— and arbitrary —$CH_2$— may be replaced by —CH=CH—.

The 19$^{th}$ item is a mixture that includes a liquid crystal composition of any of the 1$^{st}$ to 18$^{th}$ items and a polymerizable monomer.

The 20$^{th}$ item is a mixture of the 19$^{th}$ item wherein the polymerizable monomer is a photo-polymerizable monomer or thermo-polymerizable monomer.

The 21$^{st}$ item is a polymer/liquid crystal composite that is obtained through polymerization of the mixture of the 19$^{th}$ or 20$^{th}$ item and is used in a device driven in an optically isotropic liquid crystal phase.

The 22$^{nd}$ item is a polymer/liquid crystal composite of the 21$^{st}$ item that is obtained through polymerization of the mixture of the 19$^{th}$ or 20$^{th}$ item in a non-liquid crystal isotropic phase or in an optically isotropic liquid crystal phase.

The 23$^{rd}$ item is a polymer/liquid crystal composite of the 21$^{st}$ item wherein the polymer has mesogenic moieties.

The 24$^{th}$ item is a polymer/liquid crystal composite of any of the 21$^{st}$ to 23$^{rd}$ items wherein the polymer has a cross-linked structure.

The 25$^{th}$ item is a polymer/liquid crystal composite of any of the 21$^{st}$ to 24$^{th}$ items wherein the weight percentage of the liquid crystal composition is 60-99 wt % and that of the polymer is 1-40 wt %.

The 26$^{th}$ item is an optical device that includes two substrates, electrodes disposed on one or both of the substrates, a liquid crystal medium disposed between the substrates, and electric field application means for applying an electric field to the liquid crystal medium via the electrodes, wherein the liquid crystal medium is the liquid crystal composition of any of the 1$^{st}$ to 18$^{th}$ items, or the polymer/liquid crystal composite of any of the 21$^{st}$ to 25$^{th}$ items.

The 27$^{th}$ item is an optical device that includes a pair of substrates with at least one substrate being transparent and one or both thereof disposed with electrodes thereon, a liquid crystal medium disposed between the substrates, a polarizer disposed at an outer side of the substrates, and electric field application means for applying an electric field to the liquid crystal medium via the electrodes, wherein the liquid crystal medium is the liquid crystal composition of any of the 1$^{st}$ to 18$^{th}$ items, or the polymer/liquid crystal composite of any of the 21$^{st}$ to 25$^{th}$ items.

The 28$^{th}$ item is an optical device of the 27$^{th}$ item wherein on at least one of the substrates, the electrodes are constructed in a manner such that the electric field is applied in at least two directions.

The 29$^{th}$ item is an optical device of the 27$^{th}$ item wherein the substrates are disposed parallel to each other and on one or two of the substrates, the electrodes are constructed in a manner such that the electric field is applied in at least two directions.

The 30$^{th}$ item is an optical device of any of the 26$^{th}$ to 29$^{th}$ items wherein the electrodes are disposed in a matrix form to form pixel electrodes and each pixel has an active device that is a thin film transistor (TFT).

In the invention, "liquid crystal medium" is the generic term of "liquid crystal composition" and "polymer/liquid crystal composite". In addition, an optical device refers to various devices utilizing electrooptical effect to achieve light modulation or optical switching etc., for example, display devices (LCD devices), light modulation devices used in optical communication systems, optical signal processing or various sensor systems. With respect to light modulation that utilizes change in the refractive index of an optically isotropic liquid crystal medium caused by voltage application, the Kerr effect is known. The Kerr effect is an effect that the electric-birefringence $\Delta n(E)$ is proportional to the square of the electric field ($E^2$), and "$\Delta n(E)=K\cdot\lambda\cdot E^2$" is satisfied for a material exhibiting the Kerr effect (K=Kerr constant, $\lambda$=wavelength). Here, the electric birefringence refers to the optical anisotropy caused by applying an electric field to the isotropic medium.

The terms used in the specification are defined below. "Liquid crystal compound" is the generic term of a compound having a liquid crystal phase such as nematic phase or smectic phase, etc. and a compound having no liquid crystal phase but being useful as a component of a liquid crystal composition. Sometimes, the terms "liquid crystal compound", "liquid crystal composition" and "LCD device" are abbreviated to "compound", "composition" and "device", respectively. "LCD device" is the generic term of "LCD panel" and "LCD module". In addition, for example, the upper-limit temperature of a liquid crystal phase is the phase transition temperature of the liquid crystal phase to the isotropic phase, and is sometimes abbreviated to "clearing point" or "upper-limit temperature". The lower-limit temperature of a liquid crystal phase is often abbreviated to "lower-limit temperature". A compound represented by formula (1) is sometimes abbreviated to "compound (1)". This also applies for a compound represented by formula (2). In formulae (1) to (19), the symbols B, D and E etc. surrounded by hexagons respectively correspond to ring B, ring D and ring E etc. The amounts of the compounds in terms of percentages are weight percentages (wt %) relative to the total weight of the composition. A number of the same symbols, such as the rings $A^1$, $Y^1$ or B etc., are present in the same or different formulae, but they can be the same as or different from each other in both cases.

"Arbitrary" denotes both arbitrary position and arbitrary number, althouth it excludes the case when the number is zero. The expression "arbitrary A may be replaced by B, C or D" not only means that arbitrary A may be replaced by B, arbitrary A may be replaced by C or arbitrary A may be replaced by D, and also means that a plurality of A's may be replaced by at least two of B-D. For example, the scope of alkyl wherein arbitrary —$CH_2$— may be replaced by —O— or —CH=CH— includes alkyl, alkenyl, alkoxy, alkoxyalkyl, alkoxyalkenyl and alkenyloxyalkyl, etc. In addition, in the invention, the replacement of two contiguous —$CH_2$— by —O— to form —O—O— is not preferable. Also, the replacement of —$CH_2$— at the alkyl terminal by —O— is not preferred. The invention will be further described below. The terminal groups, rings, linking groups and so on of the compound represented by formula (1) will also be illustrated by way of preferred examples.

The liquid crystal composition of the invention has stability to heat and light, etc., has a high upper-limit temperature and a low lower-limit temperature of liquid crystal phase, and has a low driving voltage in a device driven in an optically isotropic liquid crystal phase. The polymer/liquid crystal composite of the invention has an optically isotropic liquid crystal phase, exhibits a high upper-limit temperature and low lower-limit temperature of optically isotropic liquid crystal phase, and has a low driving voltage in a device driven in an optically isotropic liquid crystal phase. The optical device driven in an optically isotropic liquid crystal phase according to the invention has a wide temperature range for use, a short response time, a low power consumption, a large contrast and a low driving voltage.

Figure 1:
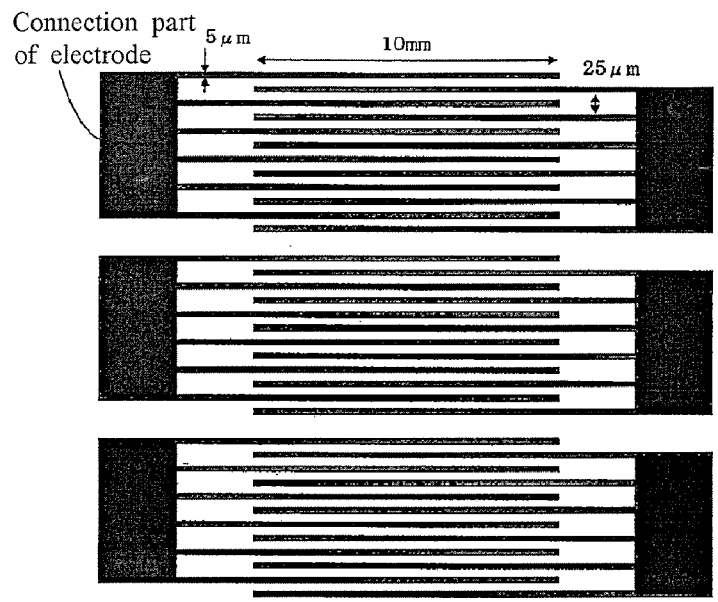
FIG. 1 shows a comb-like electrode substrate used in an embodiment of the invention.

DESCRIPTION OF THE EMBODIMENTS 1-1. Compound (1)

The liquid crystal composition having an optically isotropic liquid crystal phase according to the invention includes a compound represented by formula (1) above as a component A. A first aspect of the invention relates to a composition including the component A, or a composition including the component A and other components which are not particularly given component names in the specification. The compound represented by formula (1) is described first.

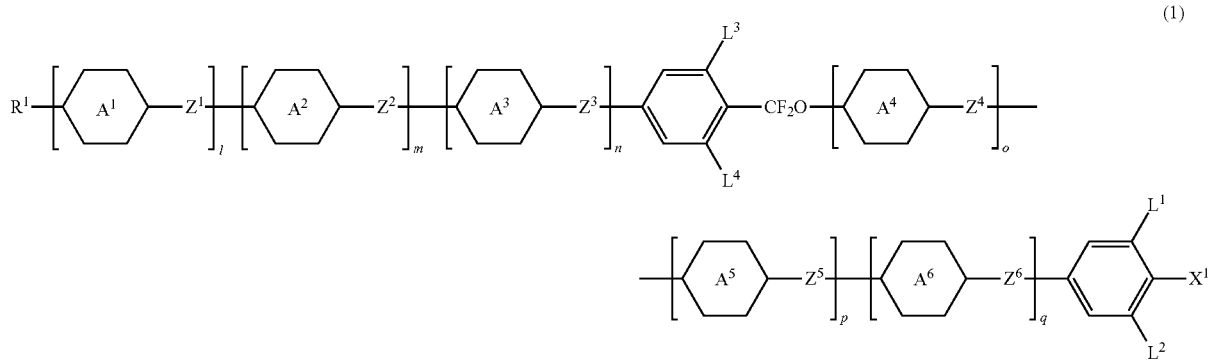

(1)

In formula (1), $R^1$ is $C_1$-$C_{20}$ alkyl, wherein arbitrary —$CH_2$— may be replaced by —O—, —S— or —CH=CH—. Examples of the group obtained by replacing arbitrary —$CH_2$— of $CH_3(CH_2)_3$— by —O—, —S— or —CH=CH— include $CH_3(CH_2)_2O$—, $CH_3$—O—$(CH_2)_2$—, $CH_3$—O—$CH_2$—O—, $CH_3(CH_2)_2S$—, $CH_3$—S—$(CH_2)_2$—, $CH_3$—S—$CH_2$—S—, $CH_2$=CH—$(CH_2)_3$—, $CH_3$—CH=CH—$(CH_2)_2$—, $CH_3$—CH=CH—$CH_2O$— and so on.

Examples of such $R^1$ include alkyl, alkoxy, alkoxyalkyl, alkoxyalkoxy, alkylthio, alkylthioalkoxy, alkenyl, alkenyloxy, alkenyloxyalkyl, alkoxyalkenyl and so on. These groups are preferably straight rather than branched. When $R^1$ is a branched group, it is preferably optically active. The preferred steric configuration of a —CH=CH— in alkenyl depends on the position of the double bond. A trans-configuration is preferred for alkenyl having a double bond at an odd number position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even number position, such as —CH$_2$CH=CHCH$_3$, —CH$_2$CH=CHC$_2$H$_5$ and —CH$_2$CH=CHC$_3$H$_7$. An alkenyl compound having a preferred steric configuration can have a high upper-limit temperature or a wide temperature range of liquid crystal phase. Further details are described in *Mol. Cryst. Liq. Cryst.*, 1985, 131, 109 and *Mol. Cryst. Liq. Cryst.*, 1985, 131, 327.

The alkyl may be straight or branched; specific examples thereof include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

The alkoxy may also be straight or branched; specific examples thereof include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

The alkoxyalkyl may also be straight or branched; specific examples thereon include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

The alkenyl may also be straight or branched; specific examples thereof include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$—.

The alkenyloxy may also be straight or branched; specific examples thereof include —OCH$_2$CH=CH$_2$, —OCH$_2$CH=CHCH$_3$ and —OCH$_2$CH=CHC$_2$H$_5$.

$R^1$ is preferably $C_1$-$C_{15}$ alkyl or $C_2$-$C_{15}$ alkenyl. In addition, more preferred examples of $R^1$ include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

In formula (1), the ring $A^1$ is 1,4-cyclohexylene, 1,3-dioxan-2,5-diyl, 1,4-phenylene, or 1,4-phenylene with arbitrary hydrogen atom being replaced by a halogen atom. The rings $A^2$, $A^3$, $A^4$, $A^5$ and $A^6$ are each independently 1,4-phenylene, or 1,4-phenylene with arbitrary hydrogen atom being replaced by a halogen atom. More preferred examples of $A^1$ include formulae (RG-1)-(RG-7). Even more preferred examples are (RG-3)-(RG-5).

(RG-1)

(RG-2)

(RG-3)

(RG-4)

(RG-5)

(RG-6)

-continued

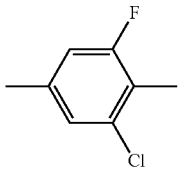
(RG-7)

More preferred examples of the rings $A^2$, $A^3$, $A^4$ and $A^5$ include formulae (RG-3)-(RG-7).

In formula (1), $Z^1$, $Z^2$, $Z^3$, $Z^4$, $Z^5$ and $Z^6$ are each independently a single bond, —$CH_2CH_2$—, —CH=CH—, —C≡C—, —COO—, —OCO—, —$CF_2O$—, —$OCF_2$—, —$CH_2O$—, —$OCH_2$—, —CF=CF—, —$(CH_2)_4$—, —$(CH_2)_2$—$CF_2O$—, —$(CH_2)_2$—$OCF_2$—, —$CF_2O$—$(CH_2)_2$—, —$OCF_2(CH_2)_2$—, —CH=CH—$(CH_2)_2$— and —$(CH_2)_2$—CH=CH—.

Preferred examples of $Z^1$, $Z^2$, $Z^3$, $Z^4$, $Z^5$ and $Z^6$ include a single bond, —$CH_2CH_2$—, —C≡C—, —COO—, —$CF_2O$—, —$CH_2O$— and —$OCH_2$—. More preferred example of $Z^1$, $Z^2$, $Z^3$, $Z^4$, $Z^5$ and $Z^6$ is a single bond.

In formula (1), $L^1$, $L^2$, $L^3$ and $L^4$ are each independently a hydrogen atom or a halogen atom. In addition, it is preferred that $L^1$, $L^2$, $L^3$ and $L^4$ are each independently a hydrogen atom or a fluorine atom.

In formula (1), $X^1$ is a hydrogen atom, a halogen atom, —C≡N, —N=C=S, —$SF_5$, or $C_1$-$C_{10}$ alkyl wherein arbitrary —$CH_2$— may be replaced by —O—, —S— or —CH=CH— and arbitrary hydrogen atom may be replaced by a halogen atom.

Specific examples of alkyl with arbitrary hydrogen atom being replaced by a halogen atom include —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, and —$(CF_2)_5$—F.

Specific examples of alkoxy with arbitrary hydrogen atom being replaced by a halogen atom include —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F and —O—$(CF_2)_5$—F.

Specific examples of alkenyl with arbitrary hydrogen atom being replaced by a halogen atom include —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ and —CH=$CHCF_2CF_3$.

Specific examples of $X^1$ include a hydrogen atom, a fluorine atom, a chlorine atom, —C≡N, —N=C=S, —$SF_5$, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{12}$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_3$, —$OC_2H_5$, —$OC_3H_7$, —$OC_4H_9$, —$OC_5H_{11}$, —$OCF_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=$CH_2$, —CH=$CHCH_3$, —$CH_2CH$=$CH_2$, —CH=$CHC_2H_5$, —$CH_2CH$=$CHCH_3$, —$(CH_2)_2$—CH=$CH_2$, —CH=$CHC_3H_7$, —$CH_2CH$=$CHC_2H_5$, —$(CH_2)_2$—CH=$CHCH_3$, —$(CH_2)_3$—CH=$CH_2$, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ and —CH=$CHCF_2CF_3$.

Preferred examples of $X^1$ include a fluorine atom, a chlorine atom, —C≡N, —$CF_3$, —$CHF_2$, —$CH_2F$, —$OCF_3$, —$OCHF_2$ and —$OCH_2F$. More preferred examples of $X^1$ include a fluorine atom and —$OCF_3$.

In formula (1), l, m, n, o, p and q are each independently 0 or 1, and l+m+n+o+p+q=3. Preferred combinations of l, m, n, o, p and q include (l=o=p=1, m=n=q=0), (l=m=o=1, n=p=q=0) and (l=m=n=1, o=p=q=0).

1-2. Properties of Compound (1)

The compound (1) of the invention is further described below. The compound (1) is a 5-ring liquid crystal compound having a linking group of $CF_2O$. The compound is very stable in the physical and chemical properties under the conditions of common use of the devices, and has good compatibility with other liquid crystal compounds. A composition containing the compound is stable under the conditions of common use of the devices. The compound is a 5-ring compound with a wide temperature range of liquid crystal phase and a high clearing point. Therefore, the liquid crystal medium of the invention using the compound has a wide temperature range of liquid crystal phase and can be used in a display device in a wide temperature range. Further, the liquid crystal medium of the invention has a low driving voltage due to the large dielectric anisotropy of the compound (1).

The physical properties such as the clearing point, the optical anisotropy and the dielectric anisotropy, etc., can be adjusted as required through proper selection of the combination of l, m, n, o, p and q, the species of the rings $A^1$-$A^6$, the left terminal group $R^1$, the groups on the most right benzene ring and their substitution positions ($L^1$, $L^2$ and $X^1$) or the linking groups $Z^1$-$Z^6$ of the compound (1). The effects of the combination of l, m, n, o, p and q, the rings $A^1$-$A^6$, the left terminal group $R^1$, the right terminal group $X^1$, the linking group $Z^1$-$Z^6$ and the species of $L^1$ and $L^2$ to the properties of the compound (1) are described below.

When the combination of l, m, n, o, p and q is (l=m=n=1, o=p=q=0), the compound (1) has a wide temperature range of liquid crystal phase and a high clearing point. When the combination of l, m, n, o, p and q is (l=m=o=1, n=p=q=0), the compound (1) has high compatibility with other compounds.

When the ring $A^1$ is 1,4-cyclohexylene, the compound (1) has a high clearing point and good compatibility. When the ring $A^1$ is 1,3-dioxan-2,5-diyl, the compound (1) has a large dielectric anisotropy. When the ring $A^1$ is 1,4-phenylene or 1,4-phenylene with arbitrary hydrogen atom being replaced by a halogen atom, the compound (1) has a large optical anisotropy. A compound wherein the ring $A^1$ is 1,4-phenylene, or 1,4-phenylene with arbitrary hydrogen atom being replaced by a halogen atom, is a compound having five benzene rings, however, this compound surprisingly has relatively good compatibility. When l=m=n=1 and o=p=q=0, the compound (1) has a high clearing point, a large optical anisotropy and a large dielectric anisotropy. When l=m=o=1 and n=p=q=0, the compound (1) has high compatibility with other compounds, a large optical anisotropy and a large dielectric anisotropy. When l=o=p=1 and m=n=q=0, the compound (1) has a large optical anisotropy and a large dielectric anisotropy.

When $R^1$ is straight, the compound (1) has a wide temperature range of liquid crystal phase and a low viscosity. When $R^1$ is branched, the compound (1) has good compatibility with other liquid crystal compounds. When $R^1$ is alkenyl, the preferred steric configuration depends on the position of the double bond. An alkenyl compound having a preferred steric configuration has a high upper-limit temperature or a wide temperature range of liquid crystal phase.

When the linking groups $Z^1$, $Z^2$, $Z^3$, $Z^4$, $Z^5$ and $Z^6$ are a single bond, $-CH_2CH_2-$, $-CH=CH-$, $-CF_2O-$, $-OCF_2-$, $-CH_2O-$, $-OCH_2-$, $-CF=CF-$, $-(CH_2)_3-O-$, $-O-(CH_2)_3-$, $-(CH_2)_2-CF_2O-$, $-OCF_2-(CH_2)_2-$ or $-(CH_2)_4-$, the compound (1) has a low viscosity. When the linkage group is a single bond, $-(CH_2)_2-$, $-CF_2O-$, $-OCF_2-$ or $-CH=CH-$, the compound (1) has a lower viscosity. When the linking group is $-C\equiv C-$, the compound (1) has a large optical anisotropy. When $Z^1$, $Z^2$, $Z^3$, $Z^4$, $Z^5$ and $Z^6$ are a single bond, $-(CH_2)_2-$, $-CH_2O-$, $-CF_2O-$, $-OCF_2-$ or $-(CH_2)_4-$, the compound (1) is relatively stable chemically and less liable to degradation.

When the right terminal group $X^1$ is a fluorine atom, a chlorine atom, $-C\equiv N$, $-N=C=S$, $-SF_5$, $-CF_3$, $-CHF_2$, $-CH_2F$, $-OCF_3$, $-OCHF_2$ or $-OCH_2F$, the compound (1) has a large dielectric anisotropy. When $X^1$ is $-C\equiv N$, $-N=C=S$ or alkenyl, the compound (1) has a large optical anisotropy. When $X^1$ is a fluorine atom, $-OCF_3$ or alkyl, the compound (1) is chemically stable.

When both $L^1$ and $L^2$ are fluorine and $X^1$ is fluorine, chlorine, $-C\equiv N$, $-N=C=S$, $-SF_5$, $-CF_3$, $-CHF_2$, $-CH_2F$, $-OCF_3$, $-OCHF_2$ or $-OCH_2F$, the compound (1) has a large dielectric anisotropy. When $L^1$ is fluorine and $X^1$ is $-OCF_3$, when both $L^1$ and $L^2$ are fluorine and $X^1$ is $-OCF_3$, or when $L^1$, $L^2$ and $X^1$ are all fluorine, the compound (1) has a large dielectric anisotropy and a wide temperature range of liquid crystal phase, and is chemically stable and less liable to degradation.

As described above, a compound having desired properties can be obtained through proper selection of the species of the ring structures, the terminal groups and the linking groups, etc.

1-3. Specific Examples of Compound (1)

Preferred examples of the compound (1) include formulae (1-5)-(1-8), more preferable examples include formulae (1-9)-(1-16), and even more preferable examples include formulae (1-17)-(1-32).

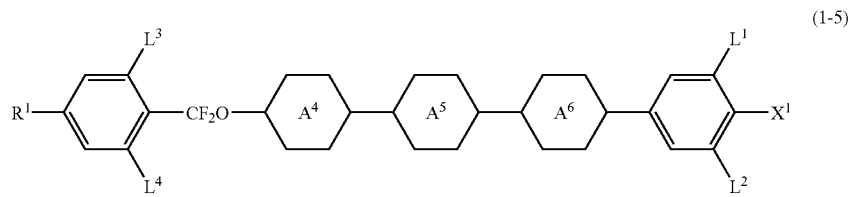

(1-5)

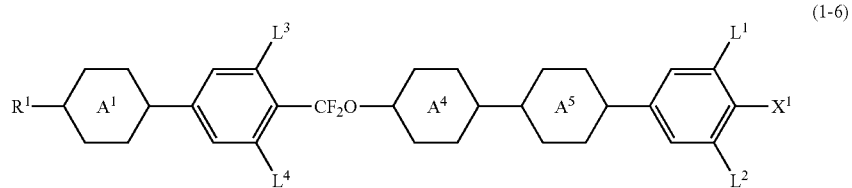

(1-6)

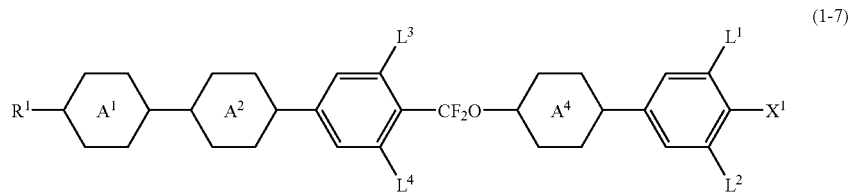

(1-7)

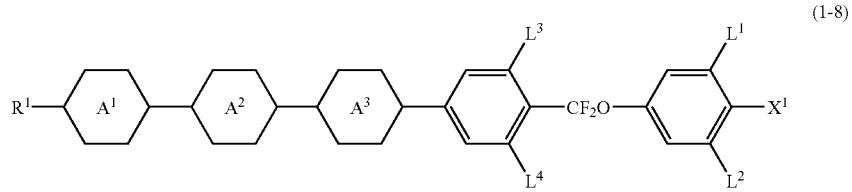

(1-8)

In these formulae, $R^1$ is $C_1$-$C_{15}$ alkyl or $C_2$-$C_{15}$ alkenyl. The rings $A^1$, $A^2$, $A^3$, $A^4$, $A^5$ and $A^6$ are each independently 1,4-cyclohexylene, 1,3-dioxan-2,5-diyl, 1,4-phenylene, or 1,4-phenylene with arbitrary hydrogen atom being replaced by a fluorine atom. At least one of the rings $A^1$, $A^2$, $A^3$, $A^4$, $A^5$ and $A^6$ in each formula is 1,4-cyclohexylene or 1,3-dioxan-2,5-diyl. $L^1$, $L^2$, $L^3$ and $L^4$ are each independently a hydrogen atom or a fluorine atom. $X^1$ is a fluorine atom, a chlorine atom, $-C\equiv N$, $-CF_3$, $-CHF_2$, $-CH_2F$, $-OCF_3$, $-OCHF_2$ or $-OCH_2F$.

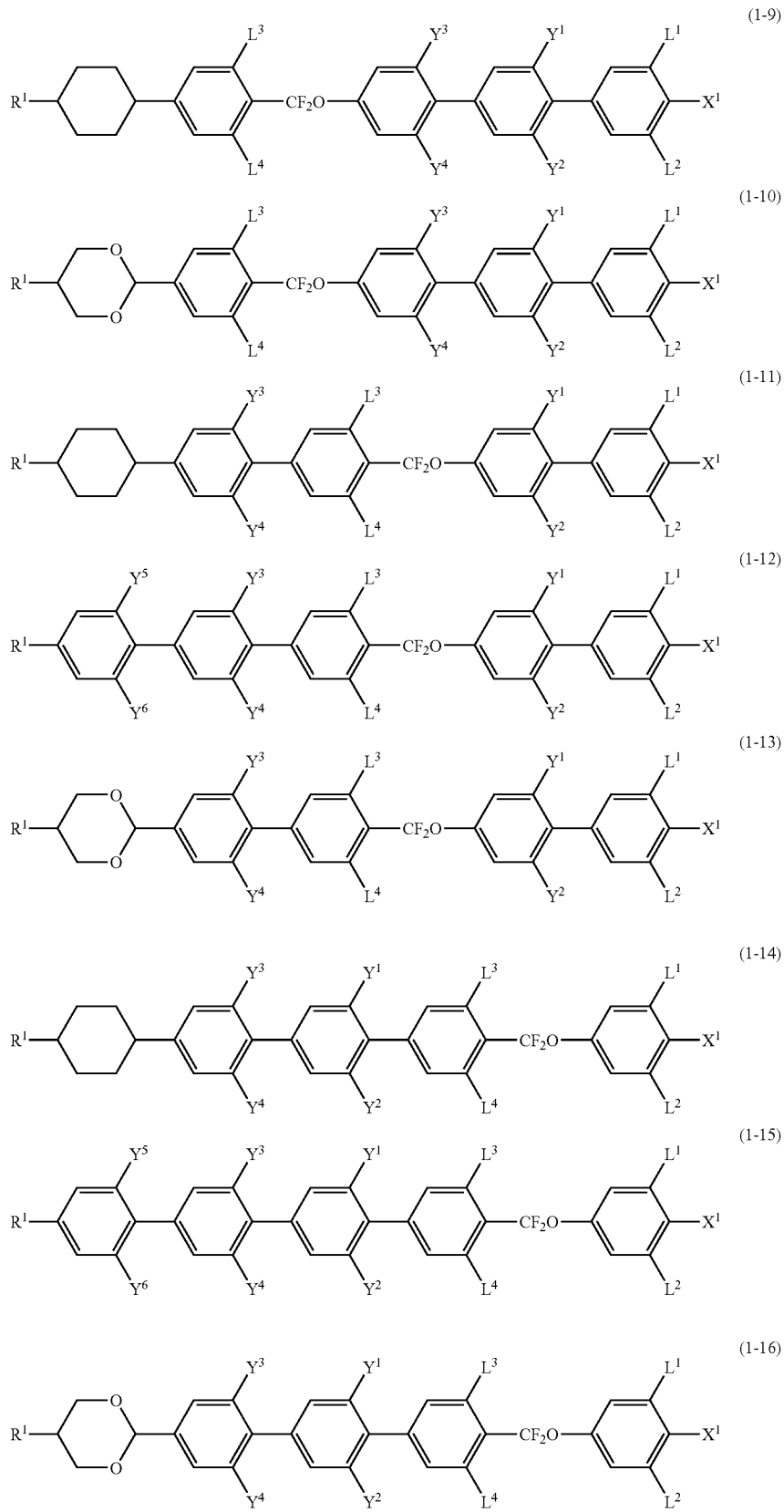

In these formulae, $R^1$ is $C_1$-$C_{15}$ alkyl, $L^1$-$L^4$ and $Y^1$-$Y^6$ are each independently a hydrogen atom or a fluorine atom, and $X^1$ is a fluorine atom or —$OCF_3$.
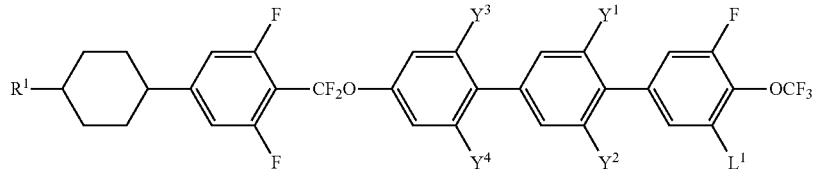
(1-17)
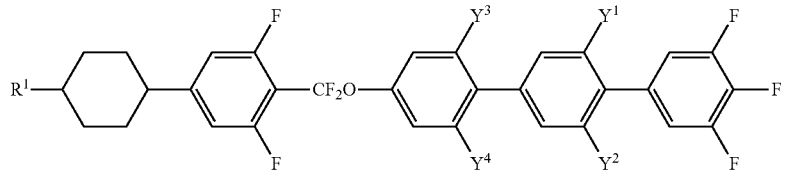
(1-18)
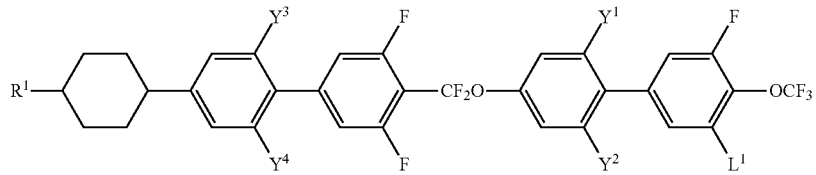
(1-19)
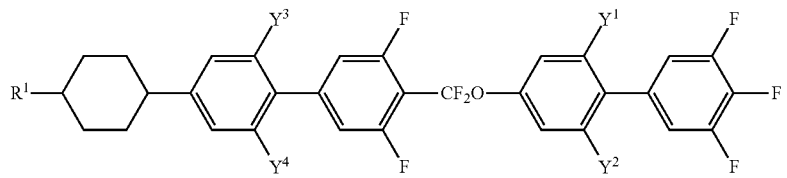
(1-20)
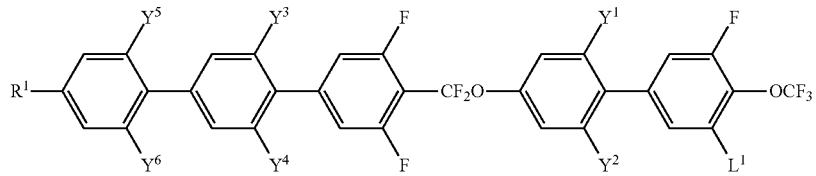
(1-21)
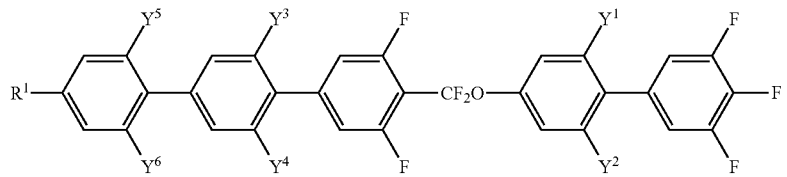
(1-22)
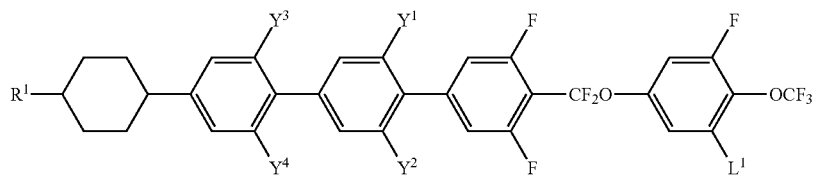
(1-23)
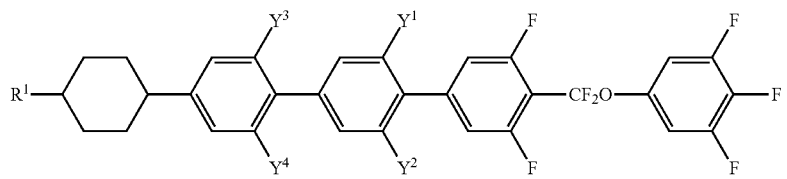
(1-24)

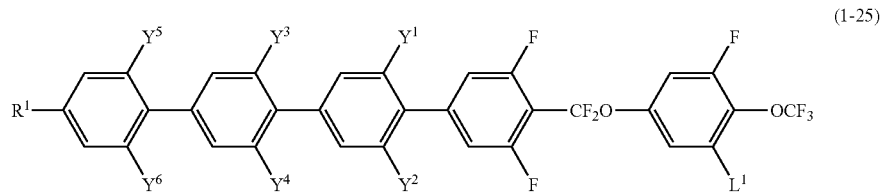
(1-25)
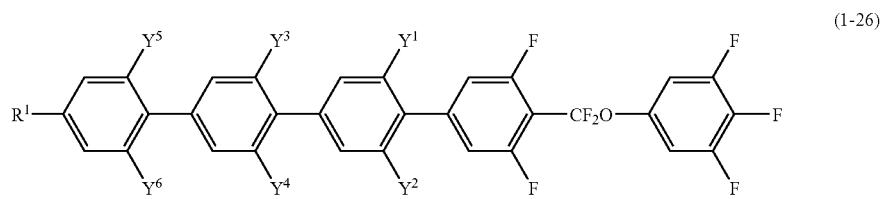
(1-26)
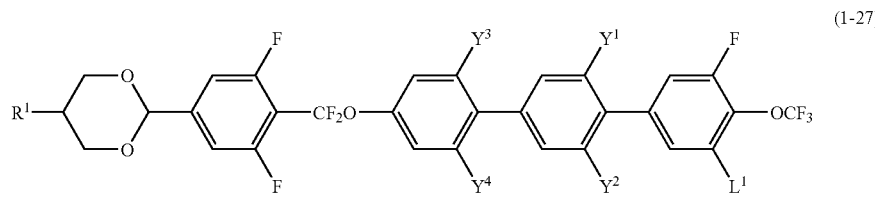
(1-27)
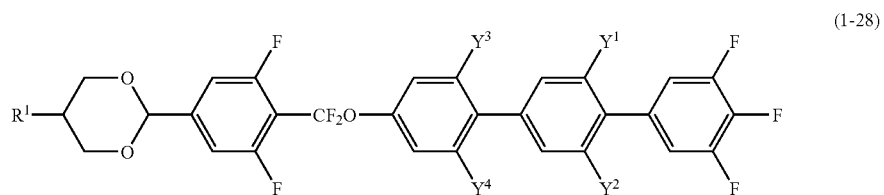
(1-28)
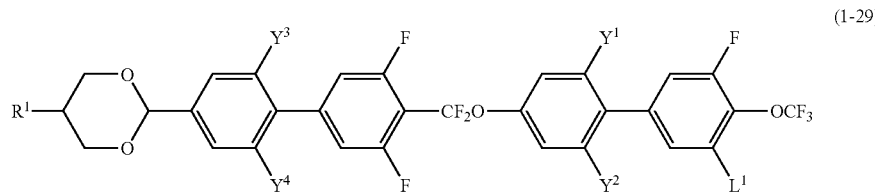
(1-29)
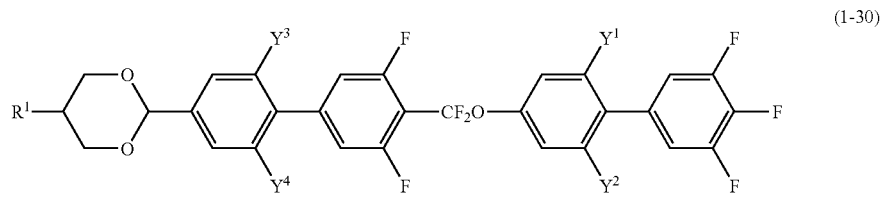
(1-30)
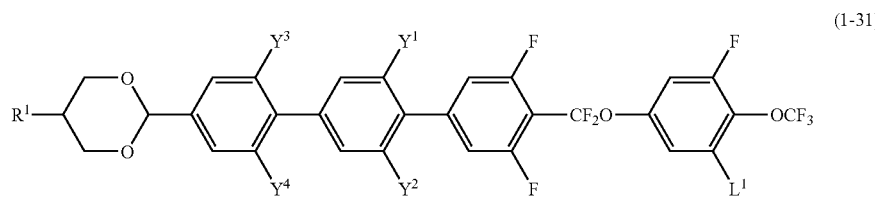
(1-31)
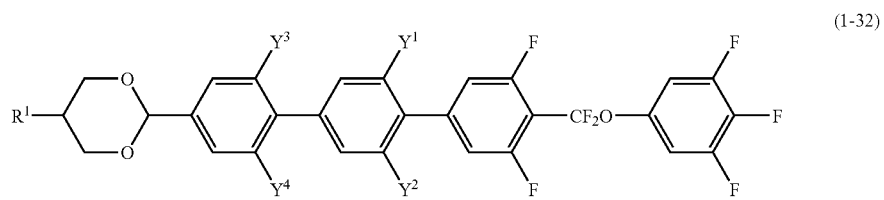
(1-32)

In these formulae, $R^1$ is $C_1$-$C_{15}$ alkyl, and $L^1$, $Y^1$, $Y^2$, $Y^3$, $Y^4$, $Y^5$ and $Y^6$ are each independently a hydrogen atom or a fluorine atom.

1-4. Synthesis of Compound (1)

The synthesis of the compound (1) is described next. The compound (1) may be synthesized with a suitable combination of some methods known in the filed of synthetic organic chemistry. The methods for introducing the target terminal groups, rings and linking groups into the starting material are disclosed in known publications, such as *Organic Syntheses* from John Wiley & Sons, Inc, *Organic Reactions* from John Wiley & Sons, Inc, *Comprehensive Organic Synthesis* from Pergamon Press and *Lectures on New Experimental Chemistry* (MARUZEN), etc.

1-4-1. Formation of Linking Groups $Z^1$-$Z^6$

An example of the method for forming the linking groups $Z^1$-$Z^6$ of the compound (1) is described in reference of the reaction scheme below, wherein $MSG^1$ or $MSG^2$ is a monovalent organic group having at least one ring. The plural groups represented by $MSG^1$ (or $MSG^2$) in the scheme may be the same as or different from each other. The compounds (1A)-(1J) correspond to the compound (1).

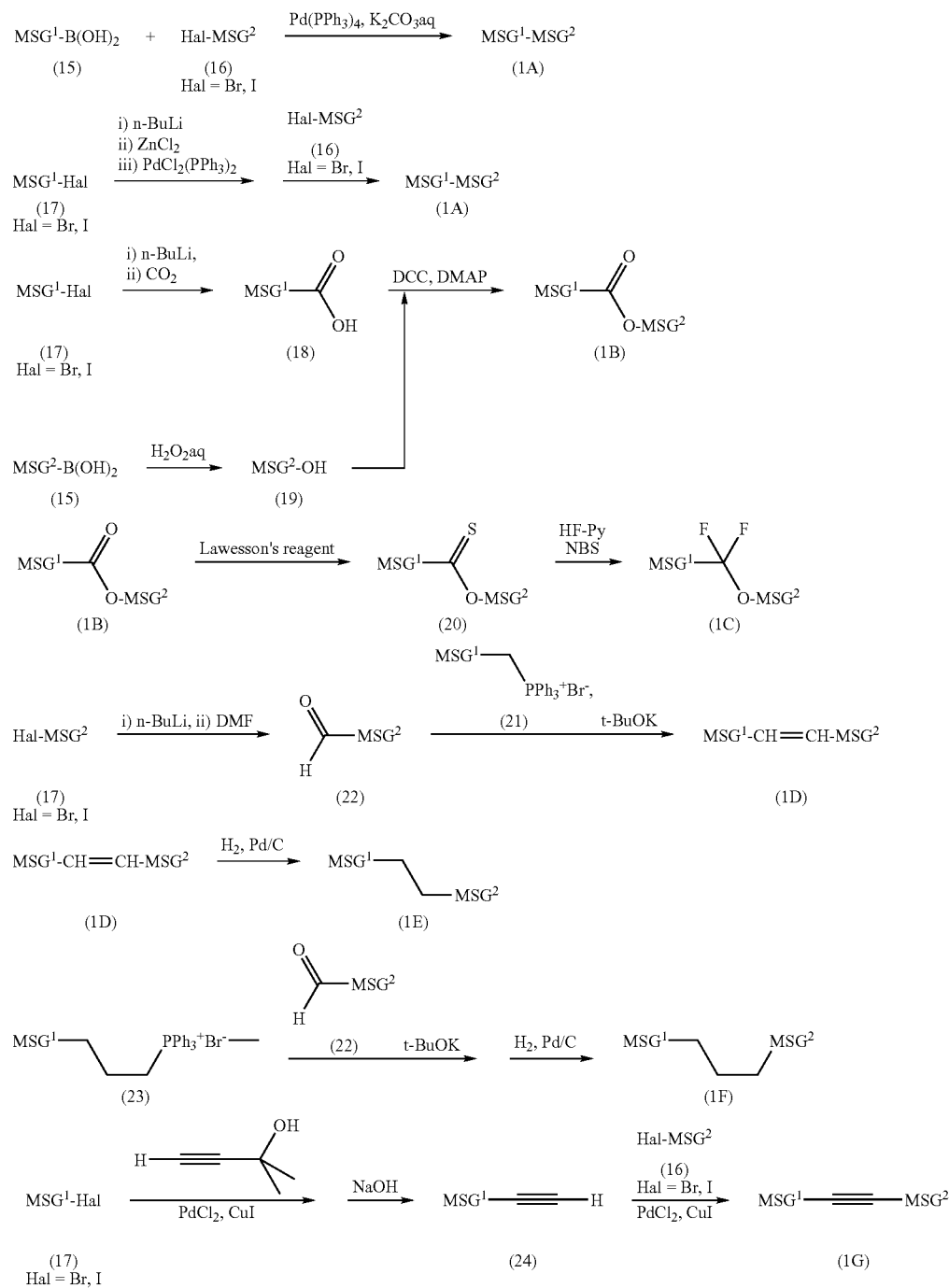

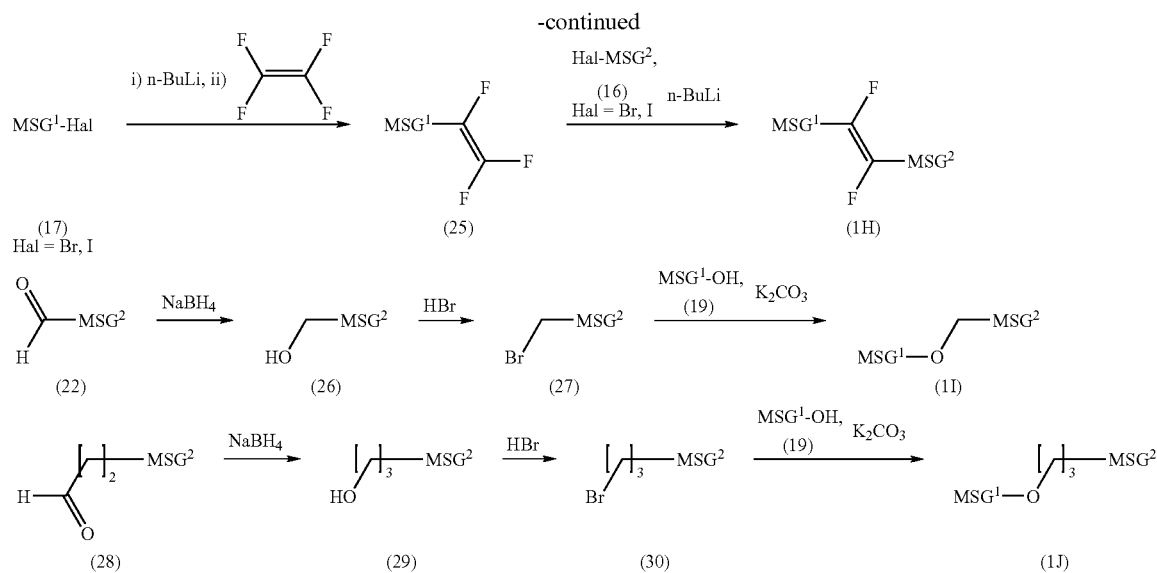

Next, exemplary methods for forming various linking groups $Z^1$-$Z^6$ in the compound (1) are described in reference of the items (I) to (XI) below.

(I) Formation of Single Bond

An arylboric acid (15) is reacted with a compound (16), which is synthesized by a well-known method, in the presence of an aqueous carbonate solution and a catalyst such as tetrakis(triphenylphosphine) palladium to synthesize a compound (1A). The compound (1A) can also be synthesized by reacting a compound (17) synthesized by a known method with n-butyl lithium, with zinc chloride, and then with a compound (16) in the presence of a catalyst such as dichloro-bis(triphenylphsophine) palladium.

(II) Formation of —COO— and —OCO—

The compound (17) is reacted with n-butyl lithium and then with carbon dioxide to obtain a carboxylic acid (18). The compound (18) and a phenol compound (19) synthesized by a known method are subjected to dehydration in the presence of DCC (1,3-dicyclohexylcarbodiimide) and DMAP (4-dimethylaminopyridine) to synthesize a compound (1B) including —COO—. A compound including —OCO— is also synthesized in the same way.

(III) Formation of —CF$_2$O— and —OCF$_2$—

The compound (1B) is treated with a sulfurizing agent, such as Lawesson's reagent, to obtain a compound (20). The compound (20) is fluorinated with hydrogen fluoride-pyridine complex and NBS (N-bromosuccinimide) to synthesize a compound (1C) including —CF$_2$O—, as described in M. Kuroboshi, et al., Chem. Lett., 1992, p. 827. The compound (1C) can alternatively be synthesized by fluorinating the compound (20) with (diethylamino)sulfur trifluoride (DAST), as described in W. H. Bunnelle, et al., J. Org. Chem., vol. 55, p. 768 (1990). A compound including —OCF$_2$— is synthesized in the same way. These linking groups can alternatively be formed by the method described in Peer. Kirsch, et al., Anbew. Chem. Int. Ed., vol. 40, p. 1480 (2001).

(IV) Formation of —CH═CH—

The compound (17) is treated with n-butyl lithium and then reacted with a formamide, such as N,N-dimethylformamide (DMF), to obtain an aldehyde compound (22). A phosphonium salt (21) synthesized by a known method is treated with a base, such as potassium t-butoxide, to form a phosphorus ylide, which is then reacted with the aldehyde compound (22) to synthesize a compound (1D). Since a cis-compound is formed due to the reaction conditions, if necessary, the cis-compound can be isomerized to a trans-compound by a known method.

(V) Formation of —(CH$_2$)$_2$—

The compound (1D) is hydrogenated in the presence of a catalyst, such as palladium charcoal, to synthesize a compound (1E).

(VI) Formation of —(CH$_2$)$_4$—

A compound including —(CH$_2$)$_2$—CH═CH— is obtained in the same maimer as described in the item (IV) by using a phosphonium salt (23) instead of the phosphonium salt (21), and then subjected to catalytic hydrogenation to synthesize a compound (1F).

(VII) Formation of —C≡C—

The compound (17) is reacted with 2-methyl-3-butyne-2-ol in the presence of a catalyst containing palladium dichloride and copper halide and then deprotected under a basic condition to obtain a compound (24). The compound (24) is reacted with the compound (16) in the presence of a catalyst containing dichloro-bis(triphenylphsophine) palladium and copper halide to synthesize a compound (1G).

(VIII) Formation of —CF═CF—

The compound (17) is treated with n-butyl lithium and then reacted with tetra-fluoroethylene to obtain a compound (25). The compound (16) is treated with n-butyl lithium and then reacted with the compound (25) to synthesize a compound (1H).

(IX) Formation of —CH$_2$O— or —OCH$_2$—

A compound (22) is reduced by a reducing agent, such as sodium borohydride, to obtain a compound (26), which is then halogenated with hydrobromic acid or the like to obtain a compound (27). The compound (27) is reacted with the compound (19) in the presence of potassium carbonate or the like to synthesize a compound (1I).

(X) Formation of —(CH$_2$)$_3$O— or —O(CH$_2$)$_3$—

A compound (1J) is synthesized in the same way as in the item (IX), except that a compound (28) is used instead of the compound (22).

1-4-2. Synthesis of the Rings A$^1$, A$^2$, A$^3$, A$^4$, A$^5$ and A$^6$

To obtain the ring of 1,4-cyclohexylene, 1,3-dioxan-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene or 2,3,5,6-tetrafluoro-1,4-phenylene, the starting material may be commercially available, or may be synthesized by a well-known method.

1-4-3-1. Synthesis of Compound (1)

There are various methods capable of synthesizing the compound (1). For example, a carboxylic acid derivative (31) and an alcohol derivative (32) are subjected to dehydration and condensation in the presence of DCC and DMAP, etc., to give an ester derivative (33), which is then treated with a sulfurizing agent such as Lawesson's reagent to give a thione-O-ester derivative (34), which is then fluorinated with hydrogen fluoride-pyridine complex and NBS to give the compound (1).

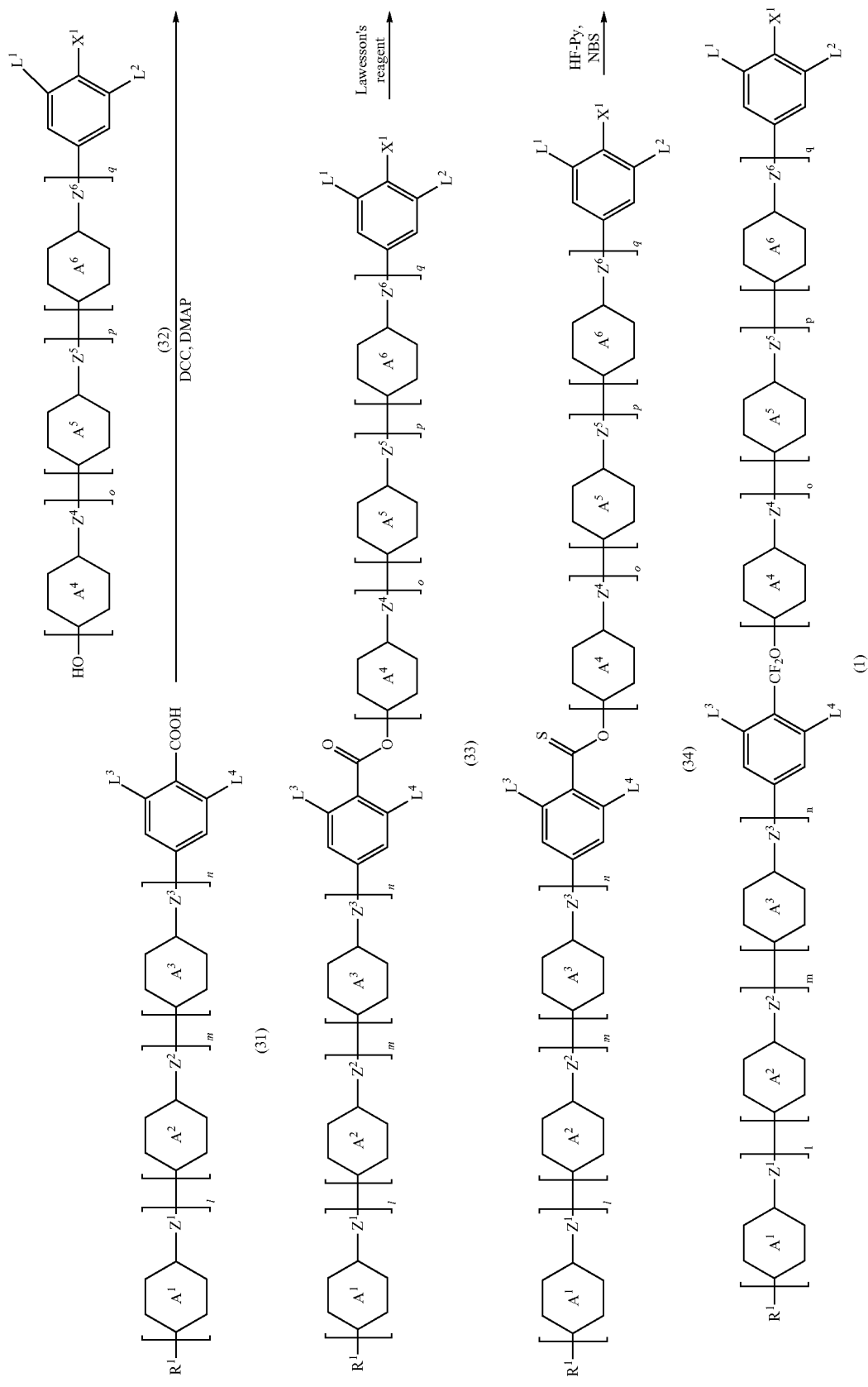

In these formulae, the rings $A^1$-$A^6$, $Z^1$-$Z^6$, $L^1$-$L^4$, $R^1$, $X^1$, l, m, n, o, p and q are defined as above.

For the compound represented by formula (1), in a case where l=m=n=1 and o=p=q=0, or in a case where o=1 and the ring $A^4$ is 1,4-phenylene or 1,4-phenylene with arbitrary hydrogen atom being replaced by a fluorine atom, the two methods below may be used for the synthesis.

Following the method described in U.S. Pat. No. 6,231,785 B1, a compound (35) is reacted with n-butyl lithium and then with dibromodifluoromethane to give a bromodifluoromethane derivative (36). The bromodifluoromethane derivative (36) is reacted with a phenol derivative (37) in the presence of a base, such as potassium carbonate, to synthesize the compound (1).

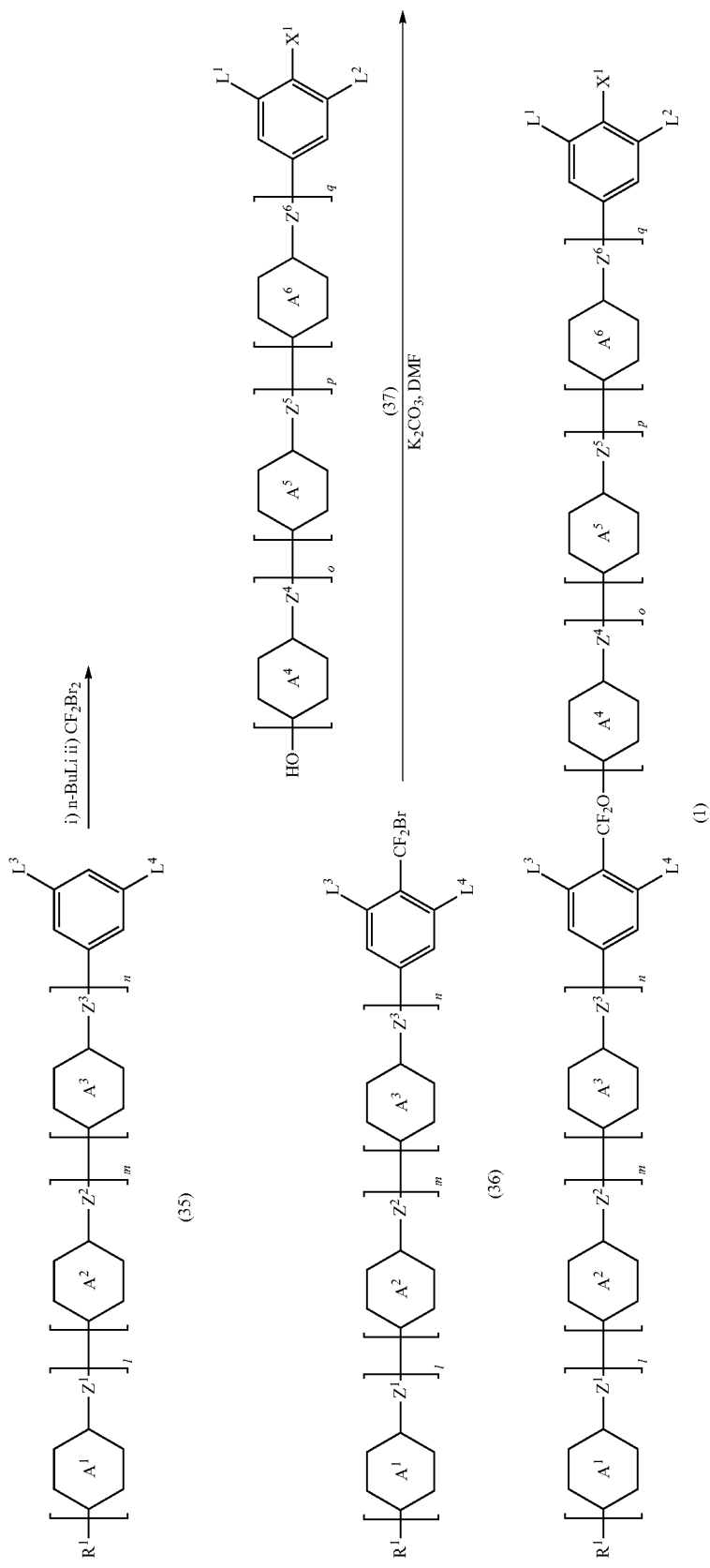

In these formulae, the ring $A^4$ is 1,4-phenylene, or 1,4-phenylene with arbitrary hydrogen atom being replaced by a fluorine atom. The rings $A^1$, $A^2$, $A^3$, $A^5$ and $A^6$, $Z^1$-$Z^6$, $L^1$-$L^4$, $R^1$, $X^1$, l, m, n, o, p and q are defined as above.

Following the method described in P. Kirsch et al., *Angew. Chem. Int. Ed.*, 2001, 40, 1480, a carboxylic acid derivative (31) is reacted with alkanedithiol and trifluoromethylsulfonic acid to give a dithianylium (38). The dithianylium (38) is reacted with a phenol derivative (37) then with $Et_3N$-3HF, and is then treated with bromine to give the compound (1).

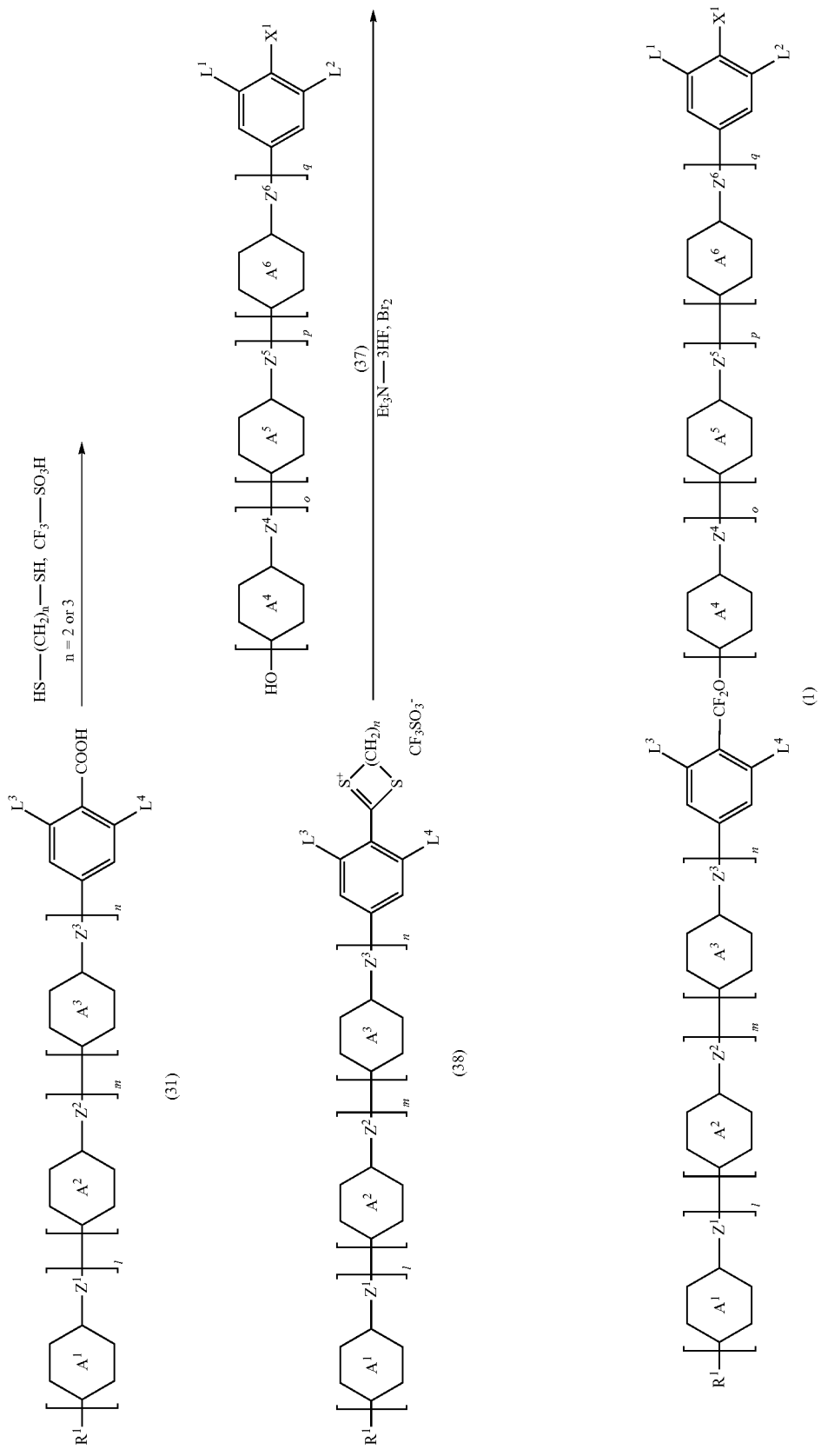

In these formulae, the ring $A^4$ is 1,4-phenylenea or 1,4-phenylene with arbitrary hydrogen atom being replaced by a fluorine atom. The rings $A^1$, $A^2$, $A^3$, $A^5$ and $A^6$, $Z^1$-$Z^6$, $L^1$-$L^4$, $R^1$, $X^1$, l, m, n, o, p and q are defined as above.

1-4-3-2. Synthesis of Compound (1) having 1,3-dioxan-2,5-diyl in Ring Structure

A compound (1) with 1,3-dioxan-2,5-diyl in ring structure can be synthesized by the method below, for example. An aldehyde derivative (40) is reacted with a propanediol derivative (39) in the presence of an acid catalyst, such as p-toluenesulfonic acid, to synthesize an intermediate product (41) having a dioxane ring. By using the intermediate product (41) instead of the compound (35), the target compound is produced according to the above method for synthesizing the compound (1).

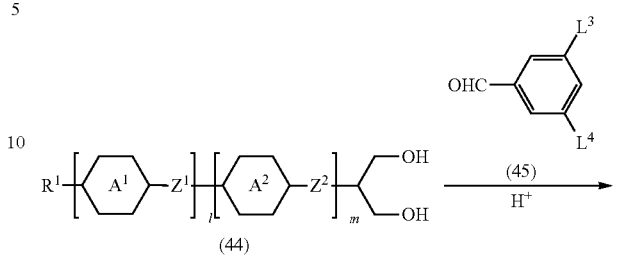

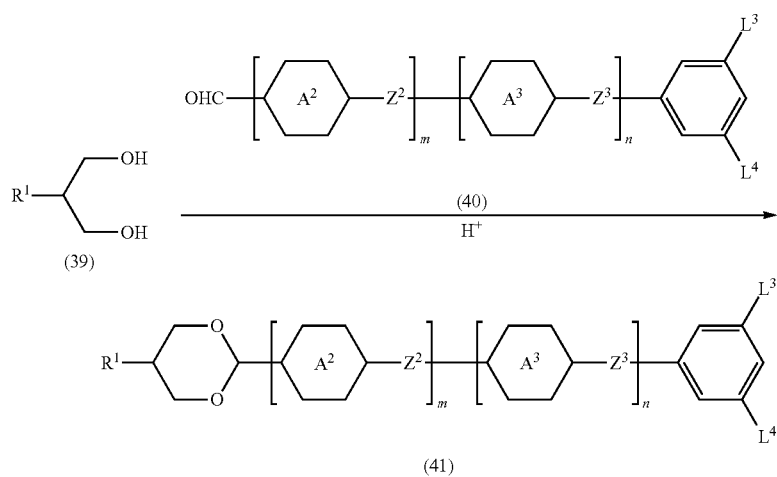

In these formulae, the rings $A^2$ and $A^3$, $Z^2$, $Z^3$, $L^3$, $L^4$, $R^1$, m and n are defined as above.

A compound (1) in which the ring $A^2$ or $A^3$ is 1,3-dioxan-2,5-diyl can be synthesized as follows. A bromide (42) is reacted with diethyl malonate in the presence of sodium ethoxide to give a diethyl malonate derivative (43), which is then reduced to give a propanediol derivative (44). The target compound is produced by forming a dioxane ring using the same method described above.

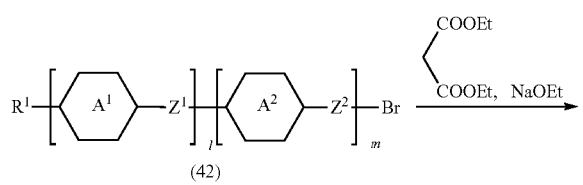

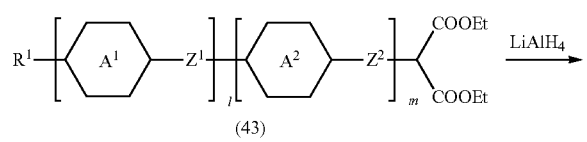

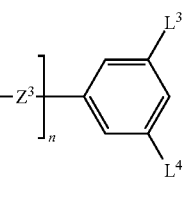

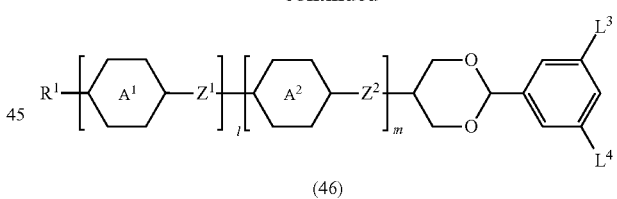

In these formulae, the rings $A^1$ and $A^2$, $Z^1$, $Z^2$, $L^3$, $L^4$, $R^1$, l and m are defined as above.

1-4-3-3. Synthesis of Phenol Derivative (37) as Starting material

As a starting material for synthesizing the compound (1), a phenol derivative (37), for example, may be synthesized based on the following method. To synthesize a compound of formula (37) with o=p=q=0, trialkyl borate is reacted with a Grignard reagent prepared from a bromobenzene derivative (47), and the resultant boric acid ester derivative is oxidized with peracetic acid (R. L. Kidwell et al., *Organic Syntheses*, Vol. 5, p. 918 (1973)), or is subjected to acid hydrolysis to give a boric acid derivative (48) and then oxidized with peracetic acid. Thus, the target phenol derivative (37-1) can be easily prepared.

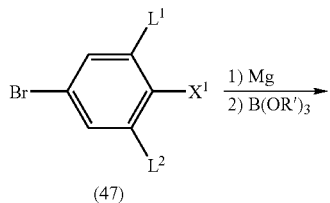

(47)

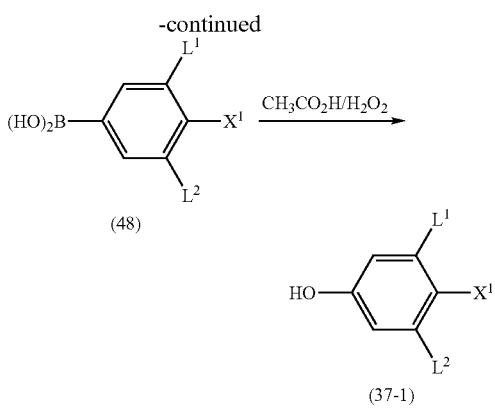

(48)

(37-1)

In the formula, $L^1$ and $L^2$ are defined as above, and $X^1$ is a hydrogen atom, a fluorine atom, a chlorine atom, trifluoromethyl, difluoromethyl, fluoroalkyl or trifluoro-methoxy.

In the formula (37), $Z^4$, $Z^5$ and $Z^6$ are each a single bond. In a case where o=p=0 and q=1, o=0 and p=q=1, or o=p=q=1, a compound (50) can be obtained, for example, by a coupling reaction of an anisole derivative (49) with a boric acid derivative (48) in the presence of tetrakis(triphenylphosphine)palladium(0) as catalyst and a base (Suzuki Akira et al. *Journal of Organic Synthetic Chemical Society*, Vol. 46, No. 9, p. 848 (1988)). Next, the compound (50) is reacted with boron tribromide for demethylation, so as to synthesize the target phenol derivative (37-2).

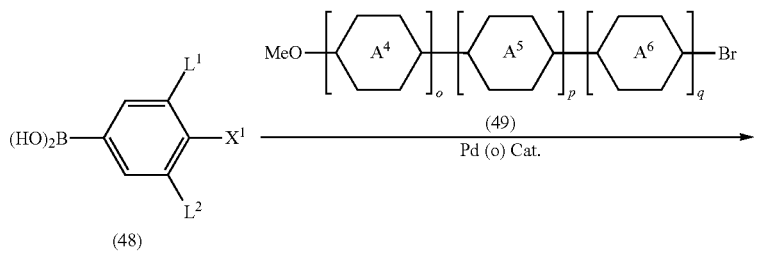

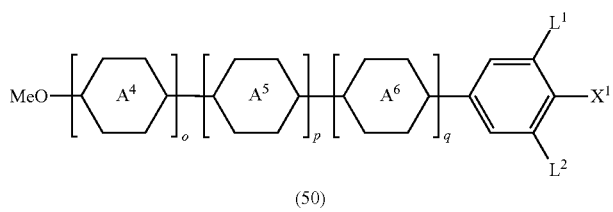

(50)

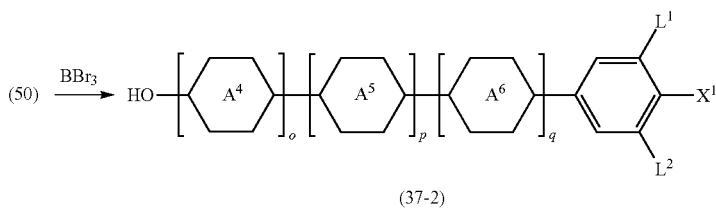

(37-2)

In the formula, the rings $A^4$-$A^6$, $L^1$, $L^2$, o, p and q are defined as above, and $X^1$ is a hydrogen atom, a fluorine atom, a chlorine atom, trifluoromethyl, difluoromethyl, fluoroalkyl or trifluoromethoxy.

In formula (37), $Z^4$, $Z^5$ and $Z^6$ are each a single bond. In a case where o=p=q=0, it can be synthesized by the following method. A benzyl ether derivative (51) is reacted with n- or sec-butyl lithium in THF at −70° C. or below and then with an trialkyl borate. The resultant boric acid ester derivative, or the boric acid derivative obtained by acid hydrolysis of the boric acid ester derivative, is oxidized with peracetic acid to give a phenol derivative (52). The phenol derivative (52) is converted to a phenolate using sodium hydride, and the phenolate is reacted with fluorobromoalkane for etherification. With subsequent catalytic hydrogenation for deprotection, the target phenol derivative (37-3) is synthesized.

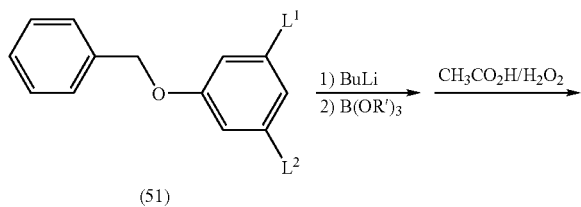

(51)

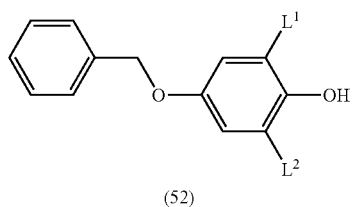

(52)

In the scope of the compound, a compound having a biphenyl structure at the right side of the linking group "CF$_2$O" like one with l=m=q=1, n=o=p=0 and Z$^6$ as a single bond, or a compound having a terphenyl structure like one with l=p=q=1 and both Z$^5$ and Z$^6$ as a single bond), or a compound having a tetraphenyl structure like the compound (1-33) with o=p=q=1 and Z$^4$, Z$^5$ and Z$^6$ all as a single bond, particularly can be synthesized by the method shown below. Specifically, a compound (53) is obtained similarly to the method for preparing a compound of formula (1) from the compound (35) and the phenol derivative (37-1) or (37-2). The compound (53) is reacted with n- or sec-butyl lithium for lithium modification, and then converted to an organometallic compound by adding zinc chloride. The organometallic compound is reacted with the above bromobenzene derivative (47), or a bromobenzene derivative (55) obtained with etherification of a compound (54) with fluoroalkyl, in the presence of tetrakis-(triphenylphosphine)palladium(0) as catalyst to synthesize the target compound.

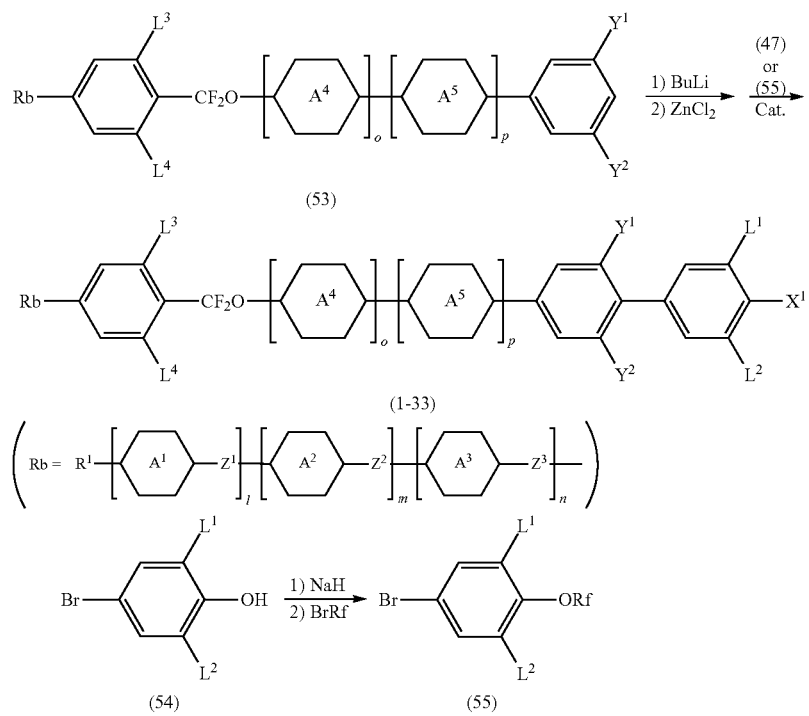

-continued

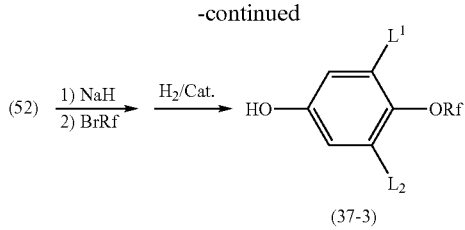

(37-3)

In the formula, L$^1$ and L$^2$ are defined as above and Rf denotes fluoroalkyl other than trifluoromethyl.

In the formula, the rings A$^1$-A$^5$, Z$^1$-Z$^3$, L$^1$-L$^4$, R$^1$ and X$^1$ are defined as above, Y$^1$ and Y$^2$ are a hydrogen atom or a fluorine atom and Rf is fluoroalkyl other than trifluoromethyl.

2. Compounds (2)-(8)

A second aspect of the invention relates to a liquid crystal composition that is prepared by adding a component selected from the components B, C and D shown below into a compound of formula (1), i.e., component A. As compared with a composition including the component A only, this liquid crystal composition can be freely adjusted for the driving voltage, the temperature range of liquid crystal phase, the optical anisotropy, the dielectric anisotropy and the viscosity, etc.

Preferably, the component to be added into the component A is a mixture containing a component B including at least one compound selected from the group consisting of formulae (2), (3) and (4), a component C including at least one compound selected from the group consisting of formula (5) or a component D including at least one compound selected from the group consisting of formulae (6), (7) and (8).

In addition, for each components of the liquid crystal composition used in the invention, they may contain isotopes because the isotopes do not much change the properties of the compound.

For the component B, suitable examples of the compound of formula (2) include formulae (2-1)-(2-8), suitable examples of the compound of formula (3) include formulae (3-1)-(3-26), and suitable examples of the compound of formula (4) include formulae (4-1)-(4-52).

(2-1)
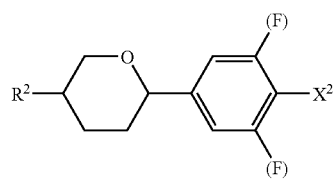

(2-2)
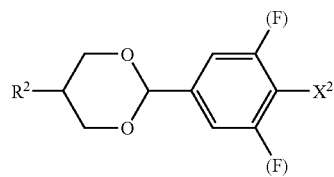

(2-3)
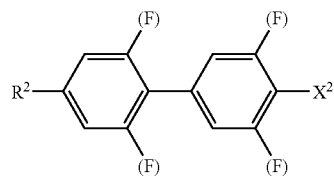

(2-4)
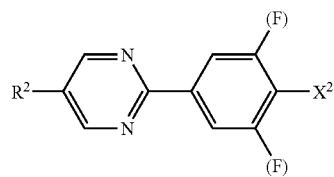

(2-5)
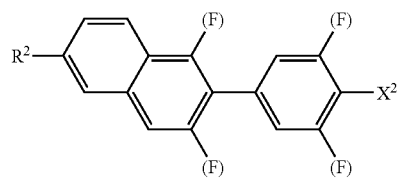

(2-6)
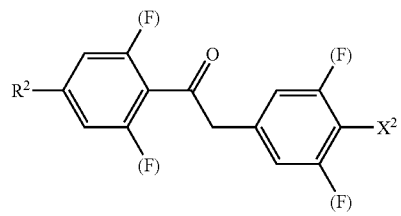

(2-7)
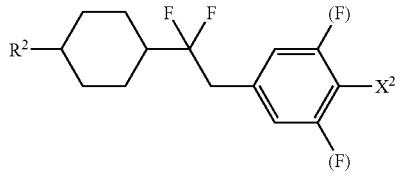

(2-8)
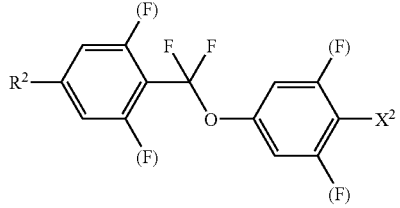

(3-1)
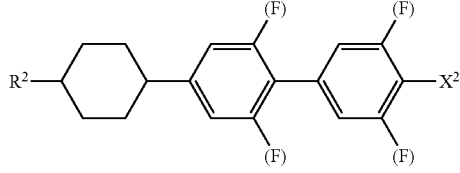

(3-2)
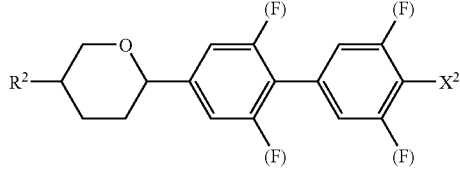

(3-3)
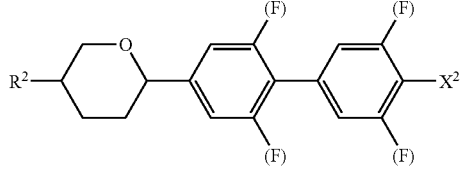

(3-4)
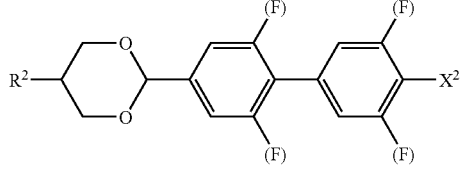

(3-5)
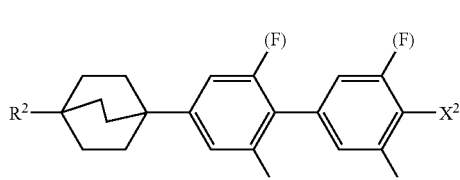

(3-6)
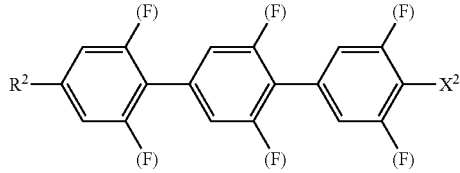

-continued
(3-7)
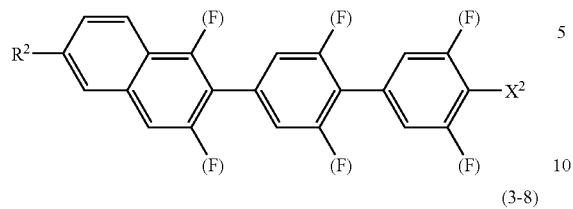
(3-8)
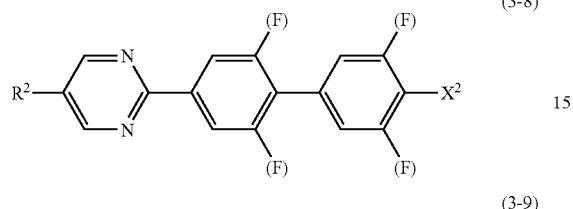
(3-9)
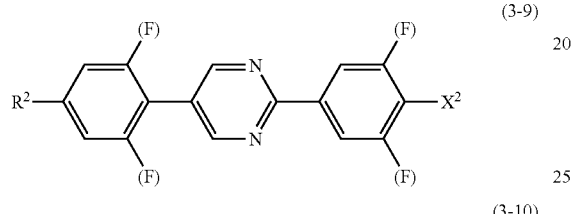
(3-10)
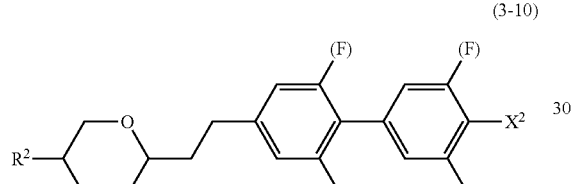
(3-11)
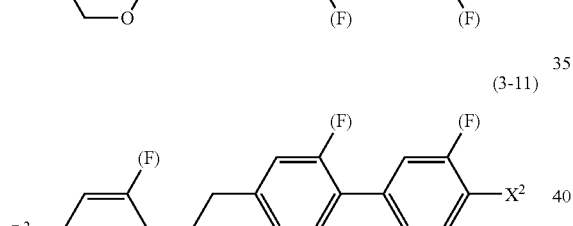
(3-12)
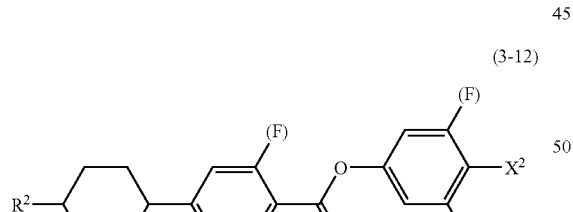
(3-13)
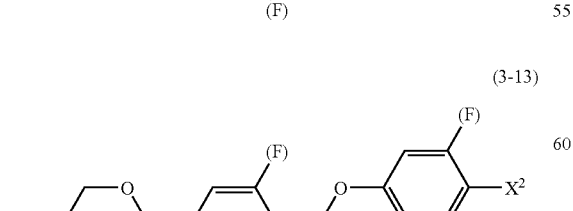
-continued
(3-14)
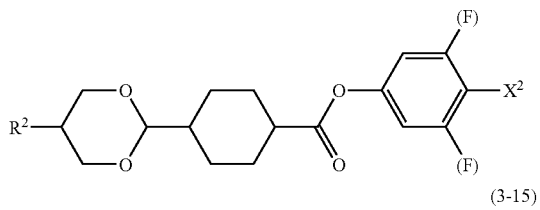
(3-15)
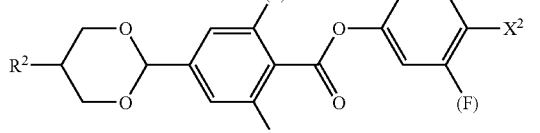
(3-16)
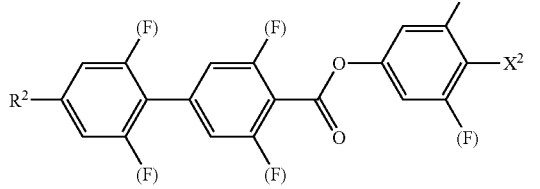
(3-17)
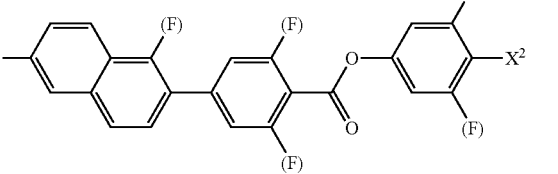
(3-18)
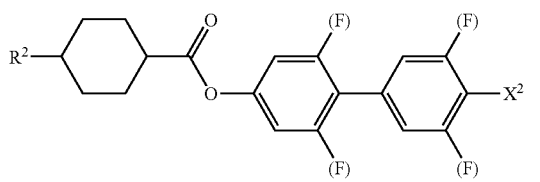
(3-19)
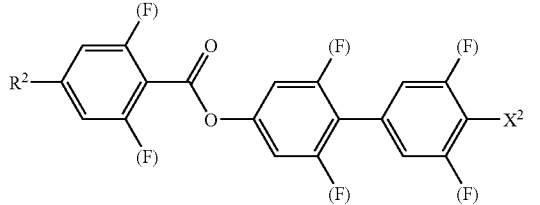
(3-20)
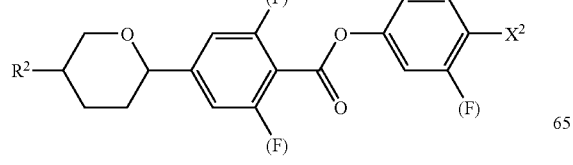

-continued
(3-21)
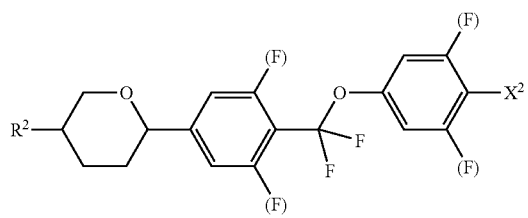
(3-22)
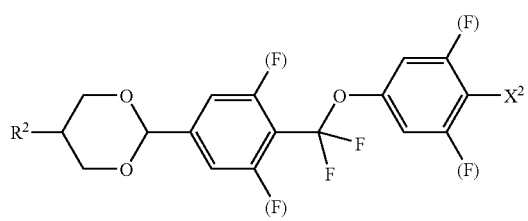
(3-23)
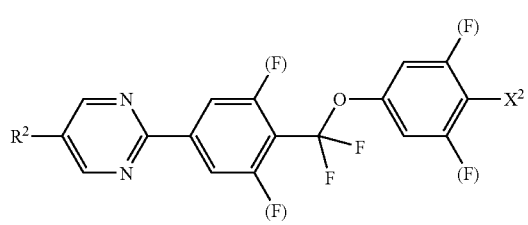
(3-24)
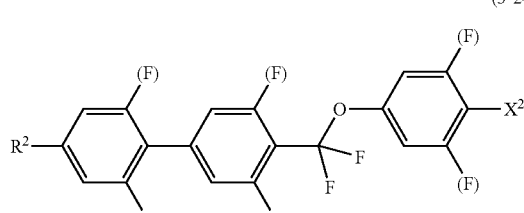
(3-25)
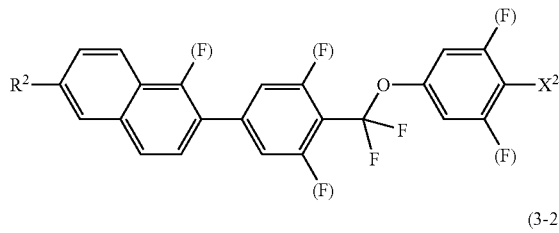
(3-26)
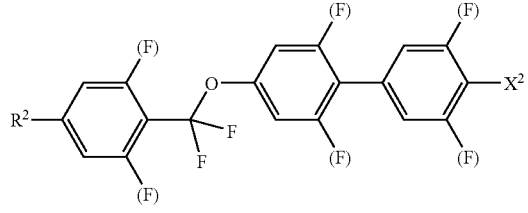
(4-1)
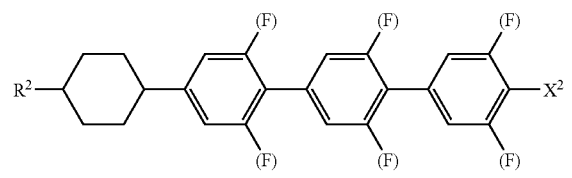
-continued
(4-2)
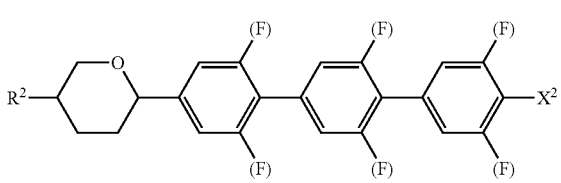
(4-3)
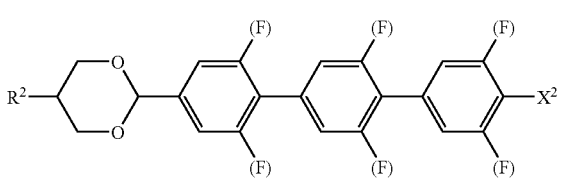
(4-4)
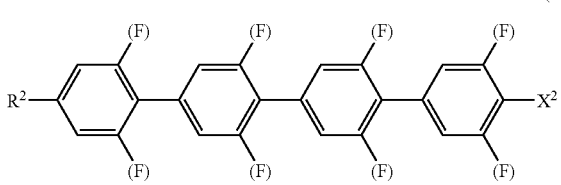
(4-5)
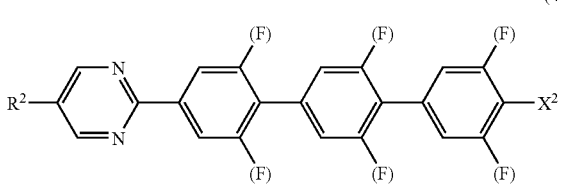
(4-6)
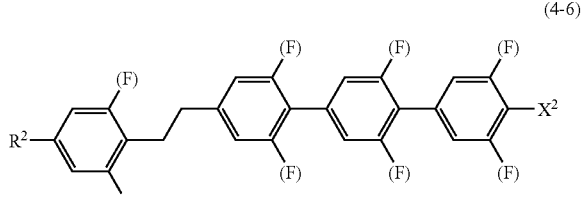
(4-7)
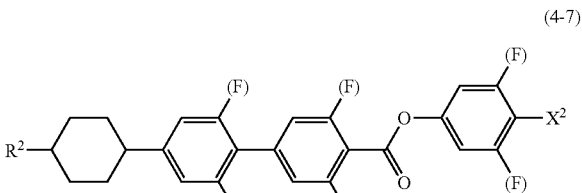
(4-8)
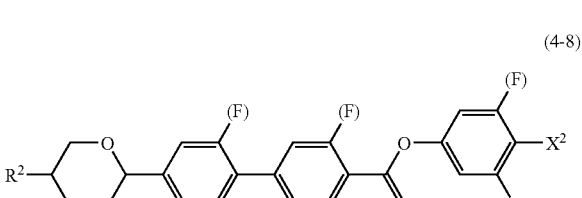

(4-9)
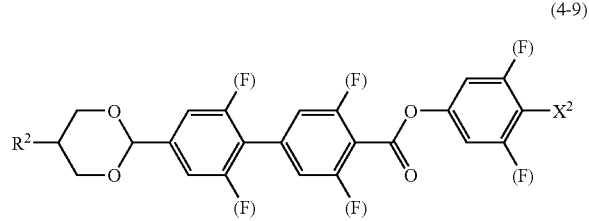
(4-10)
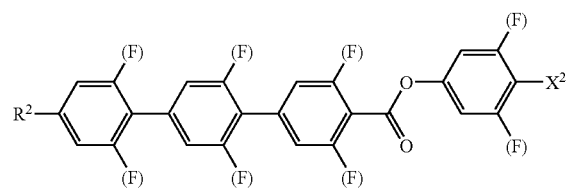
(4-11)
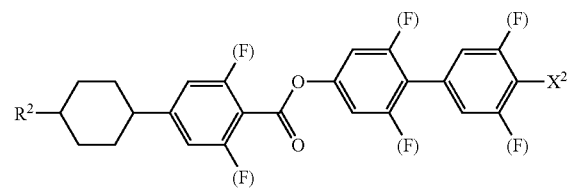
(4-12)
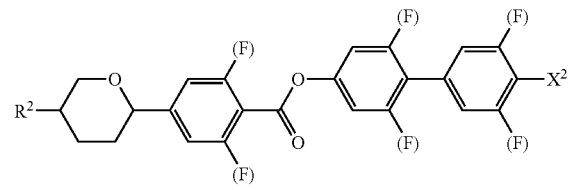
(4-13)
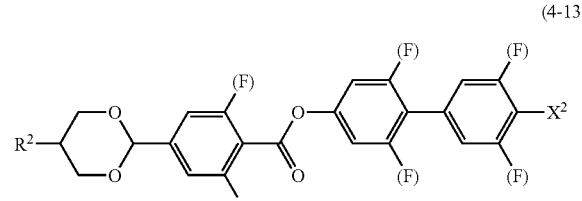
(4-14)
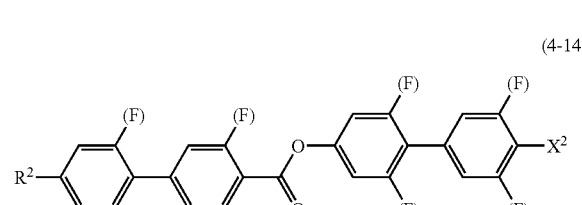
(4-15)
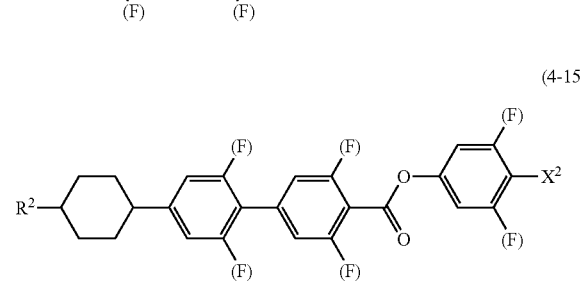
(4-16)
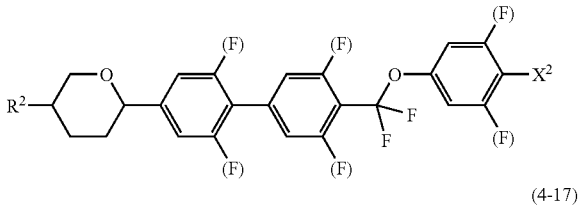
(4-17)
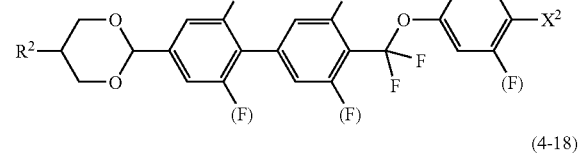
(4-18)
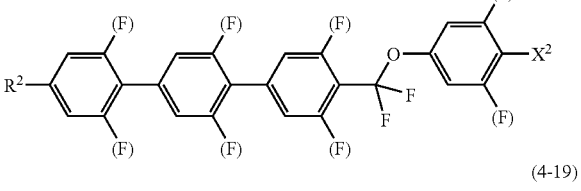
(4-19)
(4-20)
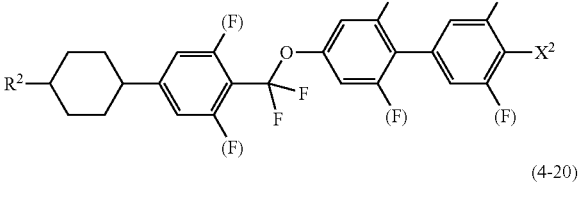
(4-21)
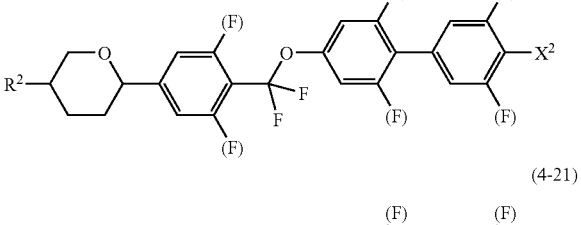
(4-22)
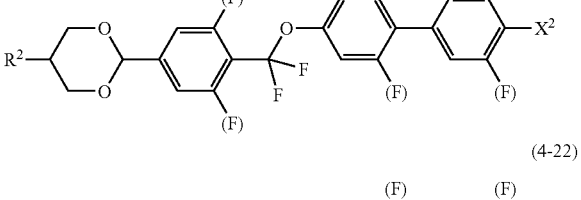
In the formulae, $R^2$ and $X^2$ are defined as above and (F) denotes a hydrogen atom or a fluorine atom.
The compounds represented by formulae (2)-(4), i.e., component B, are suitable in preparing a liquid crystal composition for active driving, such as TFT driving, for they have positive dielectric anisotropy and very good thermal stability or chemical stability. The content of the component B in the liquid crystal composition of the invention is suitably 1-99 wt %, preferably 10-97 wt %, relative to the total weight of the liquid crystal composition. Further, the viscosity can be adjusted by further including at least one of the compounds represented by formulae (7)-(9), i.e., component D.

Suitable examples of the compound represented by formula (5), i.e., component C, include formulae (5-1)-(5-37) below.

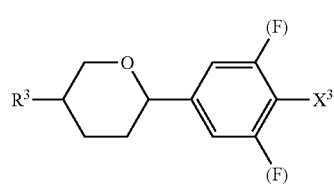
(5-1)

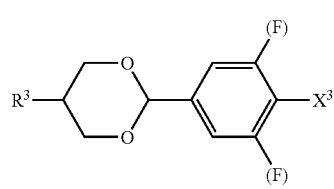
(5-2)

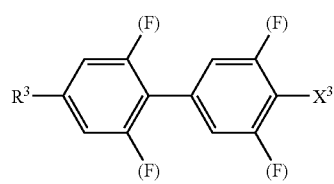
(5-3)

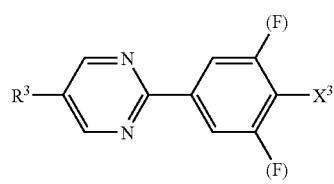
(5-4)

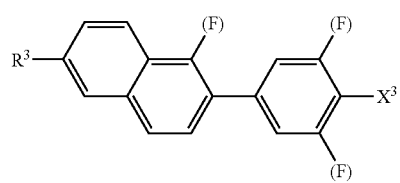
(5-5)

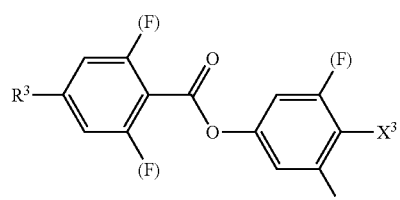
(5-6)

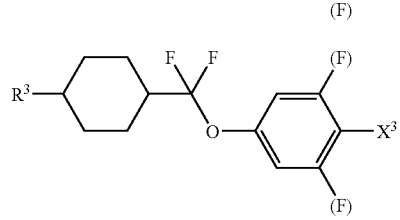
(5-7)

-continued

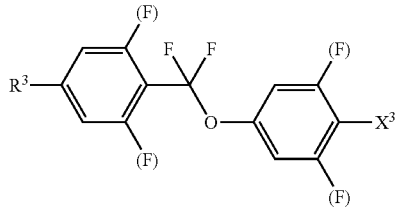
(5-8)

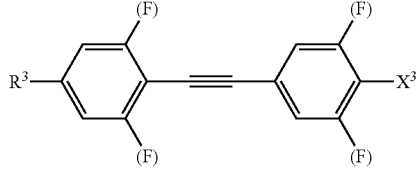
(5-9)

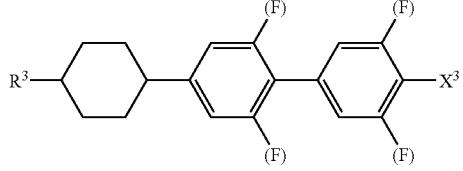
(5-10)

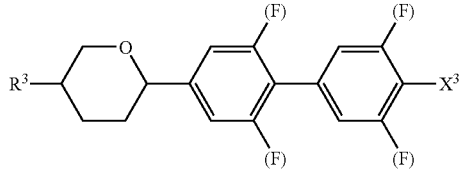
(5-11)

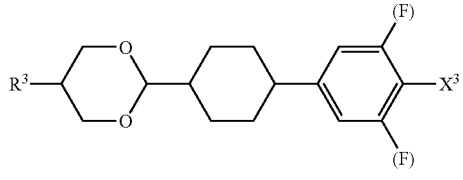
(5-12)

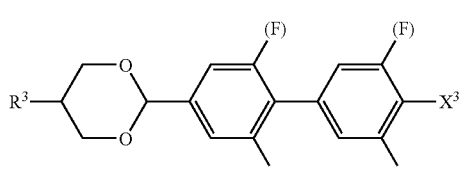
(5-13)

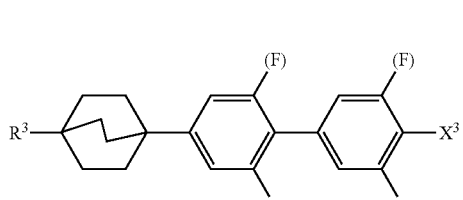
(5-14)

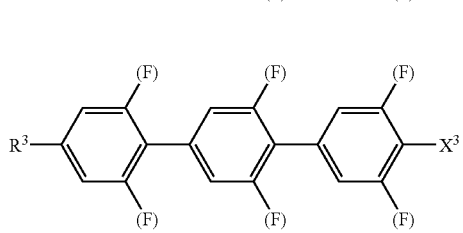
(5-15)

-continued (5-30)
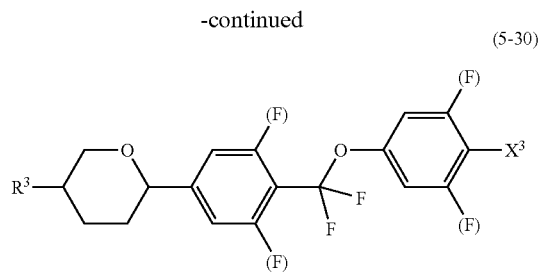

(5-31)

(5-32)

(5-33)

(5-34)
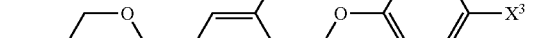

(5-35)
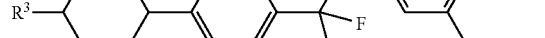

(5-36)
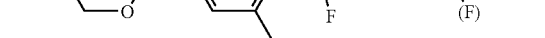

(5-37)

In these formulae, $R^3$ and $X^3$ are defined as above.

A compound represented by formula (5), i.e., component C, is mainly used in cases where the driving voltage of a device driven in an optically isotropic liquid crystal phase is to be reduced, as having a large positive dielectric anisotropy. In addition, the compound may be used to adjust the viscosity, to adjust the optical anisotropy and to broaden the temperature range of liquid crystal phase.

The content of the component C is preferably 0.1-99.9 wt %, more preferably 10-97 wt %, elative to the total weight of the composition.

Suitable examples of the compounds respectively represented by formulae (6), (7) and (8), i.e., component D, include formulae (6-1)-(6-11), (7-1)-(7-18) and (8-1)-(8-6).

File: 28690usf (8-1)
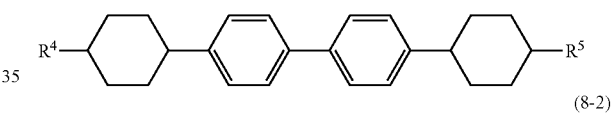

(8-2)
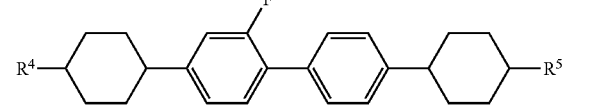

(8-3)
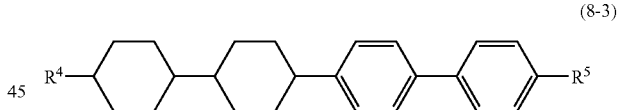

(8-4)
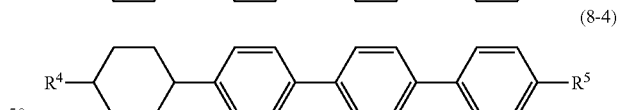

(8-5)
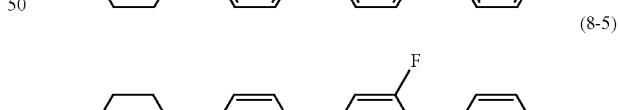

(8-6)
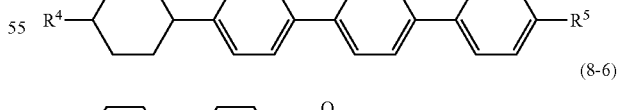

In the formulae, $R^4$ and $R^5$ are defined as above.

The compounds respectively represented by formula (6)-(8), i.e., liquid crystal component D, have a dielectric anisotropy with a small absolute value, and are nearly neutral. A compound represented by formula (6) mainly has an effect of adjusting the viscosity or adjusting the optical anisotropy, while a compound represented by formula (7) or (8) has an effect of raising the clearing point and broadening the temperature range of the nematic phase, or an effect of adjusting the optical anisotropy.

As the content of the compound represented by the component D is increased, the driving voltage of the liquid crystal composition is increased and the response speed is raised. Hence, it is desired to have a high content of D, so long as the requirement on the driving voltage of the liquid crystal composition can be met. The content of the component D is preferably 40 wt % or less, more preferably 20 wt % or less, relative to the total weight of the composition.

The liquid crystal composition of the invention typically may be prepared with a well-known method, for example, a method of dissolving necessary components at a high temperature.

4. Composition having an Optically Isotropic Liquid Crystal Phase

4-1. Components of a Composition having an Optically Isotropic Liquid Crystal Phase A third aspect of the invention relates to a composition including a compound of formula (1) and a chiral dopant, which can be used as a liquid crystal composition in an optical device driven in an optically isotropic liquid crystal phase. The liquid crystal composition exhibits an optically isotropic liquid crystal phase. The chiral dopant is preferably present in an amount of 1-40 wt %, more preferably 3-25 wt % and more preferably 5-15 wt %, relative to the total weight of the liquid crystal composition. A liquid crystal composition including a chiral dopant in such a range is preferred due to the ease of developing an optically isotropic liquid crystal phase. There may be one chiral dopant, or two or more chiral dopants, contained in the liquid crystal composition.

4-2. Chiral Dopant

The chiral dopant included in the optically isotropic liquid crystal composition is preferably a compound having a large helical twisting power. With a chiral dopant having a large helical twisting power, the dosage required for providing a desired pitch is reduced preventing a raise of the driving voltage, which is advantageous in practice. Specifically, the compounds represented by formulae (K1)-(K5) are preferred.

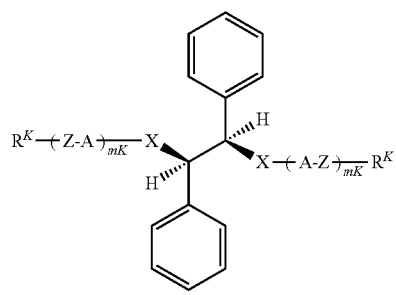

(K1)

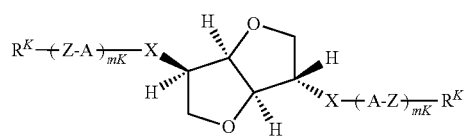

(K2)

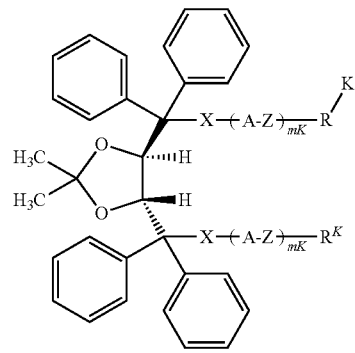

(K3)

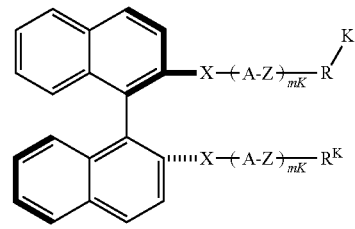

(K4)

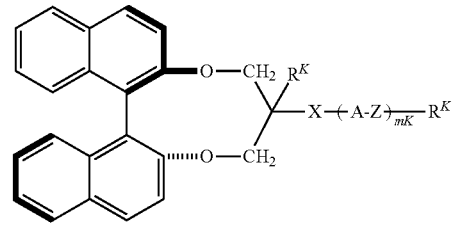

(K5)

In formulae (k1)-(K5), each $R^K$ is independently a hydrogen atom, a halogen atom, —C≡N, —N=C=O, —N=C=S, or $C_1$-$C_{20}$ alkyl wherein arbitrary —CH$_2$— may be replaced by —O—, —S—, —COO—, —OCO—, —CH=CH—, —CF=CF— or —C≡C— and arbitrary hydrogen atom may be replaced by a halogen atom. Each A is independently an aromatic or non-aromatic 3- or 8-membered ring, or a fused ring of 9 or more carbon atoms, wherein arbitrary hydrogen atom may be replaced by a halogen atom, or alkyl or haloalkyl of 1-3 carbon atoms, —CH$_2$— may be replaced by —O—, —S— or —NH—, and —CH= may be replaced by —N=. Each Z is independently a single bond, or $C_1$-$C_8$ alkylene wherein arbitrary —CH$_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom. X is a single bond, —COO—, —OCO—, —CH$_2$O—, —OCH$_2$—, —CF$_2$O—, —OCF$_2$— or —CH$_2$CH$_2$—, and mK is 1-4.

In the scope of these compounds, formulae (K2-1)-(K2-8) in the scope of formula (K2) and formulae (K5-1)-(K5-3) in the scope of formula (K5) are preferred as the chiral dopant to be added in the liquid crystal composition.

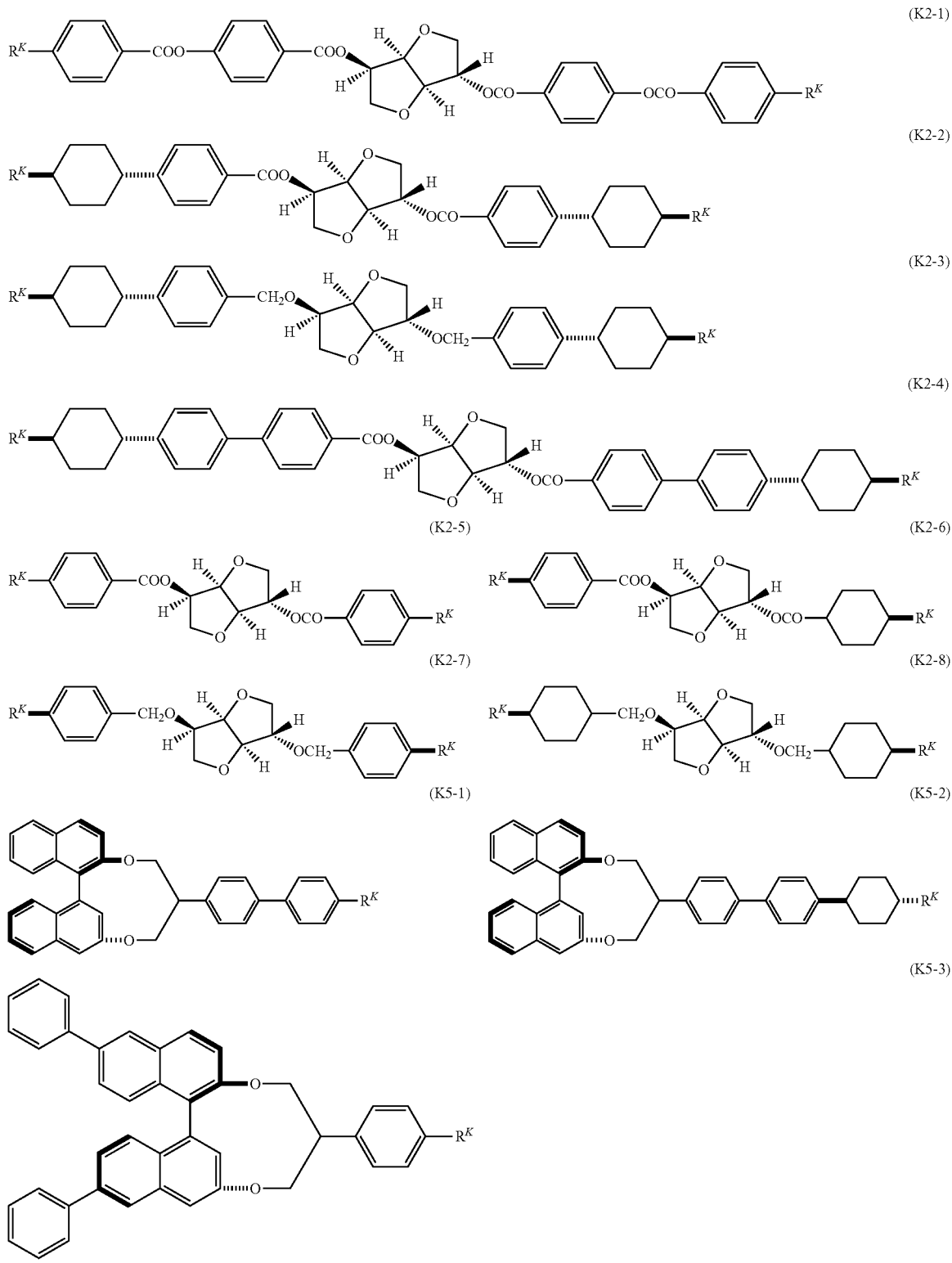

In these formulae, each $R^K$ is independently $C_3$-$C_{10}$ alkyl wherein the —$CH_2$— directly bonded to a ring may be replaced by —O— and arbitrary —$CH_2$— may be replaced by —CH=CH—.

4-3. Optically Isotropic Liquid Crystal Phase

"A liquid crystal composition has optical isotropy" means that the liquid crystal composition shows optical isotropic nature as the liquid crystal molecule arrangement is macroscopically isotropic, while microscopic liquid crystal order is present. The pitch corresponding to the microscopic liquid crystal order of the composition (often abbreviated to "pitch", hereafter) is preferably 700 nm or less, more preferably 500 nm or less and even more preferably 350 nm or less.

Here, the so-called "isotropic phase" refers to a commonly defined isotropic phase (i.e., disorder phase), that is, a phase which exhibits isotropy due to fluctuation even if a region with a local order parameter not equal to zero is formed. For example, an isotropic phase at the high temperature side of a nematic phase is equivalent to a non-liquid crystal isotropic phase in this specification. The same definition also applies for a chiral liquid crystal in this specification. Also, in this specification, the so-called "optically isotropic liquid crystal phase" denotes a phase exhibiting optically isotropy without fluctuation, one example of which is a phase exhibiting a platelet structure, i.e., a blue phase in the narrow sense.

In the optically isotropic liquid crystal composition of the invention, there is an optically isotropic liquid crystal phase, but a typical platelet structure in a blue phase is not observed by a polarizing microscope. Accordingly, in this specification, a phase exhibiting a platelet structure refers to a blue phase, and an optically isotropic liquid crystal phase including a blue phase refers to an optically isotropic liquid crystal phase. That is, the blue phase is included in the optically isotropic liquid crystal phase.

Generally, blue phases may be classified into three types, blue phase I, blue phase II and blue phase III, which are all optically active and isotropic. In a blue phase I or II, two or more colors of diffracted light produced by Bragg reflection from various lattice planes may be observed. The blue phase is typically observed between the isotropic phase and the chiral nematic phase. "The optically isotropic liquid crystal phase does not exhibit two or more colors of diffracted light" means that a platelet structure observed in a blue phase I or II is not observed and the phase approximately exhibits a single color in the entire plane. For an optically isotropic liquid crystal phase not exhibiting two or more colors of diffracted light, the brightness/darkness of the color is not necessarily even in the plane.

An optically isotropic liquid crystal phase not exhibiting two or more colors of diffracted light has an advantage of restraining the intensity of the reflected light caused by Bragg reflection or shifting toward the short wavelength side. In addition, when a liquid crystal material reflecting visible light is used in a display device, sometimes a color variation problem may occur. However, for a liquid crystal not exhibiting two or more colors of diffracted light, the reflection of visible light may be eliminated due to the pitch larger than that in a blue phase in the narrow sense (a phase exhibiting a platelet structure), as a result of reflection wavelength shift toward the short wavelength side.

The optically isotropic liquid crystal composition of the invention may be obtained by adding a chiral dopant into a composition having a nematic phase, wherein the chiral dopant is preferably added in an amount such that the pitch is 700 nm or less. In addition, the composition having a nematic phase includes a compound represented by formula (1) and other necessary components. In addition, the optically isotropic liquid crystal composition of the invention may alternatively be obtained by adding a chiral dopant in a composition having a chiral nematic phase but no optically isotropic liquid crystal phase. The composition having a chiral nematic phase but no optically isotropic liquid crystal phase includes a compound represented by formula (1), an optically active compound and other necessary components, wherein the optically active compound is preferably added in an amount such that the pitch is 700 nm or more to exhibit the optically isotropic liquid crystal phase. The optically active compound to be added may be selected from the above compounds with large helical twisting power, i.e., the compounds respectively represented by the formulae (K1)-(K5), (K2-1)-(K2-8) and (K5-1)-(K5-3). In addition, the optically active compound added may not have a large helical twisting power. Such optically active compounds include, for example, the compounds added in a liquid crystal composition used in a device driven in a nematic phase (TN mode or STN mode, etc.).

Examples of the optically active compounds having no large helical twisting power include the following optically active compounds (Op-1)-(Op-13).

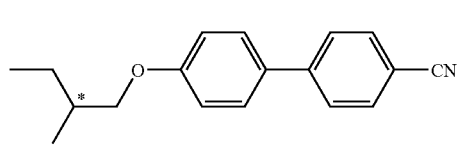 (Op-1)

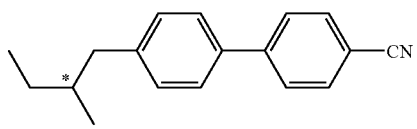 (Op-2)

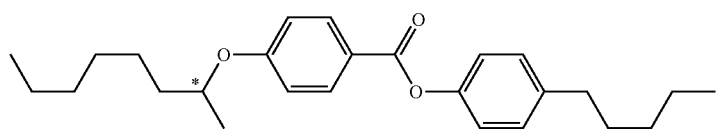 (Op-3)

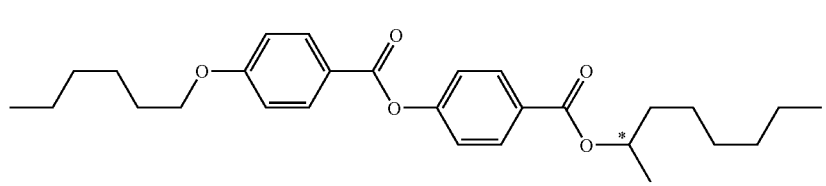 (Op-4)

-continued

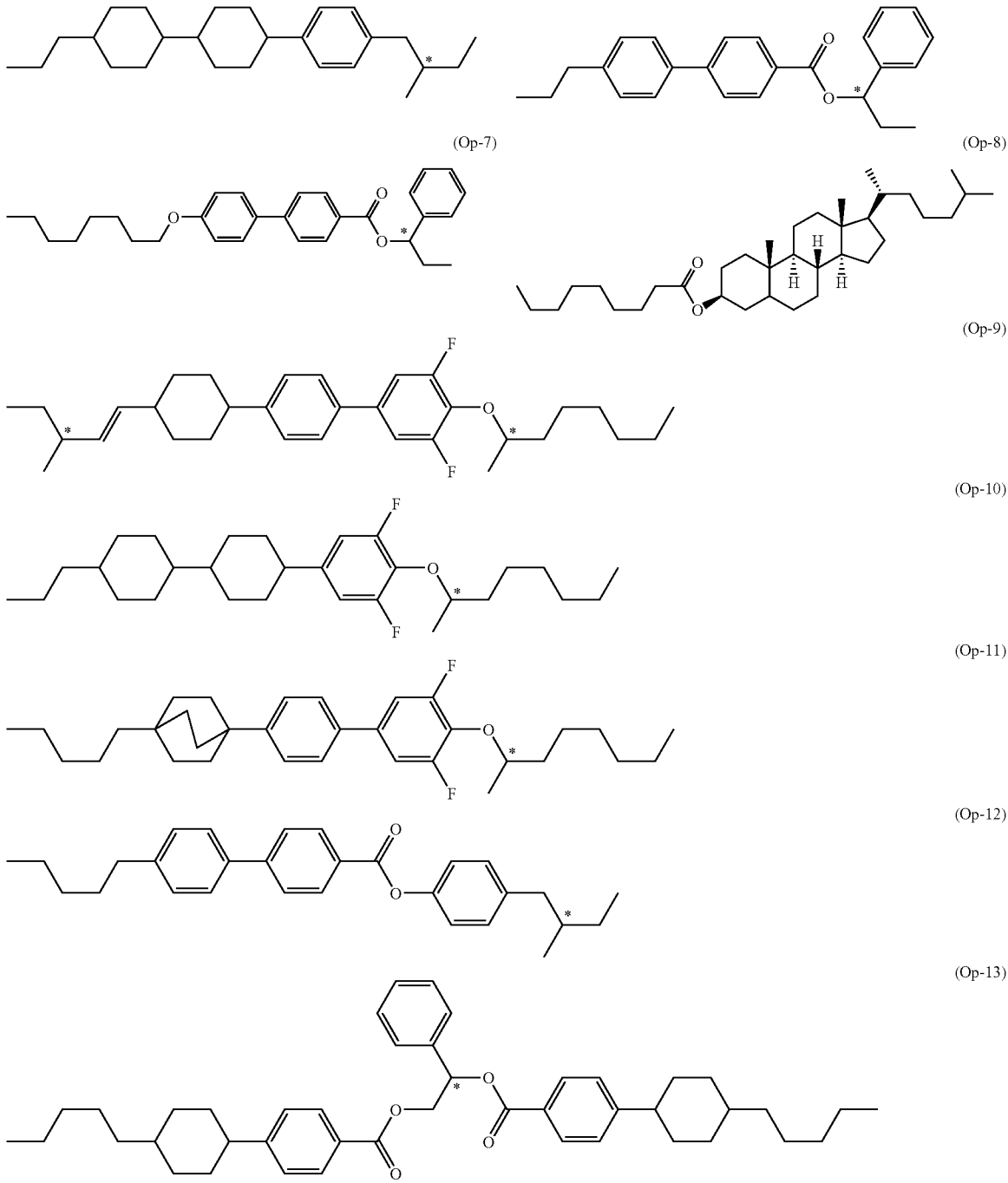

In addition, the temperature range of the optically isotropic liquid crystal composition of the invention may be broadening by adding a chiral dopant into a liquid crystal composition that has a wide coexistence temperature range of a nematic or chiral nematic phase and an isotropic phase for exhibiting an optically isotropic liquid crystal phase. For example, a composition exhibiting an optically isotropic liquid crystal phase in a wide temperature range may be prepared as follows. A liquid crystal compound having a high clearing point is mixed with a liquid crystal compound having a low clearing point, so as to form a liquid crystal composition with a wide coexistence temperature range of a nematic phase and an isotropic phase. A chiral reagent is then added in the liquid crystal composition prepared.

For a liquid crystal composition with a wide coexistence temperature range of a nematic or chiral nematic phase and an isotropic phase, the difference between the upper-limit temperature and the lower-limit temperature of the coexistence of the chiral nematic phase and the isotropic phase is preferably 3-150° C., more preferably 5-150° C. Further, the liquid crystal composition preferably has a difference of 3-150° C. between the upper-limit temperature and the lower-limit temperature of the coexistence of the nematic phase and the isotropic phase.

Because the greater the pitch is, the large the electric birefringence of the optically isotropic liquid crystal phase is, as a result, the electric birefringence can be increased by adjusting the species and content of the chiral dopant to make a larger pitch, so long as the requirements for other optical properties, such as transmittance, diffraction wavelength and so on, are satisfied.

4-4. Other Components

Other compounds, such as a polymer material, may be further added in the optically isotropic liquid crystal composition of the invention, so long as they do not affect the properties of the composition. In addition to the polymer material, the liquid crystal composition of the invention may also include, for example, a dichroic dye or a photochromic compound. Examples of the dichroic dye are merocyanine dyes, styryl dyes, azo dyes, azomethine dyes, azoxy dyes, quinophthalone dyes anthraquinone dyes and tetrazine dyes, etc.

5. Optically Isotropic Polymer/Liquid Crystal Composite

A fourth aspect of the invention relates to a liquid crystal composition/polymer composite material including a compound represented by formula (1) and a chiral dopant, which exhibits optical isotropy. The polymer/liquid crystal composite is an optically isotropic polymer/liquid crystal composite that can be used in an optical device driven in an optically isotropic liquid crystal phase. Such a polymer/liquid crystal composite may include a polymer and, for example, the liquid crystal composition (B) described in the $1^{st}$ to $18^{th}$ items described above. The polymer/liquid crystal composite of the invention has no particular limitation, so long as it includes both a liquid crystal material and a polymeric compound, in which the polymer is partly or fully dissolved in the liquid crystal material or is separated from the liquid crystal material. In addition, in this specification, a nematic phase excludes a chiral nematic phase and refers to a nematic phase in the narrow sense, unless specifically indicated.

The optically isotropic polymer/liquid crystal composite according to a preferred aspect of the invention can exhibit an optically isotropic liquid crystal phase in a wide temperature range. In addition, the polymer/liquid crystal composite according to a preferred aspect of the invention has a very high response speed. Based on such effects, the polymer/liquid crystal composite according to a preferred aspect of the invention is useful in an optical device like a display device, etc.

5-2. Polymer

The composite material of the invention can be prepared by mixing an optically isotropic liquid crystal composition with a pre-polymerized polymer, and preferably by mixing a low-molecular weight monomer, macromonomer or oligomer, etc., (generally called "monomer", hereinafter) as a polymer material with a liquid crystal composition B, followed by polymerization of the mixture. In this specification, the mixture including a monomer and a liquid crystal composition is called a "polymerizable monomer/liquid crystal mixture". A polymerizable monomer/liquid crystal mixture may optionally include a polymerization initiator, a curing agent, a catalyst, a stabilizer and a dichroic dye or photochromic compound, etc., so long as the effects of the invention are not affected. For example, the polymerizable monomer/liquid crystal mixture may optionally comprise 0.1-20 parts by weight of a polymerization initiator, relative to 100 parts by weight of the polymerizable monomer.

The polymerization temperature is preferably a temperature at which the polymer/liquid crystal composite exhibits high transparency and isotropy, more preferably a temperature at which the mixture of the monomer and the liquid crystal material exhibits an isotropic phase or a blue phase, and the polymerization is done in the isotropic phase or optically isotropic liquid crystal phase. That is, the polymerization temperature is preferably a temperature at which the polymerized polymer/liquid crystal composite does not substantially scatter the light at the long wavelength side of visible light and exhibits optical isotropy.

The starting material of the polymer in the composite material of the invention may be a low-molecular weight monomer, macromonomer or oligomer, for example. In this specification, the scope of the monomer as a starting material of polymer is intended to include low-molecular weight monomers, macromonomers and oligomers, etc. In addition, the polymer obtained preferably has a three-dimensional crosslinked structure. Accordingly, the monomer as a starting material of polymer preferably uses a polyfunctional monomer with two or more polymerizable functional groups. The polymerizable functional groups are not particularly limited, and may be, for example, acryl, methacryl, glycidyl, epoxy, oxetanyl or vinyl, etc., wherein acryl and methacryl are preferred in terms of polymerizing rate. The monomer as a starting material of polymer preferably includes 10 wt % or more of a monomer having two or more polymerizable functional groups, so that the composite material of the invention easily exhibits high transparency and isotropy. In addition, to obtain a suitable composite material, the polymer preferably has mesogenic moieties, and the monomers as starting materials of polymer may partially or entirely have a mesogenic moiety.

5-2-1. Mono-Functional or Di-Functional Monomer having a Mesogenic Moiety

The mono-functional or di-functional monomer having a mesogenic moiety is not particularly limited in the structure, and may be, for example, a compound represented by formula (M1) or formula (M2) below.

 (M1)

 (M2)

 (M3-1)

 (M3-2)

 (M3-3)

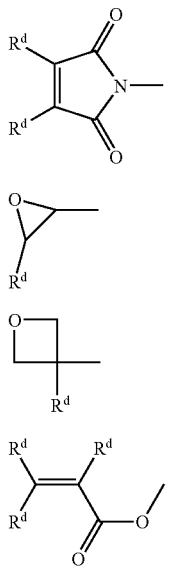

In formula (M1), $R^a$ is a hydrogen atom, a halogen atom, —C≡N, —N=C=O, —N=C=S, or $C_1$-$C_{20}$ alkyl wherein arbitrary —CH$_2$— may be replaced by —O—, —S—, —CO—, —COO—, —OCO—, —CH=CH—, —CF=CF— or —C≡C— and arbitrary hydrogen atom may be replaced by a halogen atom or —C≡N. $R^b$ is a polymerizable group selected from formulae (M3-1)-(M3-7).

Preferred examples of $R^a$ include a hydrogen atom, halogen atom, —C≡N, —CF$_3$, CF$_2$H, —CFH$_2$, —OCF$_3$, —OCF$_2$H, $C_1$-$C_{20}$ alkyl, $C_1$-$C_{19}$ alkoxy, $C_2$-$C_{21}$ alkenyl and $C_2$-$C_{21}$ alkynyl. Particularly preferred examples include —C≡N, $C_1$-$C_{20}$ alkyl and $C_1$-$C_{19}$ alkoxy.

In formula (M2), each $R_b$ is independently a polymerizable group selected from formulae (M3-1)-(M3-7).

Here, each $R^d$ in formulae (M3-1)-(M3-7) is independently a hydrogen atom, a halogen atom, or $C_1$-$C_5$ alkyl wherein arbitrary hydrogen atom may be replaced by a halogen atom. Preferred examples of $R^d$ include a hydrogen atom, a halogen atom, and methyl. Particularly preferred examples of $R^d$ include a hydrogen atom, a fluorine atom and methyl. In addition, the formula (M3-2), (M3-3), (M3-4) or (M3-7) is preferably synthesized through free radical polymerization. The formula (M3-1), (M3-5) or (M3-6) is preferably synthesized through cationic polymerization. The aforementioned polymerization reactions are living polymerization reactions, and thus the production of a small amount of free radical or active cationic species in the reaction system can initiate the polymerization. In order to accelerate formation of the active species, a polymerization initiator may be used. For this purpose, for example, light or heat may be utilized.

In formulae (M1) and (M2), each $A^M$ is independently an aromatic or non-aromatic 5- or 6-memebered ring, or a fused ring of 9 or more carbon atoms, wherein —CH$_2$— may be replaced by —O—, —S—, —NH— or —NCH$_3$—, —CH= may be replaced by —N=, and arbitrary hydrogen atom may be replaced by a halogen atom, or $C_1$-$C_5$ alkyl or $C_1$-$C_5$ haloalkyl. Preferred examples of $A^M$ include 1,4-cyclohexylene, 1,4-cyclohexenylene, 1,4-phenylene, naphthalen-2,6-diyl, tetrahydronaphthalen-2,6-diyl, fluoren-2,7-diyl and bicyclo[2.2.2]octan-1,4-diyl, wherein arbitrary —CH$_2$— may be replaced by —O—, arbitrary —CH= may be replaced by —N=, and arbitrary hydrogen atom may be replaced by a halogen atom, $C_1$-$C_5$ alkyl or $C_1$-$C_5$ haloalkyl. In consideration of the stability of the compounds, —CH$_2$—O—CH$_2$— with the oxygen atoms being not adjacent to one another is preferred to —CH$_2$—O—O—CH$_2$— with the oxygen atoms being adjacent to one another. This is also true for sulphur.

Particularly preferred examples of $A^M$ include 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalen-2,6-diyl, tetrahydronaphthalen-2,6-diyl, fluoren-2,7-diyl, 9-methyl fluoren-2,7-diyl, 1,3-dioxan-2,5-diyl, pyridin-2,5-diyl and pyrimidin-2,5-diyl. Furthermore, the steric configuration of the above 1,4-cyclohexylene and 1,3-dioxan-2,5-diyl is preferably in the trans-form rather than in the cis-form. As 2-fluoro-1,4-phenylene is identical to 3-fluoro-1,4-phenylene in the structure, the latter is not exemplified. This also applies for the case of 2,5-difluoro-1,4-phenylene and 3,6-difluoro-1,4-phenylene, etc.

In formulae (M1) and (M2), each Y is independently a single bond, or $C_1$-$C_{20}$ alkylene wherein arbitrary —CH$_2$— may be replaced by —O—, —S—, —CH=CH—, —C≡C—, —COO— or —OCO—. Preferred examples of Y include a single bond, —(CH$_2$)$_{m2}$—, —O(CH$_2$)$_{m2}$— and —(CH$_2$)$_{m2}$O— (m2 is an integer of 1-20). Particularly preferred examples of Y include a single bond, —(CH$_2$)$_{m2}$—, —O(CH$_2$)$_{m2}$— and —(CH$_2$)$_{m2}$O— (m2 is an integer of 1-10). In consideration of the stability of the compound, —Y—$R^a$ and —Y—$R^b$ groups having no —O—O—, —O—S—, —S—O— or —S—S are preferred.

In formulae (M1) and (M2), each $Z^M$ is independently a single bond, —(CH$_2$)$_{m3}$—, —O(CH$_2$)$_{m3}$—, —(CH$_2$)$_{m3}$O—, —O(CH$_2$)$_{m3}$O—, —CH=CH—, —C≡C—, —COO—, —OCO—, —(CF$_2$)$_2$—, —(CH$_2$)$_2$—COO—, —OCO—(CH$_2$)$_2$—, —CH=CH—COO—, —OCO—CH=CH—, —C≡C—COO—, —OCO—C≡C—, —CH=CH—(CH$_2$)$_2$—, —(CH$_2$)$_2$—CH=CH—, —CF=CF—, —C≡C—CH=CH—, —CH=CH—C≡C—, —OCF$_2$—(CH$_2$)$_2$—, —(CH$_2$)$_2$—CF$_2$O—, —OCF$_2$— or —CF$_2$O— (m3 is an integer of 1-20).

Preferred examples of $Z^M$ include a single bond, —(CH$_2$)$_{m3}$—, —O(CH$_2$)$_{m3}$—, —(CH$_2$)$_{m3}$O—, —CH=CH—, —C≡C—, —COO—, —OCO—, —(CH$_2$)$_2$—COO—, —OCO—(CH$_2$)$_2$—, —CH=CH—COO—, —OCO—CH=CH—, —OCF$_2$— and —CF$_2$O—.

In formulae (M1) and (M2), m1 is an integer of 1-6. Preferred m1 is an integer from 1-3. When m1 is 1, the compound is a 2-ring compound with two 6-membered rings. When m1 is 2 or 3, the compound is a 3-ring or 4-ring compound. For example, when m1 is 1, the two $A^M$ may be the same or different. In addition, for example, when m1 is 2, the three $A^M$ (or two $Z^M$) may be the same or different. The same definition also applies for a case where m1 is an integer of 3-6. This also applies for the cases of $R^a$, $R^b$, $R^d$, $Z^M$, $A^M$ and Y.

The compounds of formula (M1) and (M2) may contain isotopes, such as $^2H$ (deuterium) and $^{13}C$, in an amount higher than the natural abundance, since the isotopes do not much affect the properties of the compound.

More preferred examples of the compounds (M1) and (M2) include the compounds (M1-1)-(M1-41) and (M2-1)-(M2-27) respectively represented by formulae (M1-1)-(M1-41) and (M2-1)-(M2-27). In such compounds, $R^a$, $R^b$, $R^d$, $Z^M$, $A^M$, Y and p are defined as in the case of formulae (M1) and (M2) described in the aspects of the invention.

The partial structures in the compounds (M1-1)-(M1-41) and (M2-1)-(M2-27) are described below in details. The structure (a1) denotes 1,4-phenylene with arbitrary hydrogen atom being replaced by a fluorine atom. The structure (a2) denotes 1,4-phenylene wherein arbitrary hydrogen atom may be replaced by a fluorine atom. The structure (a3) denotes 1,4-phenylene wherein arbitrary hydrogen atom may be replaced by a fluorine atom or methyl. The structure (a4) denotes fluorenyl wherein the hydrogen atom in the 9-position may be replaced by methyl.

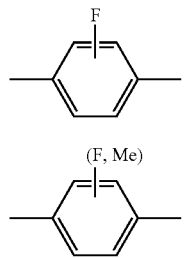
(a1)

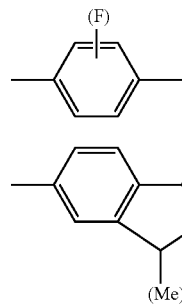
(a2)

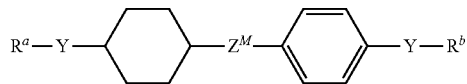
(a3)

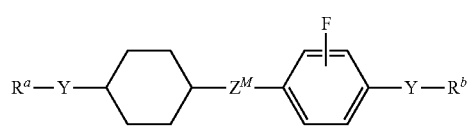
(a4)

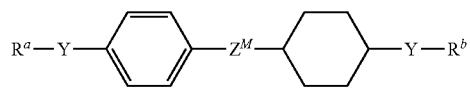
(M1-1)

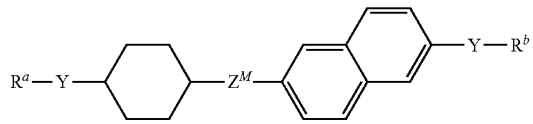
(M1-2)

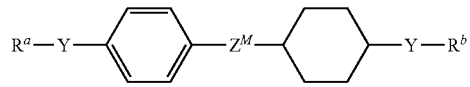
(M1-3)

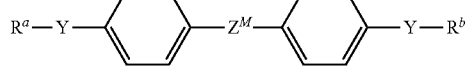
(M1-4)

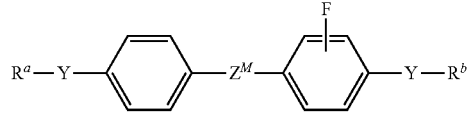
(M1-5)

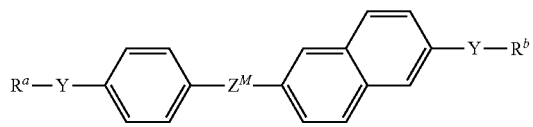
(M1-6)

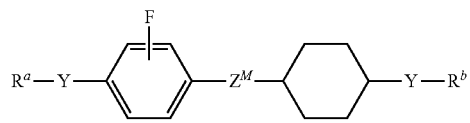
(M1-7)

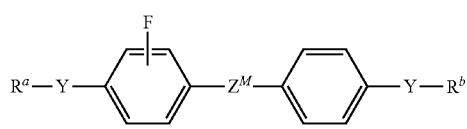
(M1-8)

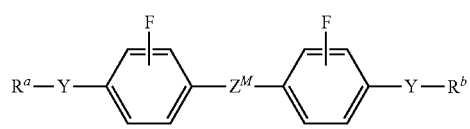
(M1-9)

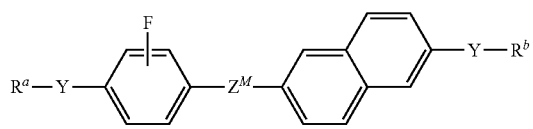
(M1-10)

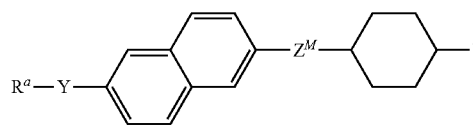
(M1-11)

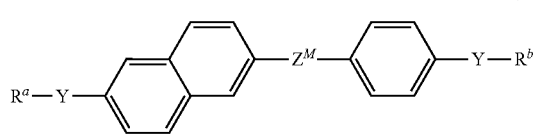
(M1-12)

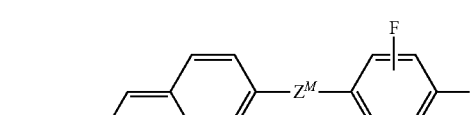
(M1-13)

(M1-14)

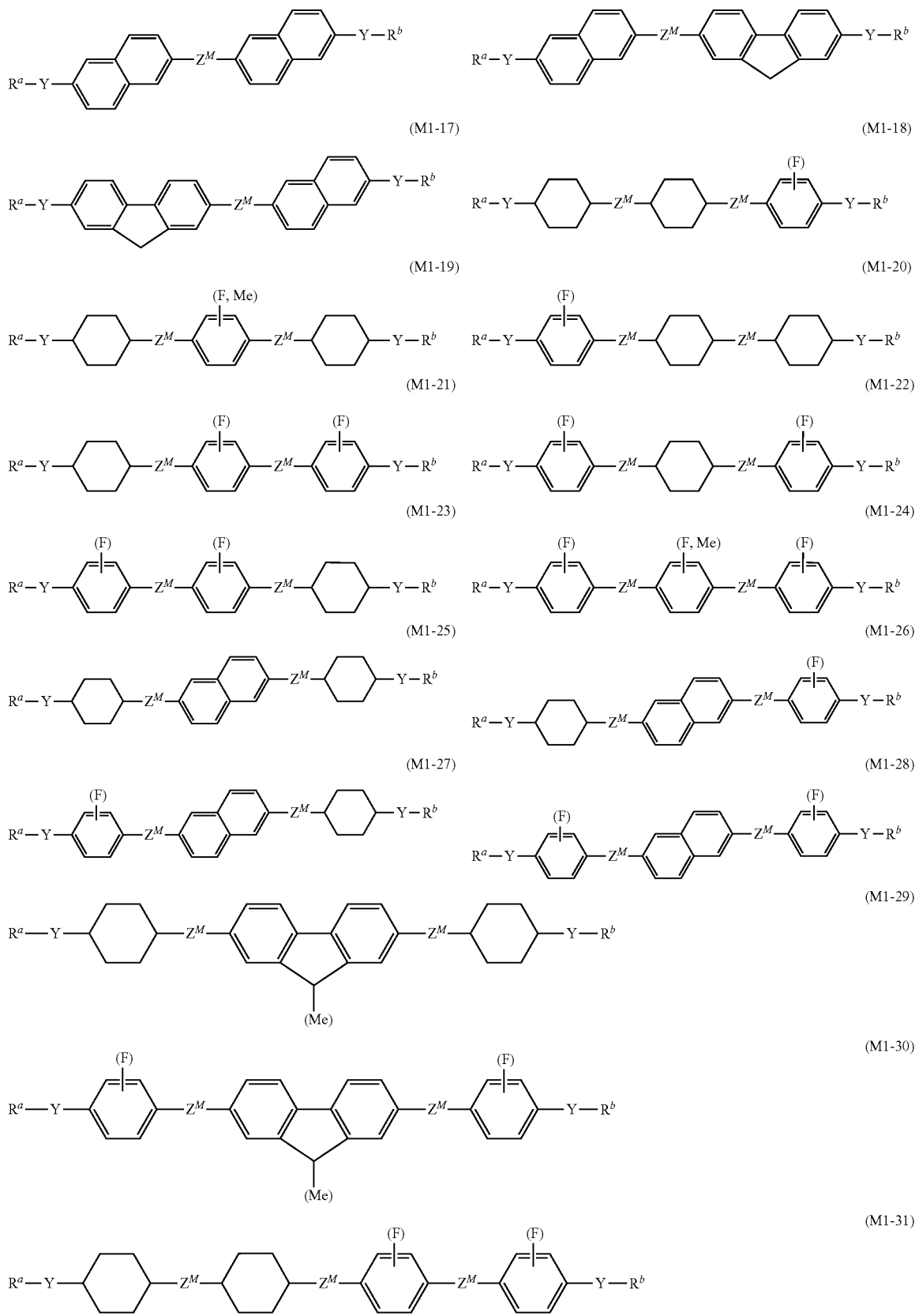

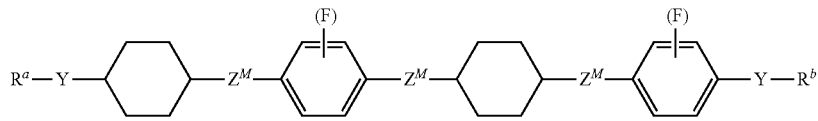 (M1-32)
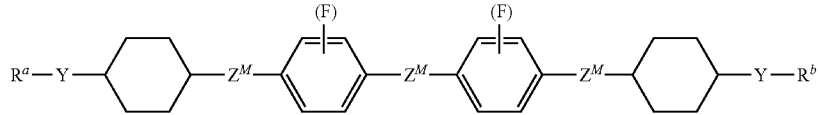 (M1-33)
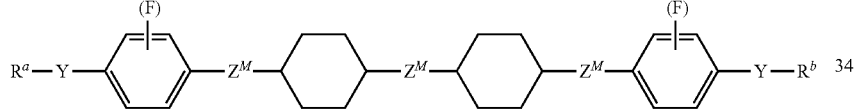 (M1-34)
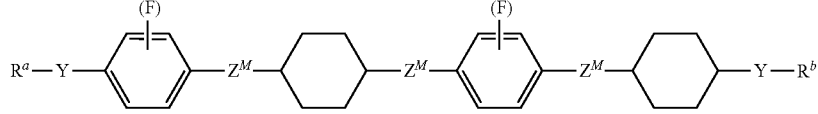 (M1-35)
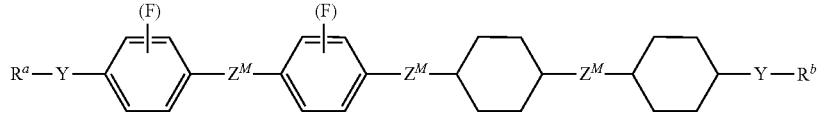 (M1-36)
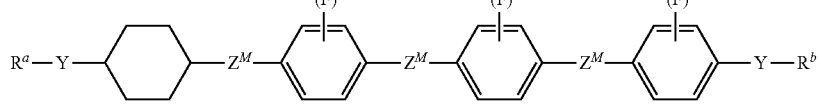 (M1-37)
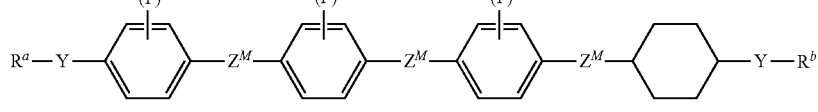 (M1-38)
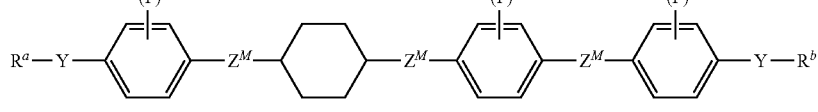 (M1-39)
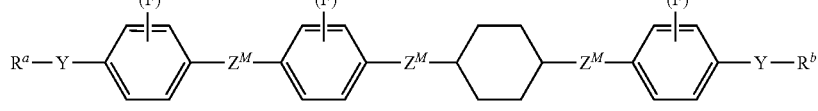 (M1-40)
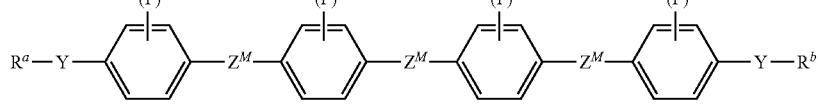 (M1-41)
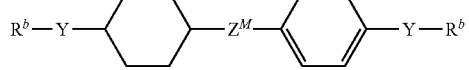 (M2-1)
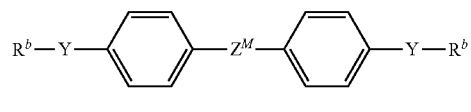 (M2-2)
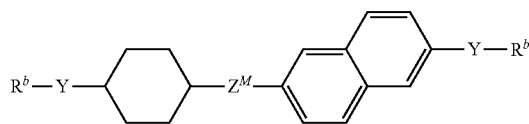 (M2-3) (M2-4)

-continued
(M2-5) 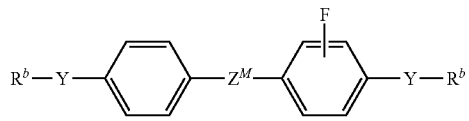
(M2-6) 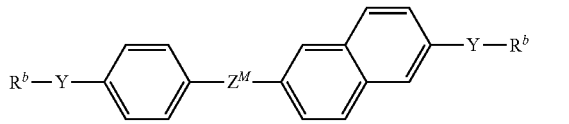
(M2-7) 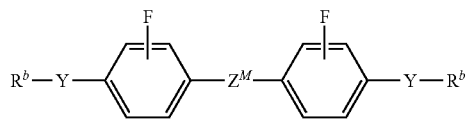
(M2-8) 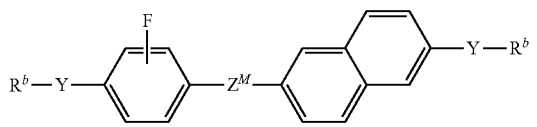
(M2-9) 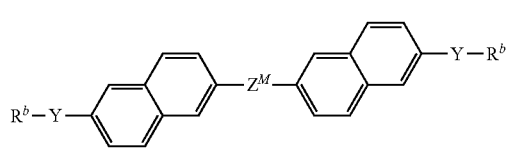
(M2-10) 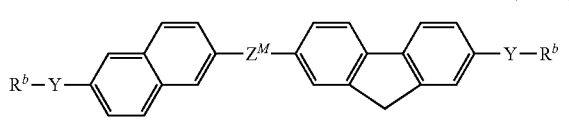
(M2-11) 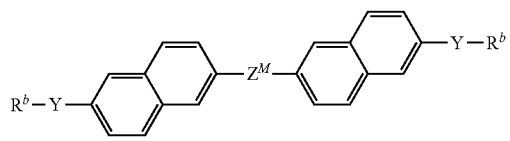
(M2-12) 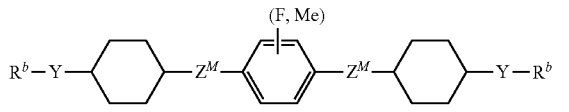
(M2-13) 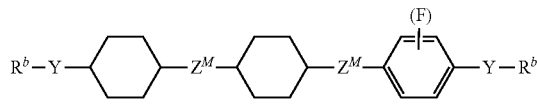
(M2-14) 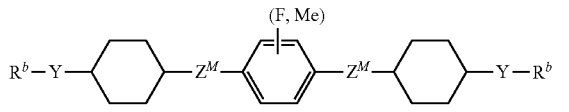
(M2-15) 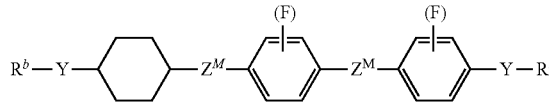
(M2-16) 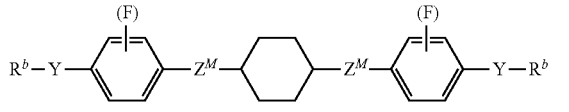
(M2-17) 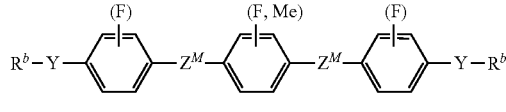
(M2-18) 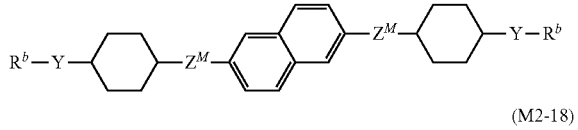
(M2-19) 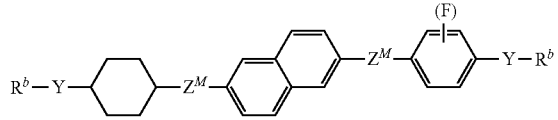
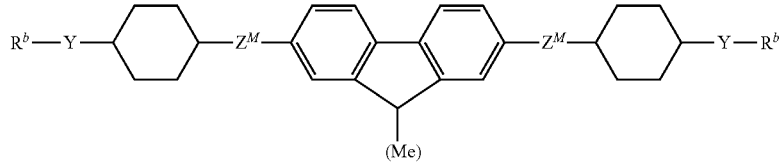
(M2-20) 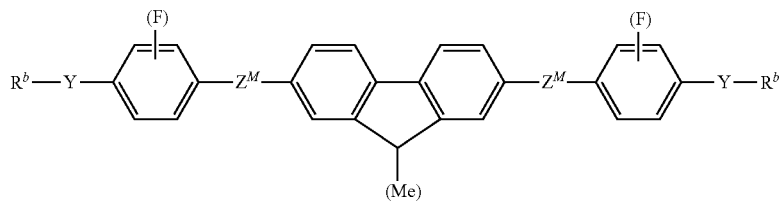
(M2-21) 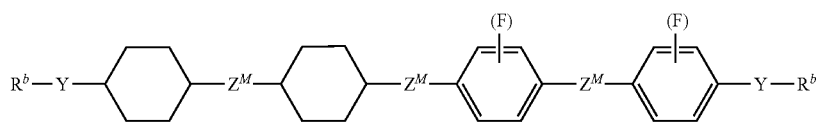

-continued

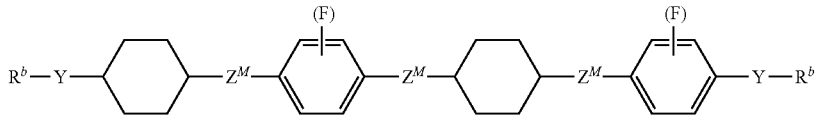
(M2-22)

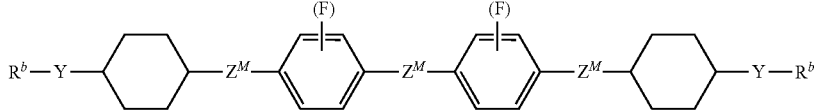
(M2-23)

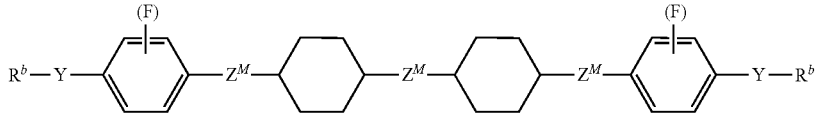
(M2-24)

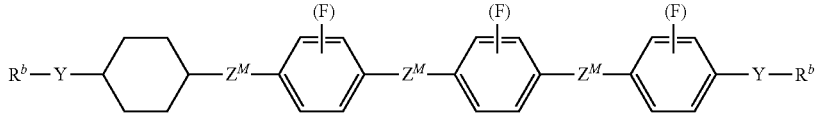
(M2-25)

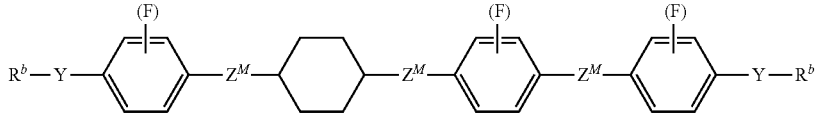
(M2-26)

(M2-27)

If necessary, a monomer without mesogenic moiety and a polymerizable compound having a mesogenic moiety other than the monomers (M1) and (M2) may be used.

To optimize the optical isotropy of the polymer/liquid crystal composite of the invention, a monomer having a mesogenic moiety and having three or more polymerizable functional groups may be used. For example, well-known compounds such as (M4-1)-(M4-3) can be used suitably, specific examples of which are described in Japanese Patent Publication Nos. 2000-327632, 2004-182949 and 2004-59772. In (M4-1)-(M4-3), $R^b$, $Z^a$, Y and (F) are defined as above.

(M4-1)
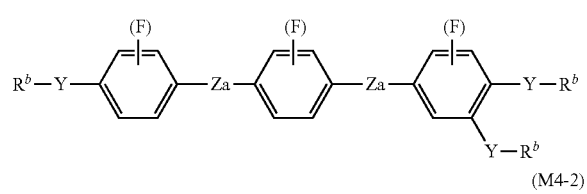

(M4-2)
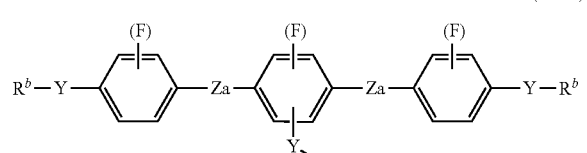

-continued
(M4-3)
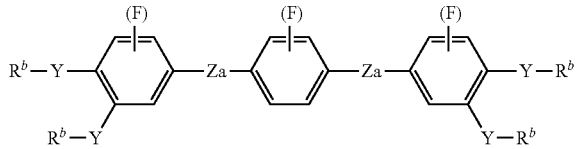

5-2-2. Monomer having no Mesogenic Moiety and having Polymerizable functional groups Examples of the monomer having no mesogenic moiety and having polymerizable functional groups include, but not limited to, straight or branched acrylate of 1-30 carbon atoms, straight or branched diacrylate of 1-30 carbon atoms, and monomers having three or more polymerizable functional groups, such as glycerol/propoxylate (1PO/OH)/triacrylate, pentaerythritol/propoxylate/triacrylate, pentaerythritol/triacrylate, trimethylolpropane/ethoxylate/triacrylate, trimethylolpropane/propoxylate/triacrylate, trimethylolpropane/triacrylate, di(trimethylolpropane)tetraacrylate, pentaerythritol/tetra acrylate, di(pentaerythritol)pentaacrylate, di(pentaerythritol)hexaacrylate and trimethylolpropane/triacrylate, etc.

5-2-3. Polymerization Initiator

The polymerization reaction for preparing the polymer in the composite material of the invention is not particularly limited, and can be selected from, for example, photo-radical polymerization, thermo-radical polymerization and photo-cationic polymerization, etc.

Examples of polymerization initiator useful to photo-radical polymerization include DAROCUR™ 1173 and 4265 (both are tradenames, Ciba Specialty Chemicals Co., Ltd.), IRGACURE™ 184, 369, 500, 651, 784, 819, 907, 1300, 1700, 1800, 1850 and 2959 (all are tradenames, Ciba Specialty Chemicals Co., Ltd.) and so on.

Preferred examples of the initiator useful to thermo-radical polymerization causing radical polymerization by heating include benzoyl peroxide, diisopropyl peroxydicarbonate, t-butyl peroxy2-ethylhexanoate, t-butyl peroxypivalate, t-butyl peroxydiisobutyrate, lauroyl peroxide, dimethyl 2,2'-azobisisobutyrate (MAIB), di-t-butyl peroxide (DTBPO), azobisisobutyronitrile (AIBN) and azobiscyclohexane-carbonitrile (ACN), etc.

Examples of the polymerization initiator useful to photo-cationic polymerization include diaryliodonium salt (referred to as "DAS", hereinafter) and triarylsulfonium (referred to as "TAS", hereinafter), etc.

Examples of DAS include diphenyliodonium tetrafluoroborate, diphenyliodonium hexafluorophosphonate, diphenyliodonium hexafluoroarsenate, diphenyliodonium trifluoromethylsulfonate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphonate, 4-methoxyphenylphenliodonium hexafluoroarsenate, 4-methoxyphenylphenyliodonium trifluoromethylsulfonate, 4-methoxyphenylphenyliodonium trifluoroacetate and 4-methoxyphenylphenyliodonium p-toluenesulfonate, etc.

DAS may be sensitized by addition of a photosensitizer such as thioxanthone, phenothiazine, chlorothioxanthone, xanthone, anthracene, diphenyl anthracene or rubrene, etc.

Examples of TAS include triphenylsulfonium tetrafluoroborate, triphenylsulfonium hexafluorophosphonate, triphenylsulfonium hexafluoroarsenate, triphenylsulfonium trifluoromethylsulfonate, triphenylsulfonium trifluoroacetate, triphenylsulfonium p-toluenesulfonate, triphenylsulfonium tetrakis(pentafluorophenyl)borate, 4-methoxyphenyldiphenylsulfonium tetrafluoroborate, 4-methoxy phenyldiphenylsulfonium hexafluorophosphonate, 4-methoxyphenyldiphenylsulfonium hexafluoroarsenate, 4-methoxyphenyldiphenylsulfonium trifluoromethylsulfonate, 4-methoxyphenyldiphenylsulfonium trifluoroacetate and 4-methoxyphenyldiphenylsulfonium p-toluenesulfonate, etc.

Specific examples of the photo-cationic polymerization initiator include those under the tradenames of Cyracure™ UVI-6990, Cyracure™ UVI-6974 and Cyracure™ UVI-6992 (tradenames, UCC Co., Ltd.), ADEKA OPTOMER™ SP-150, SP-152, SP-170 and SP-172 (tradenames, ADEKA Co., Ltd.), Rhodorsil Photoinitiator™ 2074 (tradename, Rhodia Japan Co., Ltd.), IRGACURE™ 250 (tradename, Ciba Specialty Chemicals Co., Ltd.), UV-9380C (tradename, GE TOSHIBA Silicone Co., Ltd.), etc.

5-2-4. Curing Agent and Additives

In the preparation of the polymer in the composite material of the invention, in addition to the aforementioned monomers and the polymerization initiator, other suitable components may be added alone or in combination, such as a curing agent, a catalyst and a stabilizer, etc.

For the curing agent, a latent curing agent well-known and commonly used as an epoxy resin curing agent may be used. Examples of the latent curing agent for epoxy resin includes amine curing agents, Novalac curing agents, imidazole curing agents and acid-anhydride curing agents, etc. Examples of the amine curing agents include: aliphatic polyamines, such as diethylenetriamine, triethylenetetramine, tetraethylenepentaamine, m-xylenediamine, trimethyl hexamethylene diamine, 2-methyl-pentamethylene diamine and diethylamino propylamine, etc.; alicyclic polyamines, such as isophorone diamine, 1,3-diaminomethyl cyclohexane, bis(4-aminocyclohexyl)methane, norbornane diamine, 1,2-diamino-cyclohexane and Laromin, etc.; aromatic polyamines, such as diaminodiphenylmethane, diaminodiphenylethane and m-phenylene diamine, etc.

Examples of the Novalac curing agents include phenol-Novalac resin and bisphenol-Novalac resin, etc. Examples of the imidazole curing agents include 2-methylimidazol, 2-ethylhexylimidazole, 2-phenylimidazole and 1-cyanoethyl-2-phenylimidazolium trimellitate, etc.

Examples of the acid-anhydride curing agents include tetrahydrophthalic anhydride, hexahydrophthalic anhydride, methyl tetrahydrophthalic anhydride, methyl hexahydrophthalic anhydride, methylcyclohexene tetraformic dianhydride, phthalic anhydride, trimellitic anhydride, pyromellitic anhydride and benzophenone tetraformic dianhydride, etc.

In addition, a curing promoter may also be used to promote the curing reaction of a polymerizable compound having glycidyl, epoxy or oxetanyl with the curing agent. Examples of the curing promoter include: tertiary amines, such as benzyl dimethylamine, tris(dimethylaminomethyl)phenol and dimethyl cyclohexylamine, etc.; imidazoles, such as 1-cyanoethyl-2-ethyl-4-methylimidazole and 2-ethyl-4-methylimidazole, etc.; organo-phosphorus compounds, such as triphenylphosphine, etc.; quaternary phosphonium salts, such as tetraphenyl phosphonium bromide, etc.; diazabicyclic alkenes, such as 1,8-diazabicyclo[5.4.0]undec-7-ene and organic acid salts thereof; quaternary ammonium salts, such as tetraethyl ammonium bromide and tetrabutyl ammonium bromide, etc.; boron compounds, such as boron trifluoride and triphenyl borate, etc. These curing promoters may be used alone or in combination of two or more.

In addition, it is preferred to add a stabilizer in order to, for example, prevent undesirable polymerization during storage. All the compounds well known as stabilizers to the practitioners may be used as the stabilizers. Typical examples of the stabilizer are 4-ethoxy phenol, hydroquinone and butylated hydroxytoluene (BHT), etc.

5-3. Content of Liquid Crystal Composition

The content of the liquid crystal composition in the polymer/liquid crystal composite of the invention is preferably as high as possible, so long as it is in the range allowing the composite material to exhibit an optically isotropic liquid crystal phase. This is because the higher the content of the liquid crystal composition is, the greater the electric birefringence of the composite material of the invention is.

In the polymer/liquid crystal composite of the invention, the content of the liquid crystal composition is preferably 60-99 wt %, more preferably 60-95 wt % and particularly preferably 65-95 wt %, relative to the composite material. In addition, the content of the polymer is preferably 1-40 wt %, more preferably 5-40 wt % and particularly preferably 5-35 wt %, relative to the composite material.

5-4. Other Components

The polymer/liquid crystal composite of the invention may include other components, such as a dichroic dye or a photochromic compound, so long as the effects of the invention are not affected. The invention will be described in more details below in reference of the embodiments, but is not limited to the embodiments. Furthermore, the symbol "%" denotes "wt %" hereafter, unless specifically indicated.

6. Optical Devices

A sixth aspect of the invention relates to an optical device containing a liquid crystal composition or a polymer/liquid crystal composite (the liquid crystal composition and the polymer/liquid crystal composite of the invention are generally called "liquid crystal medium", hereinafter), which is driven in an optically isotropic liquid crystal phase. An exemplary structure of the LCD device is shown in FIG. 1, wherein on the comb-like electrode substrate, the electrodes 1 extending from the left side and the electrodes 2 extending from the left side are alternately disposed. When a voltage difference is present between the electrodes 1 and the electrodes 2, the comb-like electrode substrate is provided with an electric field having two directions (upward direction and downward direction), as shown in FIG. 1.

EXAMPLES

The compounds obtained are characterized by nuclear magnetic resonance spectra obtained with $^1$H-NMR analyses and gas chromatograms obtained with gas chromatography (GC) analyses. The analysis methods are firstly described below.

$^1$H-NMR analysis: $^1$H-NMR analyses were done in DRX-500 manufactured by Bruker BioSpin Co., Ltd. In the measurement, a sample produced in an example or the like was dissolved in a deuterated solvent capable of dissolving the sample, such as CDCl$_3$, and measured at room temperature and 500 MHz with 24 times of accumulation. In the expressions of the NMR spectra, "s" denotes a singlet, "d" denotes a doublet, "t" denotes a triplet, "q" denotes a quartet and "m" denotes a multiplet. Tetramethylsilane (TMS) was used as a standard material of the zero point of the chemical shift ($\delta$).

GC analysis: Gas chromatography analysis was done in a gas chromatography apparatus "GC-14B" manufactured by Shimadzu Corp. The chromatographic column was a capillary column "CBP1-M25-025" with a length of 25 m, an inner diameter of 0.22 mm and a membrane thickness of 0.25 μm that was manufactured by Shimadzu Corp. The stationary phase was dimethylpolysiloxane without polarity. The carrier gas was helium adjusted to have a flow rate of 1 ml/min. The temperature of the sample evaporation chamber was set at 300° C., and that of the detector as a flame ionization detector (FID) was set at 300° C.

In the GC measurement, a sample was dissolved in toluene to give a 1 wt % solution, and 1 μL of the same was injected into the sample evaporation chamber. The data recorder was Chromatopac C-R6A produced by Shimadzu Corp., or an equivalent thereof. The resulting gas chromatogram exhibited peak retention times and peak areas corresponding to the component compounds.

The solvent for diluting the sample may be chloroform or hexane. The capillary columns used may be DB-1 with a length of 30 m, an inner diameter of 0.32 mm and a membrane thickness of 0.25 μm produced by Aligent Technologies, Inc., HP-1 with a length of 30 m, an inner diameter of 0.32 mm and a membrane thickness of 0.25 μm produced by Aligent Technologies, Inc., Rtx-1 with a length of 30 m, an inner diameter of 0.32 mm and a membrane thickness of 0.25 μm, produced by Restek Corporation, or BP-1 with a length of 30 m, an inner diameter of 0.32 mm and a membrane thickness of 0.25 μm produced by SGE International Pty. Ltd., etc.

The area percentages of the peaks in a gas chromatogram correspond to the percentages of the component compounds. The weight percentages of a component compounds does not completely agree with the area percentage of the corresponding peak. In the invention, however, the correction coefficient is approximately 1, and thus the weight percentage of a component compound can be considered the same as the area percentage of the corresponding peaks upon the use of an aforementioned capillary column. This is because there is few difference between the correction coefficients of the component compounds. The internal standard method of gas chromatography may be used, in order to more accurately calculate the composition ratio of the liquid crystal compounds in the liquid crystal composition in the GC analysis. The liquid crystal compound component (detected component) and the standard liquid crystal compound (standard material) were measured simultaneously with GC, and a relative intensity as the area ratio of the peak of the detected component to that of the standard material was calculated. With a compensation based on the relative intensity as the peak area ratio of each component to the standard material, the composing ratio of the liquid crystal compounds in the liquid crystal composition may be more accurately derived through GC analysis.

Samples for Determining Physical Characteristic Values of Liquid Crystal Compound or the Like There are two types of samples upon measuring the physical characteristic values of a compound, wherein one type of sample is the compound itself and the other type of sample is obtained by mixing the compound with a mother liquid crystal.

In the latter case where the compound is added to a mother liquid crystal, the measurement is based on the following method. At first, 15 wt % of the liquid crystal compound obtained was mixed with 85wt % of the mother liquid crystal to prepare a sample. The physical characteristic value of the compound were calculated from the measured value of the sample with the following extrapolation equation:

Extrapolated value=(100×(Measured value of sample)−(weight percentage of mother liquid crystal)×(Measured value of mother liquid crystal))/(weight percentage of liquid crystal compound)

In cases where a smectic phase (or a crystal) was separated at 25° C. at the above ratio of the compound to the mother liquid crystal, the ratio was varied in turn to 10 wt %:90 wt %, 5 wt %:95 wt % and 1 wt %:99 wt %. In cases where a smectic phase (or a crystal) was not separated at 25° C., the physical characteristic values of the liquid crystal compound were calculated by the extrapolation method based on the above equation.

There are various kinds of mother liquid crystals useful to the measurement. For example, the mother liquid crystal A has the following composition (wt %).

Mother Liquid Crystal A:

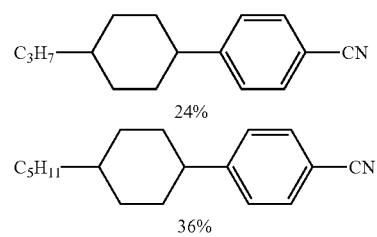

-continued

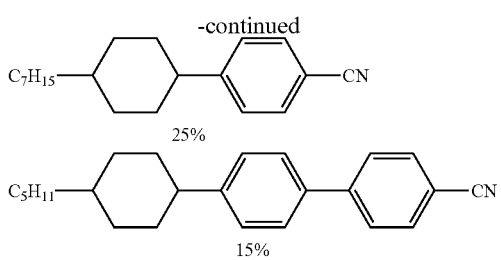

Method for Measuring Physical Characteristic Values of Liquid Crystal Compound or the Like The measurements of the physical characteristic values was carried by the following methods. Most of them are methods described in EIAJ ED-2521A of the Standard of Electric industrial Association of Japan or methods obtained by modifying the same. The TN device used in the measurement was not equipped with TFTs.

Among the values obtained by the measurement, the values obtained from a sample consisting of the compound were directly recorded as experimental data, and those obtained from a sample as a mixture of the compound with a mother liquid crystal were converted using the extrapolation method, and then the converted values were recorded as experimental data.

The phase structure and the phase transition temperature (° C.) were determined with one of the following methods.

(1) A sample was placed on a hot plate in a melting point measuring apparatus (Hot Stage FP-52 produced by Mettler, Corp.) equipped with a polarizing microscope. The phase state and its change were observed by the polarizing microscope while the sample was heated at a rate of ° C./min to determine the type of the liquid crystal phase.

(2) The onset temperature of the endothermic peak or the exothermic peak accompanied by phase change of the sample was determined by the extrapolation method, using a Scanning Calorimeter DSC-7 system or Diamond DSC system manufactured by Perkin Elmer Corp. at a heating or cooling rate of 3° C./min, to determine the temperature of phase transition.

In the following descriptions, a crystal phase is represented by "K". In a case where two crystal phases are distinguished from each other, they are represented by $K_1$ and $K_2$ respectively. A smectic phase is expressed by "Sm". A nematic phase is represented by "N". In a case where a smectic B phase and a smectic A phase are distinguished from each other in the smectic phases, they are represented by "SmB" and "SmA". "BP" represents a blue phase or an optically isotropic liquid crystal phase. A bi-phase coexistence is sometimes represented by (N*+I) or (N*+BP). Specifically, (N*+I) represents a phase of an isotropic phase coexisting with a chiral nematic phase, and (N*+BP) represents a phase of a BP phase or an optically isotropic liquid crystal phase coexisting with a chiral nematic phase. "Un" represents an unidentified phase without optical isotropy. As for the expression of the transition temperatures, for example, "K 50.0 N 100.0 I" means that the transition temperature (KN) from a crystal phase to a nematic phase is 50.0° C. and the transition temperature (NI) from a nematic phase to a liquid phase is 100.0° C. The cases of other expressions are similar.

Upper-Limit Temperature of Nematic Phase ($T_{NI}$: ° C.):

A sample as a mixture of a liquid crystal compound and a mother liquid crystal was placed on a hot plate in a melting point measuring apparatus (Hot Stage FP-52 made by Mettler Corp.) equipped with a polarizing microscope, and was observed by the polarizing microscope as heated at a rate of 1° C./min. The temperature at which a part of the sample started to change from a nematic phase to an isotropic liquid was recorded as the upper-limit temperature of the nematic phase, which is abbreviated to "upper-limit temperature" below.

Low-Temperature Compatibility:

Samples were prepared by mixing a liquid crystal compound with a mother liquid crystal in amounts of 20 wt %, 15 wt %, 10 wt %, 5 wt %, 3 wt % and 1 wt % respectively, and were placed in glass bottles. The samples were kept in a freezer set at −10° C. or −20° C. for a certain period, and were observed for separation of a crystal phase or a smectic phase.

Viscosity (η, measured at 20° C., mPa·s):

The viscosity of a mixture of a liquid crystal compound and a mother liquid crystal was measured using an E-type rotary viscometer.

Optical Anisotropy (Δn):

The optical anisotropy was measured using an Abbe refractometer equipped with a polarizer attached to the ocular lens with light of 589 nm in wavelength at 25° C. After rubbing the surface of the main prism in one direction, a sample as a mixture of a liquid crystal compound and a mother liquid crystal was dropped on the main prism. The refractive index $n_\parallel$ was measured when the polarizing direction was parallel to the rubbing direction. The refractive index $n_\perp$ was measured when the polarizing direction was perpendicular to the rubbing direction. The optical anisotropy (Δn) was calculated from the equation "$\Delta n = n_\parallel - n_\perp$".

Dielectric Anisotropy (Δ∈, measured at 25° C.):

A sample as a mixture of a liquid crystal compound and a mother liquid crystal was injected into a liquid crystal cell having a distance (cell gap) of 9 μm between two glass substrates and a twist angle of 80°. A voltage of 20 v was applied to the liquid crystal cell, and the dielectric constant ($\in_\parallel$) in the major-axis direction of the liquid crystal molecule was measured. Then a voltage of 0.5 V was applied, and a dielectric constant ($\in_\perp$) in the minor-axis direction of the liquid crystal molecule was measured. The dielectric anisotropy was calculated with the equation "$\Delta\in = \in_{81} - \in_\perp$".

Pitch (p, measured at 25° C., nm)

The pitch length was measured by selective reflection (Liquid Crystal Manual, p. 196, issued in 2000 by MARUZEN). The selective reflection wavelength λ satisfies the equation "<n>p/λ=1", wherein <n> denotes the average refractive index defined by the equation "$<n> = \{(n_\parallel^2 + n_\perp^2)/2\}^{1/2}$". The selective reflection wavelength was measured with a micro-spectrophotometer MSV-350 made by Japan Electronics Co., Ltd. The pitch was calculated by dividing the reflection wavelength by the average refractive index. When the concentration of the optically active compound was low, the pitch of a cholesteric liquid crystal having a reflection wavelength at the long wavelength side of visible light was proportional to the reciprocal of the concentration. Therefore, multiple points were measured for the pitch length of the liquid crystal having a selective reflection wavelength in the region of visible light, and the pitch was calculated through linear extrapolation.

(The Composition of the Invention)

In the invention, the characteristic values of the liquid crystal composition were measured based on the methods below. Most of the methods are methods described in EIAJ ED-2521A of the Standard of Electric Industrial Association of Japan or methods obtained by modifying the same. The TN device used in the measurement was not equipped with TFTs.

Upper-Limit Temperature of Nematic Phase (NI, ° C.):

The sample was placed on a hot plate in a melting point measuring apparatus equipped with a polarizing microscope, and was heated at a rate of 1° C./min. The temperature at which a part of the sample started to change from a nematic phase to an isotropic liquid was recorded as the upper-limit temperature of the nematic phase, which is abbreviated to "upper-limit temperature" below.

Lower-Limit Temperature of Nematic Phase ($T_C$, ° C.):

Samples having a nematic phase were stored in freezers respectively set at 0° C., −10° C., −20° C., −30° C. and −40° C. for 10 days, and were observed for the liquid crystal phase. For example, in a case where a sample exhibits a nematic phase at −20° C. and is changed to a crystal phase (or smectic phase) at −30° C., the $T_C$ is recorded as "$T_C \leq −20°$ C.". The lower-limit temperature of a nematic phase is sometimes abbreviated to "lower-limit temperature".

Transition Temperature of an Optically Isotropic Liquid Crystal Phase:

A sample was placed on a hot plate in a melting point measuring apparatus equipped with a polarizing microscope with crossed Nicols. The sample was initially heated to a temperature allowing formation of an isotropic phase and then cooled in a rate of 1° C./min to form a chiral nematic phase or an optically isotropic liquid crystal phase entirely. A phase transition temperature was measured during the cooling-down process, and then the temperature was raised in a rate of 1° C./min. A phase transition temperature is measured again during the heating-up process. In the invention, a phase transition temperature in the heating-up process is regarded as the phase transition temperature, unless specifically indicated. For an optically isotropic liquid crystal phase, if the phase transition temperature is difficult to determine in the dark field at the crossed Nicols state, the polarizer may be shifted by 1-10° from the crossed Nicol state before the phase transition temperature was determined.

Viscosity (η, measured at 20° C., mPa·s):

The viscosity was measured with an E-type rotary viscometer.

Rotation viscosity (γl, measured at 25° C., mPa·s):

1) For a sample having a positive dielectric anisotropy, the rotation viscosity was measured based on the method disclosed in M. Imai, et al., *Molecular Crystals and Liquid Crystals*, vol. 259, p. 37 (1995). The sample was placed in a TN device having a twist angle of 0° and a distance (gap) of 5 μm between two glass substrates. The TN device was applied with a voltage in a range from 16 V to 19.5 V stepwise by 0.5 V. After a voltage-free period of 0.2 second, a rectangular wave (rectangular pulse of 0.2 second) and a voltage-free period of 2 seconds were applied repeatedly. The peak current and the peak time of the transient current generated by the voltage application were measured. The rotation viscosity was calculated from the measured values based on Equation (8) in page 40 of the literature of M. Imai, et al. The value of the dielectric anisotropy, which was necessary for the calculation, was obtained based on the following measuring method of dielectric anisotropy using the device for measuring the rotation viscosity.

2) For samples having negative dielectric anisotropy: The rotation viscosity was measured based on the method disclosed in M. Imai, et al., *Molecular Crystals and Liquid Crystals*, vol. 259, p. 37 (1995). The sample was placed in a VA device having a distance (gap) of 20 μm between two glass substrated. The VA device was applied with a voltage in a range from 30 V to 50 V stepwise by 1 V. After a voltage-free period of 0.2 second, a rectangular wave (rectangular pulse of 0.2 second) and a voltage-free period of 2 seconds were applied repeatedly. The peak current and the peak time of the transient current generated by the voltage application were measured. The rotation viscosity was calculated from the measured values and Equation (8) in page 40 of the literature of M. Imai, et al. The value of the dielectric anisotropy, which was necessary for the calculation, was obtained based on the following measuring method of the dielectric anisotropy.

Optical Anisotropy (Δn, measured at 25° C.):

The optical anisotropy was measured using an Abbe refractometer having a polarizer attached to the eye lens with light of 589 nm. After rubbing the surface of the main prism in one direction, the sample was dropped on the main prism. The refractive index $n_{\parallel}$ was measured when the polarizing direction was parallel to the rubbing direction, the refractive index $n_{\perp}$ was measured when the polarizing direction was perpendicular to the rubbing direction, and the optical anisotropy was calculated from the equation "$\Delta n = n_{\parallel} - n_{\perp}$". In a case where the sample was a composition, the optical anisotropy was measured by this method. In a case where the sample was a compound, the compound was mixed in a suitable composition for the measurement of the optical anisotropy, wherein the optical anisotropy of the compound was obtained through extrapolation.

Dielectric Anisotropy (Δ∈, Measured at 25° C.):

In a case where the sample was a compound, the compound was mixed in a suitable composition for the measurement of the dielectric anisotropy, wherein the dielectric anisotropy of the compound was obtained through extrapolation.

1) For a composition having a positive dielectric anisotropy: A sample was injected into a liquid crystal cell having a distance (cell gap) of 9 μm between two glass substrates and a twist angle of 80°. A voltage of 20 V was applied to the liquid crystal cell to measure the dielectric constant ($\in_{\parallel}$) in the major-axis direction of the liquid crystal molecule. Then, a voltage of 0.5 V was applied to measure the dielectric constant ($\in_{\perp}$) in the minor-axis direction of the liquid crystal molecule. The dielectric anisotropy was calculated from the equation "$\Delta \in = \in_{\parallel} - \in_{\perp}$".

2) For a composition having a negative dielectric anisotropy: A sample was injected into a liquid crystal cell having been processed to a homeotropic alignment, and a voltage of 0.5 V was applied to measure the dielectric constant $\in_{\parallel}$. Next, the sample was injected into a liquid crystal cell having been processed to a homogeneous alignment, and a voltage of 0.5 V was applied to measure the dielectric constant $\in_{\perp}$. The dielectric anisotropy was calculated from the equation "$\Delta \in = \in_{\parallel} - \in_{\perp}$".

Threshold Voltage (Vth, Measured at 25° C., V):

In a case where the sample was a compound, the compound was mixed in a suitable composition for measurement of its threshold voltage. The threshold voltage of the compound was obtained through extrapolation.

1) For a composition having a positive dielectric anisotropy: A sample was injected into a liquid crystal display device of a normally white mode having a distance (gap) of (0.5/Δn) μm between two glass substrates and a twist angle of 80°. The optical anisotropy (Δn) was measured with the aforementioned method. A rectangular wave with a frequency of 32 Hz was applied to the device. Then, the voltage of the rectangular wave was increased, and the voltage value at which the light transmittance through the device reached 90% was recorded as the threshold voltage.

2) For a composition having a negative dielectric anisotropy: A sample was injected into a liquid crystal display device of a normally black mode having a distance (gap) of 9 μm between two glass substrates and processed to a homeotropic alignment. A rectangular wave with a frequency of 32 Hz was applied to the device. Then, the voltage of the rectangular wave was increased, and the voltage value at which the light transmittance through the device reached 10% was recorded as the threshold voltage.

Voltage Holding Ratio (VHR, Measured at 25° C., %):

The TN device used for the measurement had a polyimide alignment film and had a distance (cell gap) of 6 μm between two glass substrates. A sample was injected into the device, which was then sealed with a UV-polymerized adhesive. Then, the TN device was charged by applying a pulse voltage of 5 V for 60 microseconds. The voltage attenuation was measured with a high-speed voltmeter for 16.7 milliseconds, and the area A between the voltage curve and the abscissa per unit cycle was obtained. The voltage holding ratio was the ratio of the area A to an area B that is the area where the voltage does not attenuate.

Helical Pitch (Measured at 20° C., μm):

The helical pitch was measured by a Cano-wedge cell. The sample was injected into a Cano-wedge cell, and the distance (α, μm) between the disclination lines observed from the cell was measured. The helical pitch (p) was calculated from the equation "p=2·α·tan θ", wherein η indicates the angle between the two glass substrates of the Cano-wedge cell.

Alternatively, the pitch length may be measured with selective reflection (Liquid Crystal Manual, p. 196, issued in 2000 by MARUZEN). The selective reflection wavelength λ satisfies the equation "<n>p/λ=1", wherein <n> denotes the average refractive index calculated with the equation "<n>={$(n_\parallel^2 + n_\perp^2)/2\}^{1/2}$". The selective reflection wavelength was measured with a micro-spectrophotometer MSV-350 made by Japan Electronics Co., Ltd. The pitch was calculated by dividing the obtained reflection wavelength by the average refractive index. When the concentration of the chiral dopant was low, the pitch of a cholesteric liquid crystal having a reflection wavelength at the long wavelength side of visible light was proportional to the reciprocal of the concentration.

Therefore, multiple points were measured for the pitch length of a liquid crystal having a selective reflection wavelength in the visible light region, and the pitch was calculated through linear extrapolation.

The content (percentage) of the component or liquid crystal compound is expressed as "wt %" relative to the total weight of the liquid crystal composition below. Each composition was prepared by weighting and mixing the components including the liquid crystal compound, so that the weight percentages thereof can be easily calculated.

Example 1

A liquid crystal composition A was prepared by mixing the liquid crystal compounds shown below in the following weight ratio.

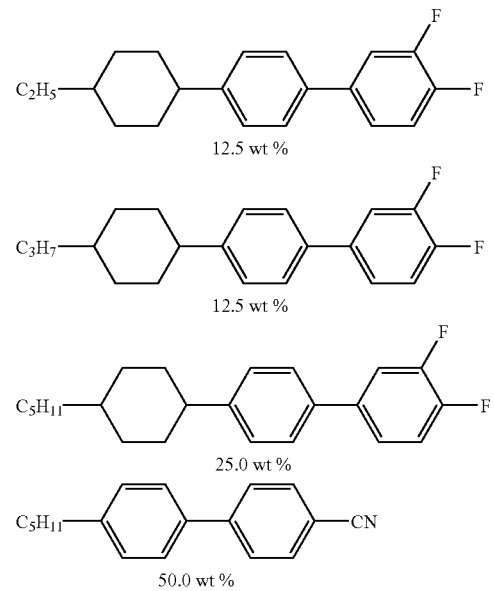

Also, a liquid crystal composition B was prepared by mixing the compounds respectively represented by formulae (a), (b), (c), (d) and (e) in the weight ratio below.

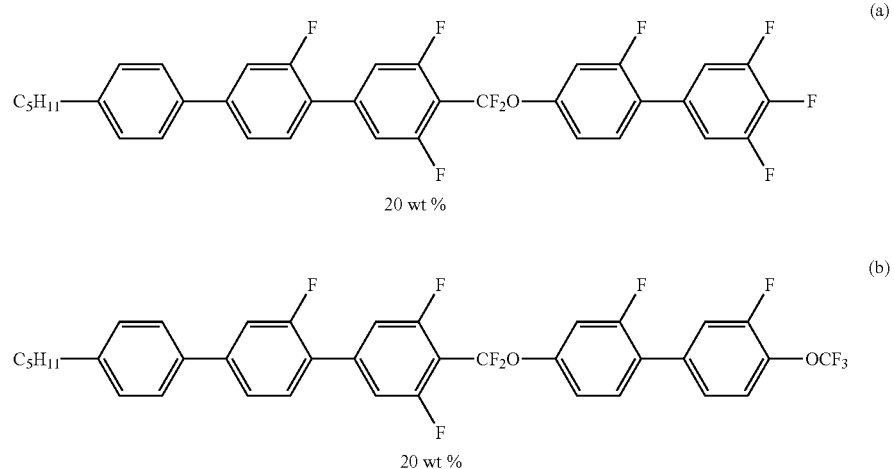

-continued

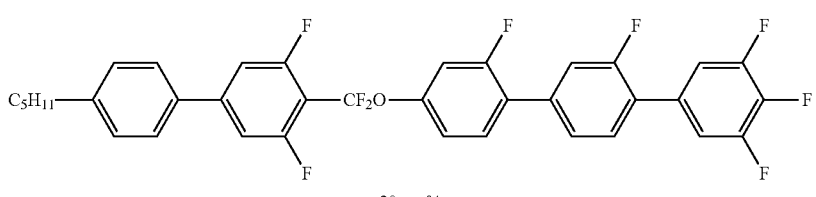

20 wt %

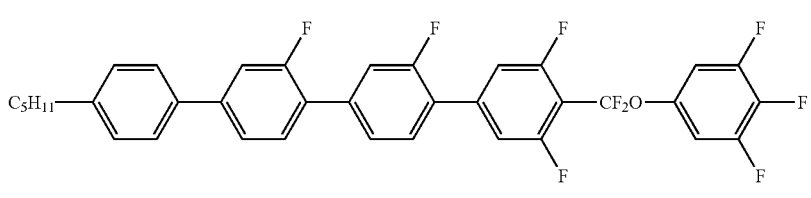

20 wt %

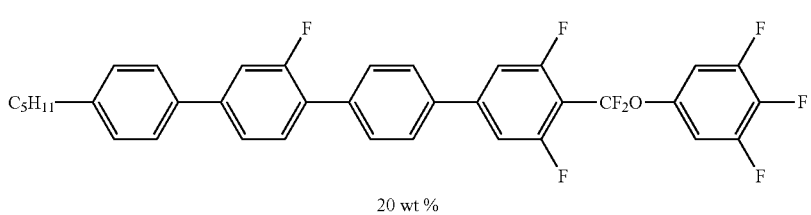

20 wt %

Further, a liquid crystal composition C having a nematic phase was prepared by mixing the liquid crystal composition A with the liquid crystal composition B in a ratio of 80 wt %:20 wt %.

Next, a liquid crystal composition C-1 including the liquid crystal composition C and a chiral dopant ISO-60BA2 represented by the formula below in a ratio of 94 wt %:6 wt % was obtained. ISO-60BA2 was obtained by esterification reaction from isosorbide and 4-hexyloxy benzoic acid in the presence of dicyclohexylcarbodiimide (DCC) and 4-dimethylamino pyridine.

ISO-60BA2

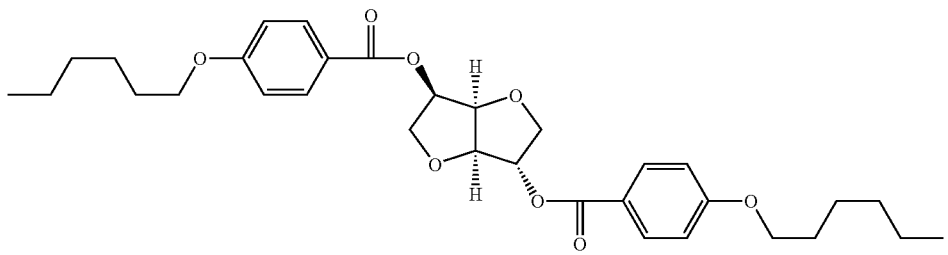

Example 2

Preparation of a Mixture of a Monomers and a Liquid Crystal Composition

A liquid crystal composition C-1M was prepared by mixing 79.4 wt % of a liquid crystal composition C-1 as a mixture of a liquid crystal composition and a monomer, 10.0 wt % of n-dodecyl acrylate, 10.0 wt % of 1,4-di(4-(6-(acryloyloxy)-hexyloxy)benzoyloxy)-2-methylbenzene and 0.6 wt % of 2,2'-dimethoxyphenylaceto-phenone as a photo-polymerization initiator.

Preparation of a Polymer/Liquid Crystal Composite

The liquid crystal composition C-1M was held between a comb-like electrode substrate not subjected to alignment treatment and an opposed glass substrate without electrodes thereon, and the liquid crystal cell (10 µm thick) obtained was heated until an isotropic phase was formed at 68.0° C. In such a state, the cell was irradiated with UV-light of 365 nm in an intensity of 13 mWcm$^{-2}$ for 1 minute for polymerization.

The polymer/liquid crystal composite thus obtained has a clearing point of 65° C., and exhibited an optically isotropic liquid crystal phase even when being cooled to room temperature.

Moreover, as shown in FIG. 1, the electrodes 1 extending from the left side and the electrodes 2 extending from the right side on the comb-like electrode substrate are alternately disposed. Therefore, when a voltage difference is present between the electrodes 1 and the electrodes 2, the comb-like electrode substrate is provided with an electric field having two directions (upward and downward), as shown in FIG. 1.

Example 3

Figure 2:
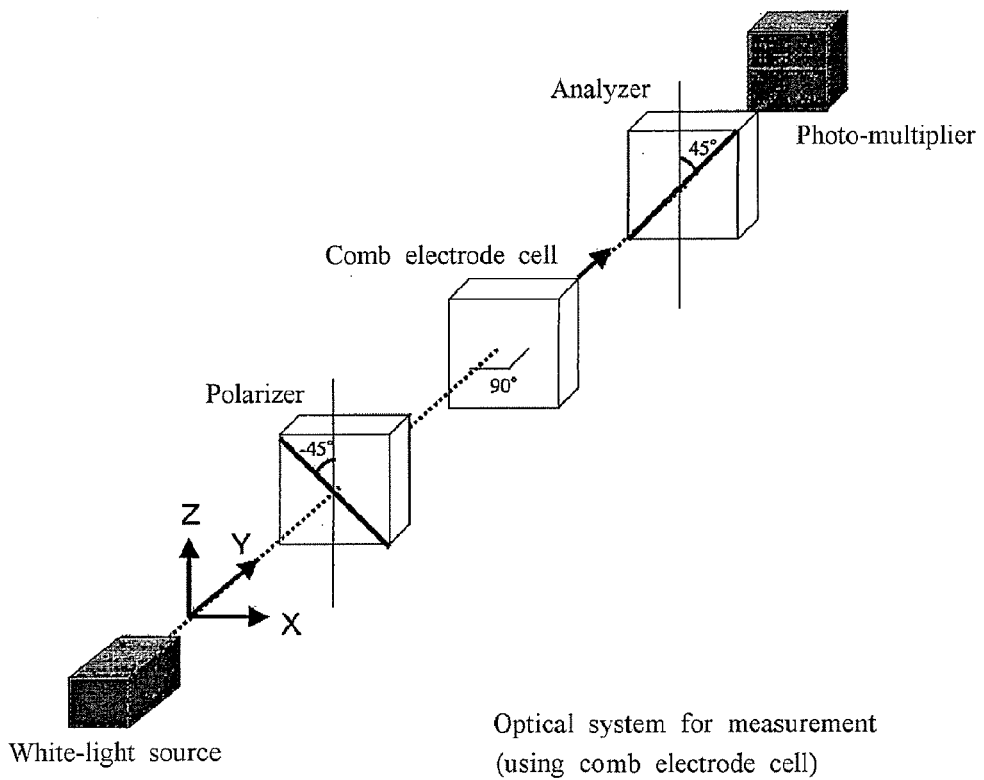
FIG. 2 shows an optical system used in an embodiment of the invention.

A liquid crystal cell holding the polymer/liquid crystal composite C-1P from Example 2 was set in an optical system shown in FIG. 2 for measuring the electrooptical properties. The light source used is the white-light source of a polarizing microscope Optiphot-POL manufactured by Japan NIKON Company. The optical system was set in a manner that the light incident angle to the cell was perpendicular to the surface of the cell and the line direction of the comb electrodes was at an angle of 45° to the polarizer and the analyzer, respectively. The temperature for measurement was set at 45° C., which was lower than the clearing point (65° C.) by 20° C., and the correlation between the applied voltage and the transmittance was investigated. When a rectangular wave of 132 V was applied, the transmittance was up to 97.3%, and the transmitted light intensity was saturated.

Comparative Example 1

A polymer/liquid crystal composite A-1P was prepared according to the method for preparing the polymer/liquid crystal composite C-1P, except that a liquid crystal composition A was used instead of the liquid crystal composition C and the polymerization temperature was set at 53° C. The clearing point of the polymer/liquid crystal composite A-1P was 50° C.

Comparative Example 2

The correlation between the applied voltage and the transmittance of the polymer/liquid crystal composite A-1P was obtained based on the method of Example 3, wherein the temperature for measurement was set at 30° C. When a rectangular wave of 146 V was applied, the transmittance was up to 96.8%, and the transmitted light intensity was saturated.

Accordingly, though the liquid crystal compositions of the above Examples of this application are raised in the upper-limit temperature range of the optically isotropic liquid crystal phase, they are lowered in the driving voltage.

UTILITY OF THE INVENTION

The invention is applicable to, for example, optical devices, such as a display device using a liquid crystal medium, etc.

It will be apparent to those skilled in the art that various modifications and variations can be made to the structure of the invention without departing from the scope or spirit of the invention. In view of the foregoing, it is intended that the invention cover modifications and variations of the invention provided they fall within the scope of the following claims and their equivalents.

What is claimed is:

1. A liquid crystal composition, comprising a compound represented by formula (1) and a chiral dopant and exhibiting an optically isotropic liquid crystal phase,

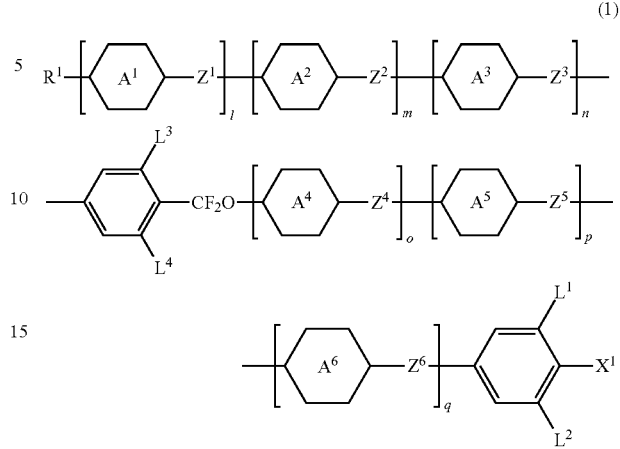

(1)

wherein $R^1$ is $C_1$-$C_{20}$ alkyl wherein arbitrary —$CH_2$— may be replaced by —O—, —S— or —CH=CH—; the ring $A^1$ is 1,4-cyclohexylene, 1,3-dioxan-2,5-diyl, 1,4-phenylene, or 1,4-phenylene with arbitrary hydrogen atom being replaced by a halogen atom; the rings $A^2$, $A^3$, $A^4$, $A^5$ and $A^6$ are each independently 1,4-phenylene, or 1,4-phenylene with arbitrary hydrogen atom being replaced by a halogen atom; $Z^1$, $Z^2$, $Z^3$, $Z^4$, $Z^5$ and $Z^6$ are each independently a single bond, —$CH_2CH_2$—, —CH=CH—, —C≡C—, —COO—, —OCO—, —$CF_2O$—, —$OCF_2$—, —$CH_2O$—, —$OCH_2$—, —CF=CF—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH=CH—$(CH_2)_2$— or —$(CH_2)_2$—CH=CH—; $L^1$, $L^2$, $L^3$ and $L^4$ are each independently a hydrogen atom or a halogen atom; $X^1$ is a hydrogen atom, a halogen atom, —C≡N, —N=C=S, —$SF_5$, or $C_1$-$C_{10}$ alkyl wherein arbitrary —$CH_2$— may be replaced by —O—, —S— or —CH=CH— and arbitrary hydrogen atom may be replaced by a halogen atom; l, m, n, o, p and q are each independently 0 or 1, and l+m+n+o+p+q=3.

2. The liquid crystal composition of claim 1, wherein $R^1$ is $C_1$-$C_{20}$ alkyl, $C_2$-$C_{21}$ alkenyl, $C_1$-$C_{19}$ alkoxy, $C_2$-$C_{20}$ alkenyloxy, $C_1$-$C_{19}$ alkylthio or $C_1$-$C_{19}$ alkenylthio; $X^1$ is a hydrogen atom, a halogen atom, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ or —CH=$CHCF_2CF_3$.

3. The liquid crystal composition of claim 1, wherein $Z^1$, $Z^2$, $Z^3$, $Z^4$, $Z^5$ and $Z^6$ are each independently a single bond, —$CH_2CH_2$—, —CH=CH—, —C≡C—, —COO—, —$CF_2O$—, —$CH_2O$— or —$OCH_2$—.

4. The liquid crystal composition of claim 1, which comprises at least one compound selected from the group consisting of compounds respectively represented by formulae (1-1)-(1-4):

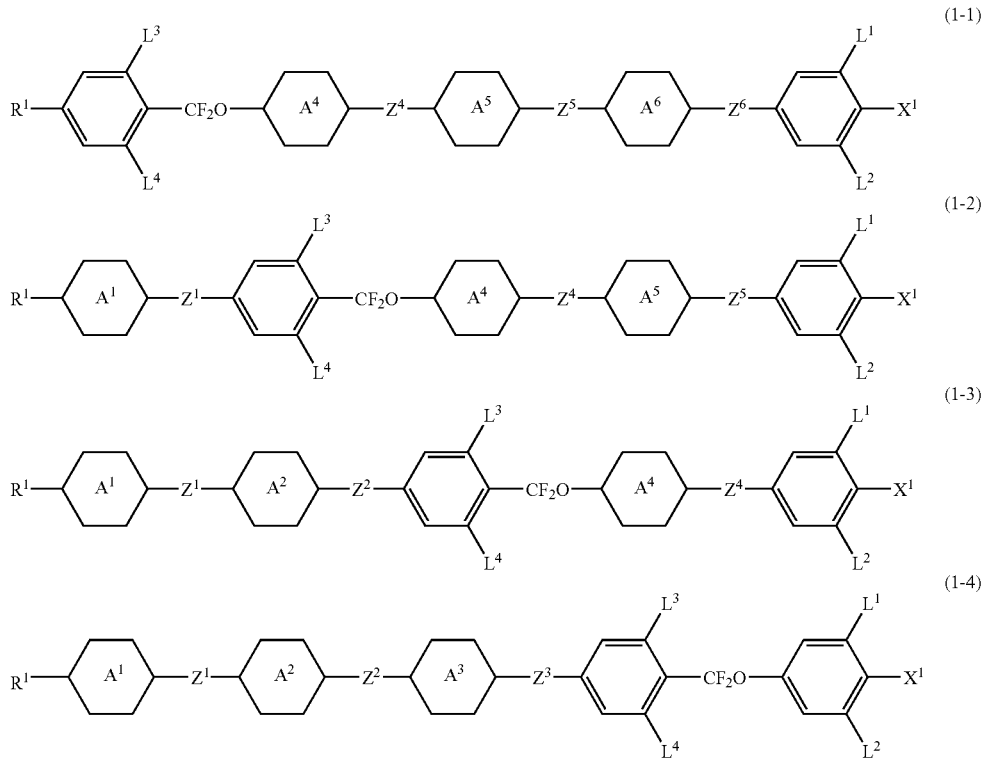

wherein in these formulae, $R^1$ is $C_1$-$C_{15}$ alkyl, $C_2$-$C_{15}$ alkenyl, $C_1$-$C_{15}$ alkoxy or $C_2$-$C_{15}$ alkenyloxy; the ring $A^1$ is 1,4-cyclohexylene, 1,3-dioxan-2,5-diyl, 1,4-phenylene, or 1,4-phenylene with arbitrary hydrogen atom being replaced by a halogen atom; the rings $A^2$, $A^3$, $A^4$, $A^5$ and $A^6$ are each independently 1,4-phenylene, or 1,4-phenylene with arbitrary hydrogen atom being replaced by a halogen atom; $Z^1$, $Z^2$, $Z^3$, $Z^4$, $Z^5$ and $Z^6$ are each independently a single bond, —CH$_2$CH$_2$—, —CH=CH—, —C≡C—, —COO—, —CF$_2$O—, —CH$_2$O— or —OCH$_2$—; $L^1$, $L^2$, $L^3$ and $L^4$ are each independently a hydrogen atom or a fluorine atom; $X^1$ is a fluorine atom, a chlorine atom, —C≡N, —CF$_3$, —CHF$_2$, —CH$_2$F, —OCF$_3$, —OCHF$_2$ or —OCH$_2$F.

5. The liquid crystal composition of claim 1, which comprises at least one compound selected from the group consisting of compounds respectively represented by formulae (1-5)-(1-8):

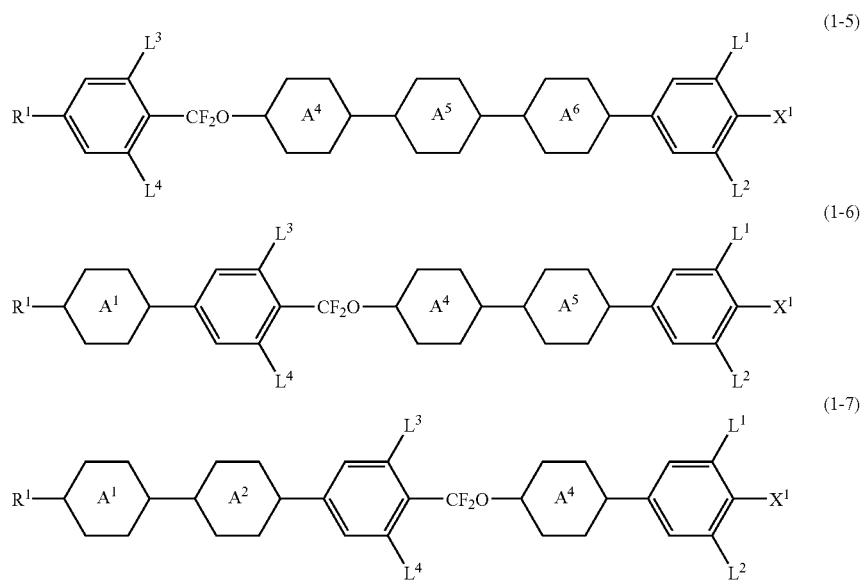

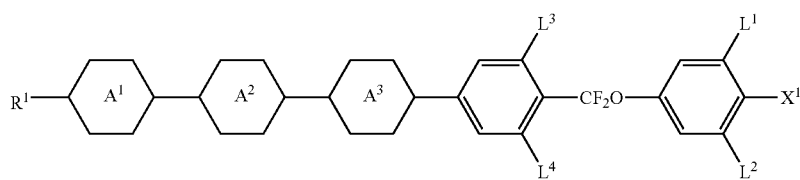
(1-8)

wherein in these formulae, $R^1$ is $C_1$-$C_{15}$ alkyl or $C_2$-$C_{15}$ alkenyl; the ring $A^1$ is 1,4-cyclohexylene, 1,3-dioxan-2,5-diyl, 1,4-phenylene, or 1,4-phenylene with arbitrary hydrogen atom being replaced by a halogen atom; the rings $A^2$, $A^3$, $A^4$, $A^5$ and $A^6$ are each independently 1,4-phenylene, or 1,4-phenylene with arbitrary hydrogen atom being replaced by a halogen atom; $L^1$, $L^2$, $L^3$ and $L^4$ are each independently a hydrogen atom or a fluorine atom; $X^1$ is a fluorine atom, a chlorine atom, —C≡N, —$CF_3$, —$CHF_2$, —$CH_2F$, —$OCF_3$, —$OCHF_2$ or —$OCH_2F$.

6. The liquid crystal composition of claim 1, which comprises at least one compound selected from the group consisting of compounds respectively represented by formulae (1-9)-(1-16):

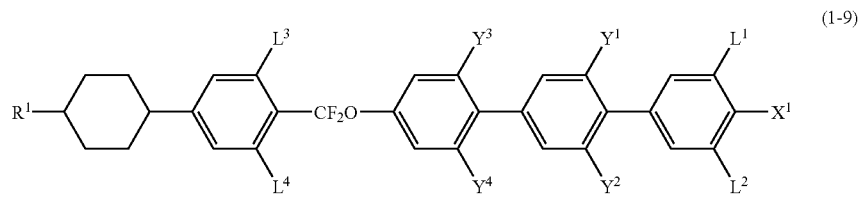
(1-9)

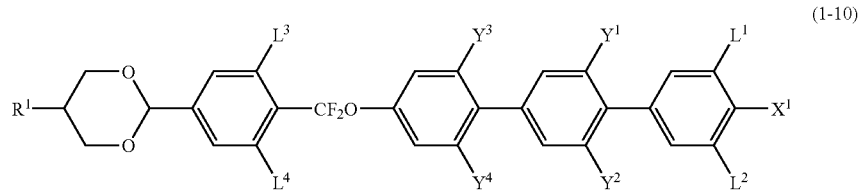
(1-10)

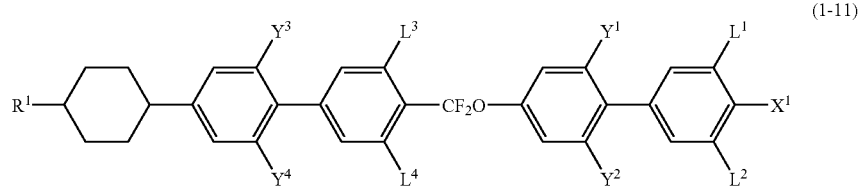
(1-11)

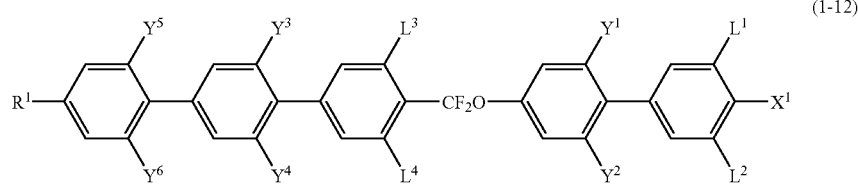
(1-12)

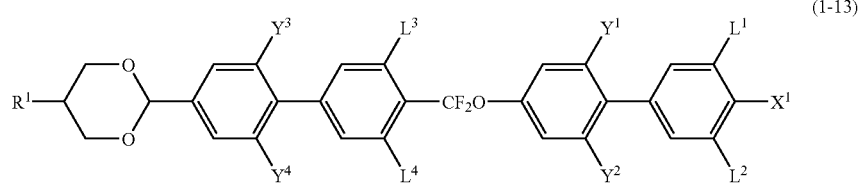
(1-13)

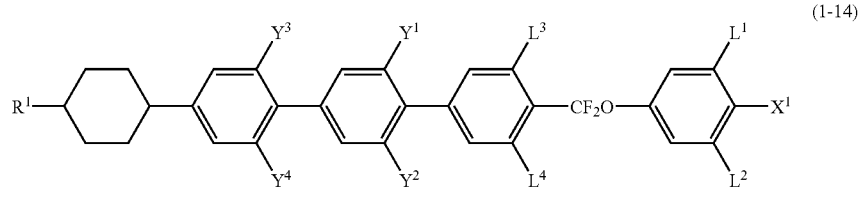
(1-14)

-continued

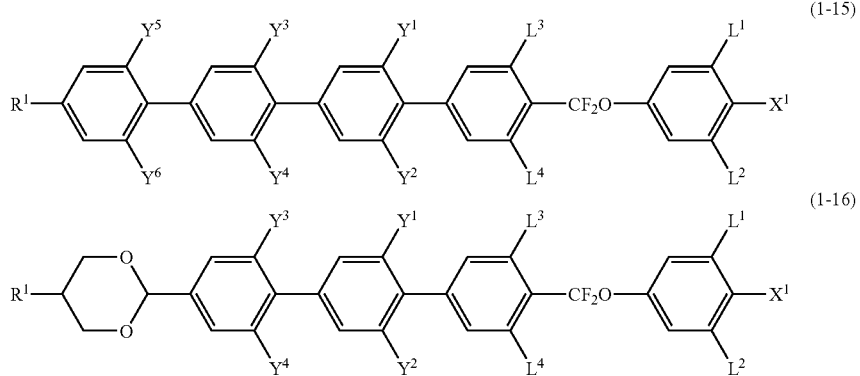

wherein in these formulae, $R^1$ is $C_1$-$C_{15}$ alkyl, $L^1$, $L^2$, $L^3$, $L^4$, $Y^1$, $Y^2$, $Y^3$, $Y^4$, $Y^5$ and $Y^6$ are each independently a hydrogen atom or a fluorine atom, and $X^1$ is a fluorine atom or —$OCF_3$.

7. The liquid crystal composition of claim 1, which comprises at least one compound selected from the group consisting of compounds respectively represented by formulae (1-17)-(1-32):

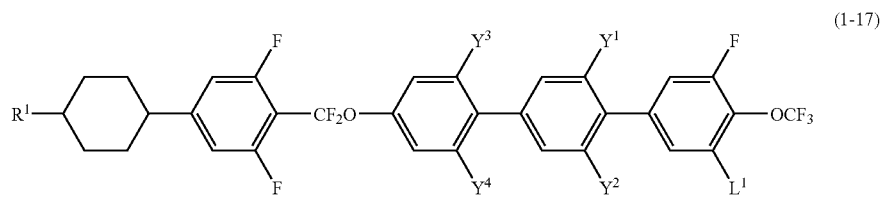

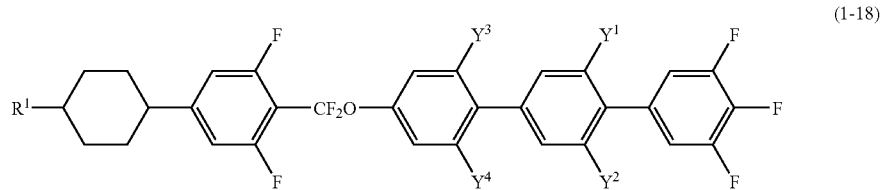

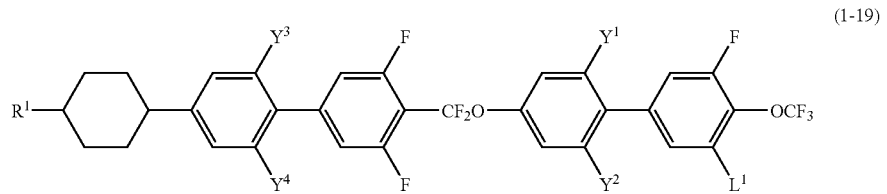

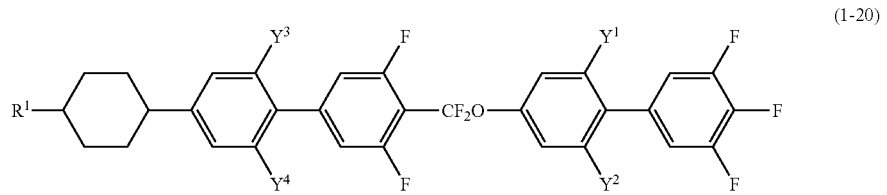

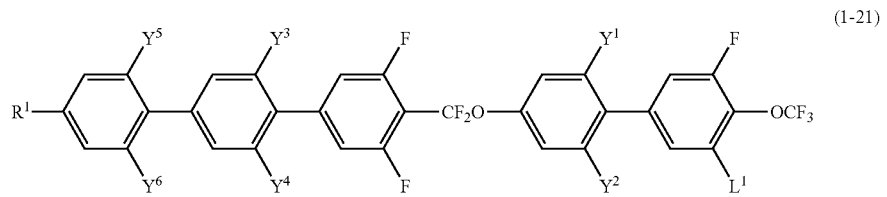

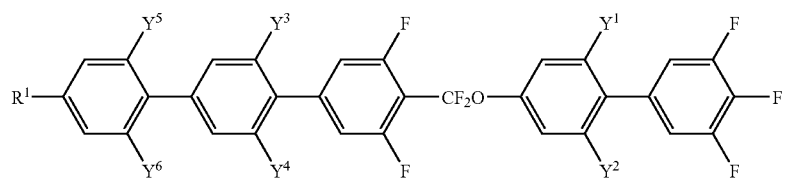
(1-22)
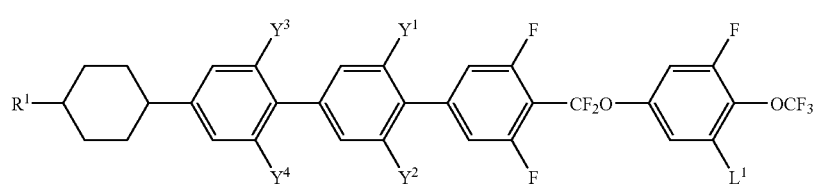
(1-23)
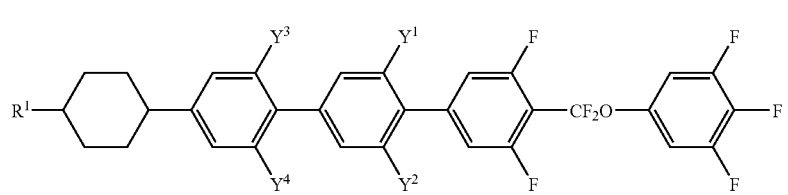
(1-24)
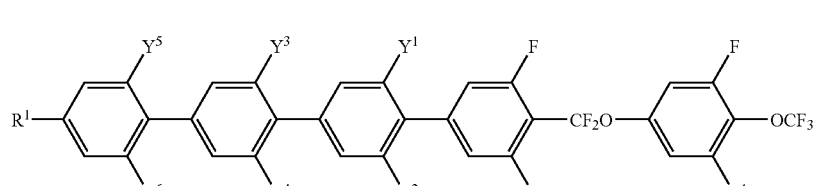
(1-25)
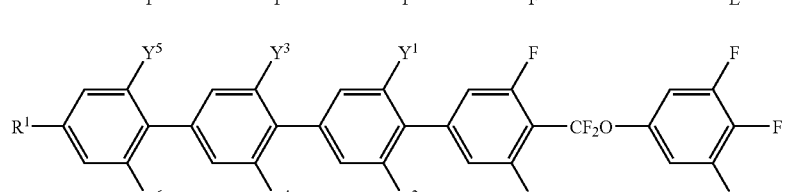
(1-26)
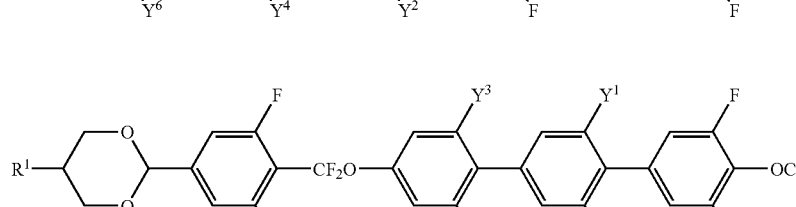
(1-27)
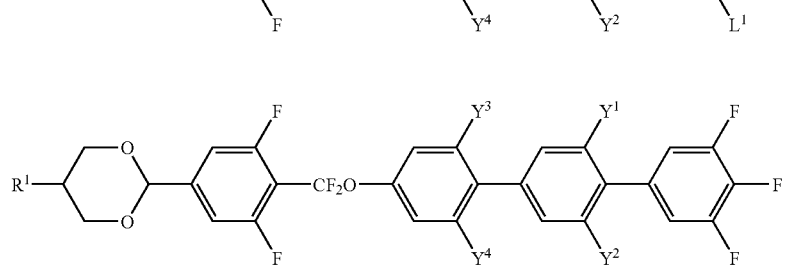
(1-28)
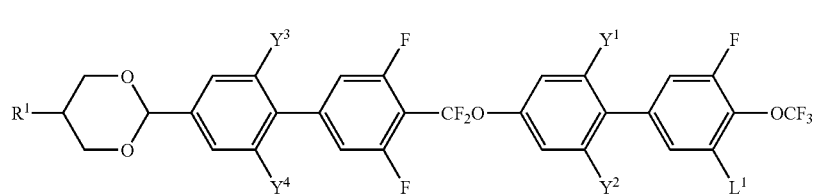
(1-29)

-continued

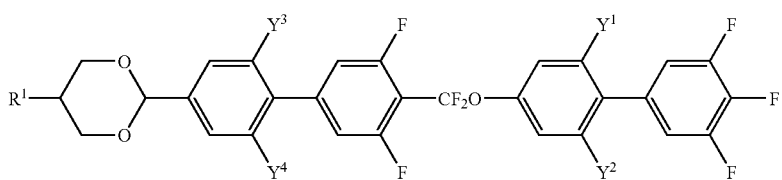
(1-30)

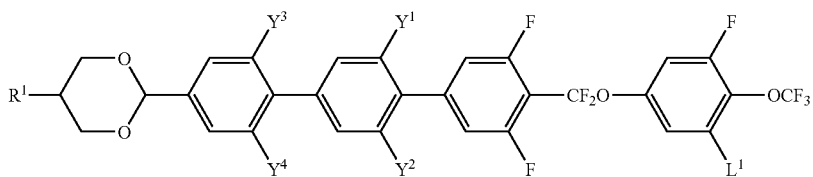
(1-31)

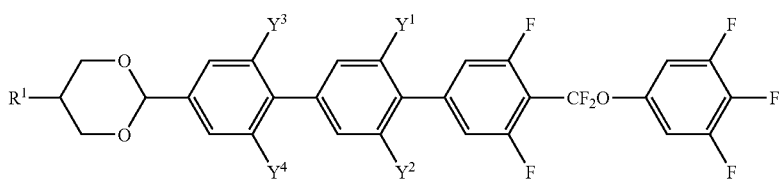
(1-32)

wherein in these formulae, $R^1$ is $C_1$-$C_{15}$ alkyl, and $L^1$, $Y^1$, $Y^2$, $Y^3$, $Y^4$, $Y^5$ and $Y^6$ are each independently a hydrogen atom or a fluorine atom.

8. The liquid crystal composition of claim 1, further comprising at least one compound selected from the group consisting of compounds respectively represented by formulae (2), (3) and (4):

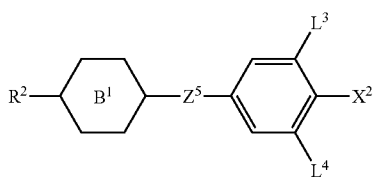
(2)

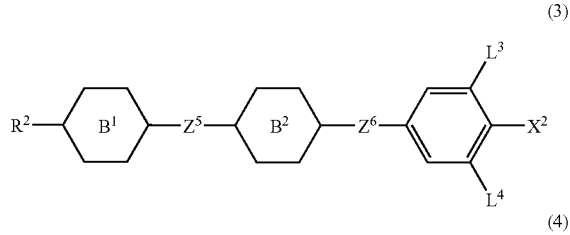
(3)

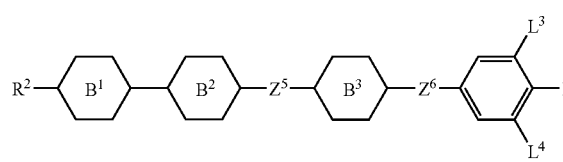
(4)

wherein in these formulae, $R^2$ is $C_1$-$C_{10}$ alkyl, $C_2$-$C_{10}$ alkenyl or $C_2$-$C_{10}$ alkynyl, wherein arbitrary hydrogen atom of $R^2$ may be replaced by a fluorine atom and arbitrary —CH$_2$— of $R^2$ may be replaced by —O—; $X^2$ is a fluorine atom, a chlorine atom, —SF$_5$, —OCF$_3$, —OCHF$_2$ or —CF$_3$; the rings $B^1$, $B^2$, $B^3$ and $B^4$ are each independently 1,4-cyclohexylene, 1,3-dioxan-2,5-diyl, pyrimidin-2,5-diyl, tetrahydropyran-2,5-diyl, piperidin-1,4-diyl, 1,4-phenylene, naphthalen-2,6-diyl, 1,4-phenylene with arbitrary hydrogen atom being replaced by a fluorine atom or a chlorine atom, or naphthalen-2,6-diyl with arbitrary hydrogen atom being replaced by a fluorine atom or a chlorine atom; $Z^5$ and $Z^6$ are each independently —COO—, —CF$_2$O—, —C≡C— or a single bond; $L^3$ and $L^4$ are each independently a hydrogen atom or a fluorine atom.

9. The liquid crystal composition of claim 1, further comprising at least one compound selected from the group consisting of compounds represented by formula (5):

(5)

$$R^3-\overset{}{C^1}-\left(\overset{}{C^2}\right)_p-Z^8-\left(\overset{}{C^3}\right)_q-\overset{L^5}{\underset{L^6}{\bigcirc}}-X^3$$

wherein $R^3$ is $C_1$-$C_{10}$ alkyl or $C_2$-$C_{10}$ alkenyl, wherein arbitrary hydrogen atom of $R^3$ may be replaced by a fluorine atom and arbitrary —CH$_2$— of $R^3$ may be replaced by —O—; $X^3$ is —C≡N or —C≡C—C≡N; the rings $C^1$, $C^2$ and $C^3$ are each independently 1,4-cyclohexylene, 1,4-phenylene, naphthalen-2,6-diyl, 1,3-dioxan-2,5-diyl, tetrahydropyran-2,5-diyl, pyrimidin-2,5-diyl, 1,4-phenylene with arbitrary hydrogen atom being replaced by a fluorine atom, or naphthalen-2,6-diyl with arbitrary hydrogen atom being replaced by a fluorine atom; $Z^8$ is —(CH$_2$)$_2$—, —COO—, —CF$_2$O—, —OCF$_2$—, —C≡C—, —CH$_2$O— or a single bond; $L^5$ and $L^6$ are each independently a hydrogen atom or a fluorine atom; p is 1 or 2, q is 0 or 1, and p+q=0, 1 or 2.

10. The liquid crystal composition of claim 1, further comprising at least one compound selected from the group consisting of compounds respectively represented by formulae (6), (7) and (8):

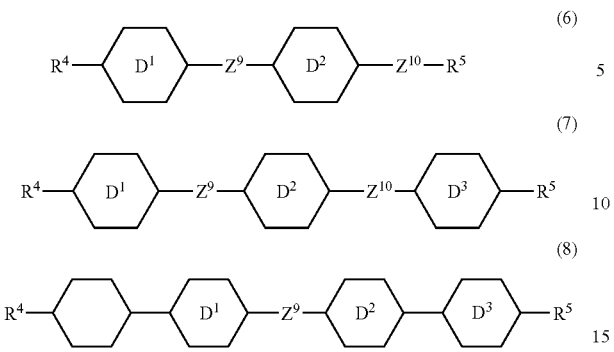

(6)

(7)

(8)

wherein in these formulae, $R^4$ and $R^5$ are each independently $C_1$-$C_{10}$ alkyl or $C_2$-$C_{10}$ alkenyl, wherein arbitrary hydrogen atom of $R^4$ and $R^5$ may be replaced by a fluorine atom and arbitrary —$CH_2$— of $R^4$ and $R^5$ may be replaced by —O—; the rings $D^1$, $D^2$ and $D^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; $Z^9$ and $Z^{10}$ are each independently —C≡C—, —COO—, —($CH_2$)$_2$—, —CH=CH— or a single bond.

11. The liquid crystal composition of claim 8, further comprising at least one compound selected from the group consisting of compounds represented by formula (5):

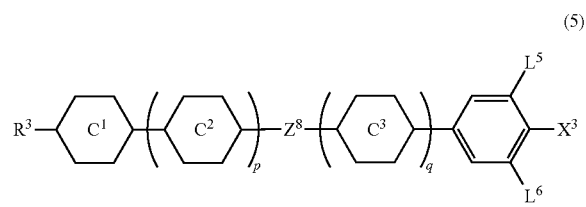

(5)

wherein $R^3$ is $C_1$-$C_{10}$ alkyl or $C_2$-$C_{10}$ alkenyl, wherein arbitrary hydrogen atom of $R^3$ may be replaced by a fluorine atom and arbitrary —$CH_2$— of $R^3$ may be replaced by —O—; $X^3$ is —C≡N or —C≡C—C≡N; the rings $C^1$, $C^2$ and $C^3$ are each independently 1,4-cyclohexylene, 1,4-phenylene, naphthalen-2,6-diyl, 1,3-dioxan-2,5-diyl, tetrahydropyran-2,5-diyl, pyrimidin-2,5-diyl, 1,4-phenylene with arbitrary hydrogen atom being replaced by a fluorine atom, or naphthalen-2,6-diyl with arbitrary hydrogen atom being replaced by a fluorine atom; $Z^8$ is —($CH_2$)$_2$—, —COO—, —$CF_2$O—, —$OCF_2$—, —C≡C—, —$CH_2$O— or a single bond; $L^5$ and $L^6$ are each independently a hydrogen atom or a fluorine atom; p is 1 or 2, q is 0 or 1, and p+q=0, 1 or 2.

12. The liquid crystal composition of claim 8, further comprising at least one compound selected from the group consisting of compounds respectively represented by formulae (6), (7) and (8):

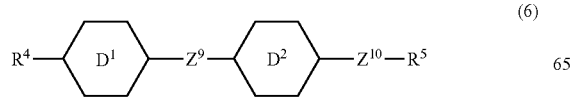

(6)

-continued

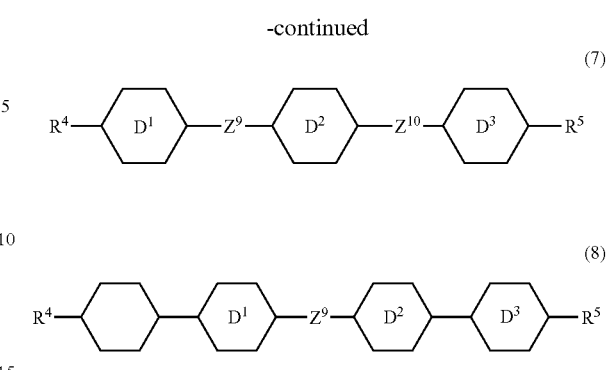

(7)

(8)

wherein in these formulae, $R^4$ and $R^5$ are each independently $C_1$-$C_{10}$ alkyl or $C_2$-$C_{10}$ alkenyl, wherein arbitrary hydrogen atom of $R^4$ and $R^5$ may be replaced by a fluorine atom and arbitrary —$CH_2$— of $R^4$ and $R^5$ may be replaced by —O—; the rings $D^1$, $D^2$ and $D^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; $Z^9$ and $Z^{10}$ are each independently —C≡C—, —COO—, —($CH_2$)$_2$—, —CH=CH— or a single bond.

13. The liquid crystal composition of claim 1, further comprising at least one antioxidant, at least one ultraviolet absorbent, or at least one antioxidant and at least one ultraviolet absorbent.

14. The liquid crystal composition of claim 1, which comprises 1-40 wt % of the chiral dopant relative to a total weight thereof.

15. The liquid crystal composition of claim 1, which comprises 5-15 wt % of the chiral dopant relative to a total weight thereof.

16. The liquid crystal composition of claim 14, which exhibits a chiral nematic phase at any temperature in a range of 70° C. to −20° C. and has a pitch of 700 nm or less at a temperature in at least a part of the range of 70° C. to −20° C.

17. The liquid crystal composition of claim 14, wherein the chiral dopant comprises one or more of compounds respectively represented by formulae (K1)-(K5):

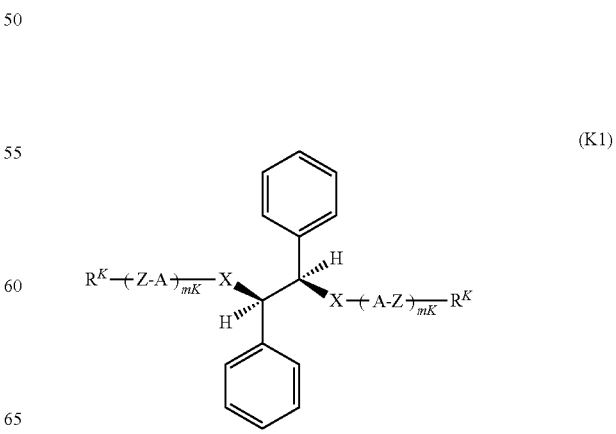

(K1)

-continued (K2)
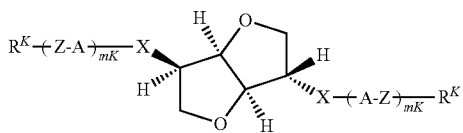

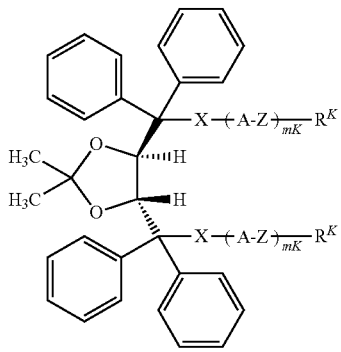

(K3)

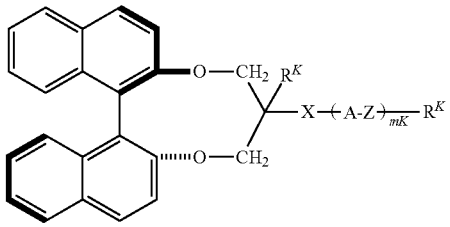
(K5)

(K4)
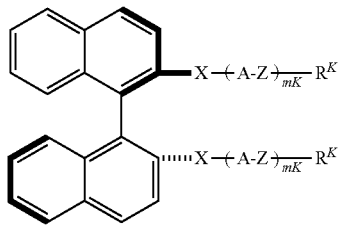

wherein in the formulae (K1)-(K5), each $R^K$ is independently a hydrogen atom, a halogen atom, —C≡N, —N=C=O, —N=C=S, or $C_1$-$C_{20}$ alkyl wherein arbitrary —$CH_2$— may be replaced by —O—, —S—, —COO—, —OCO—, —CH=CH—, —CF=CF— or —C≡C— and arbitrary hydrogen atom may be replaced by a halogen atom; each A is independently an aromatic or non-aromatic 3- to 8-membered ring, or a fused ring of 9 or more carbon atoms, wherein arbitrary hydrogen atom may be replaced by a halogen atom, or alkyl or haloalkyl of 1-3 carbon atoms, —$CH_2$— may be replaced by —O—, —S— or —NH—, and —CH= may be replaced by —N=; each Z is independently a single bond, $C_1$-$C_8$ alkylene wherein arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom; X is a single bond, —COO—, —OCO—, —$CH_2$O—, —O$CH_2$—, —$CF_2$O—, —OC$F_2$— or —$CH_2CH_2$—; and mK is an integer of 1-4.

18. The liquid crystal composition of claim 14, wherein the chiral dopant comprises one or more of compounds respectively represented by formulae (K2-1) -(K2-8) and (K5-1)-(K5-3):

(K2-1)
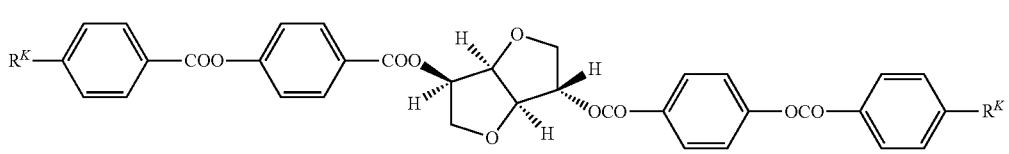

(K2-2)
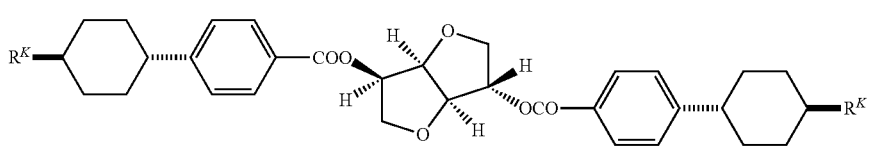

(K2-3)
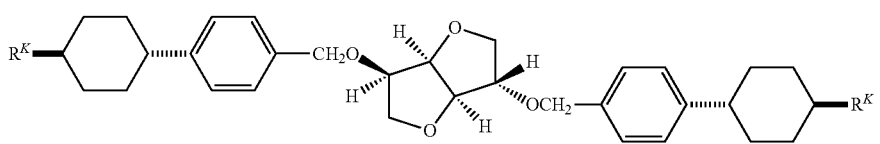

(K2-4)
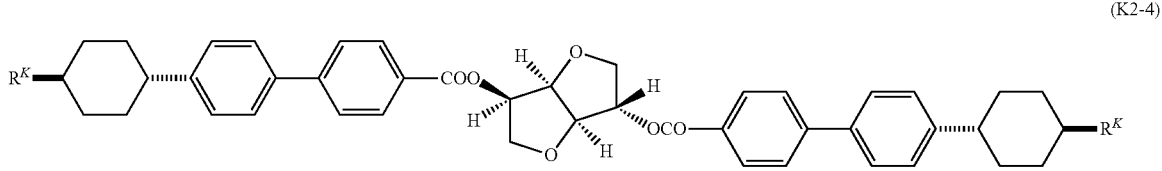

-continued

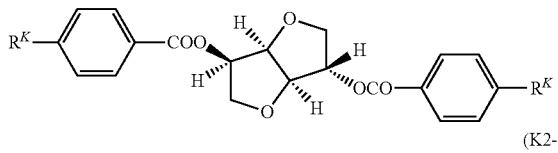
(K2-5)

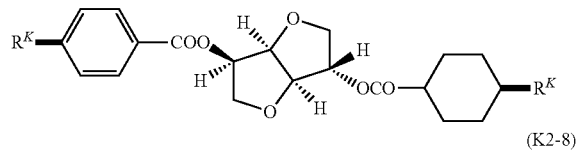
(K2-6)

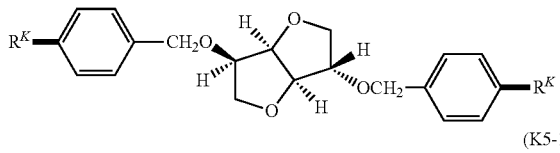
(K2-7)

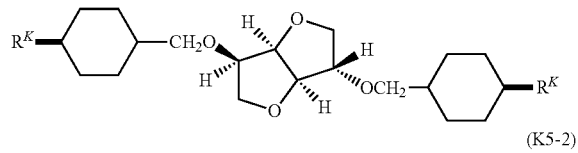
(K2-8)

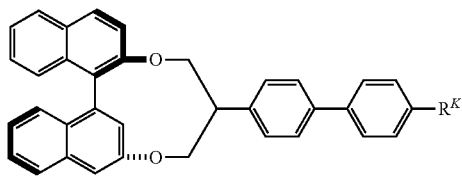
(K5-1)

(K5-2)

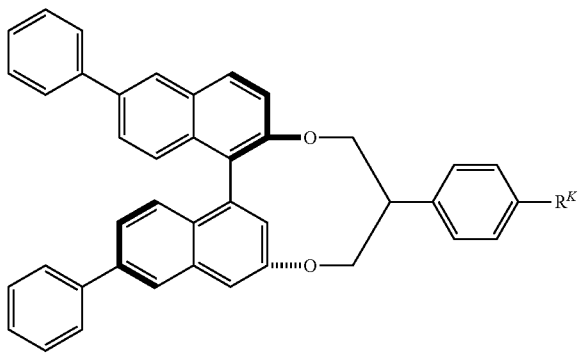
(K5-3)

wherein each $R^K$ is independently $C_3$-$C_{10}$ alkyl wherein the —$CH_2$— directly bonded to a ring may be replaced by —O— and arbitrary —$CH_2$— may be replaced by —CH═CH—.

19. A mixture comprising the liquid crystal composition of claim 1, and a polymerizable monomer.

20. The mixture of claim 19, wherein the polymerizable monomer is a photo-polymerizable monomer or a thermo-polymerizable monomer.

21. A polymer/liquid crystal composite that is obtained through polymerization of the mixture of claim 19 and is used in a device driven in an optically isotropic liquid crystal phase.

22. A polymer/liquid crystal composite, which is obtained through polymerization of the mixture of claim 19 in an isotropic phase or in an optically isotropic liquid crystal phase, and is used in a device driven in an optically isotropic liquid crystal phase.

23. The polymer/liquid crystal composite of claim 21, wherein the polymer has mesogenic moieties.

24. The polymer/liquid crystal composite of claim 21, wherein the polymer has a crosslinked structure.

25. The polymer/liquid crystal composite of claim 21, wherein a weight percentage of the liquid crystal composition is 60-99 wt % and a weight percentage of the polymer is 1-40 wt %.

26. An optical device, comprising a pair of substrates, electrodes disposed on a surface of one or both of the substrates, a liquid crystal medium disposed between the substrates, and electric field application means for applying an electric field to the liquid crystal medium via the electrodes, wherein the liquid crystal medium is the liquid crystal composition of claim 1.

27. An optical device, comprising a pair of substrates, electrodes disposed on a surface of one or both of the substrates, a liquid crystal medium disposed between the substrates, and electric field application means for applying an electric field to the liquid crystal medium via the electrodes, wherein the liquid crystal medium is the polymer/liquid crystal composite of claim 21.

28. An optical device, comprising a pair of substrates with at least one thereof being transparent and one or both thereof disposed with electrodes thereon, a liquid crystal medium disposed between the substrates, a polarizer disposed at an outer side of the substrates, and electric field application means for applying an electric field to the liquid crystal medium via the electrodes, wherein the liquid crystal medium is the liquid crystal composition of claim 1.

29. An optical device, comprising a pair of substrates with at least one thereof being transparent and one or both thereof disposed with electrodes thereon, a liquid crystal medium disposed between the substrates, a polarizer disposed at an outer side of the substrates, and electric field application means for applying an electric field to the liquid crystal medium via the electrodes, wherein the liquid crystal medium is the polymer/liquid crystal composite of claim 21.

30. The optical device of claim 28, wherein on at least one of the substrates, the electrodes are constructed in a manner such that the electric field is applied in at least two directions.

31. The optical device of claim 29, wherein on at least one of the substrates, the electrodes are constructed in a manner such that the electric field is applied in at least two directions.

32. The optical device of claim 28, wherein the substrates are disposed parallel to each other and on one or both of the substrates, the electrodes are constructed in a manner such that the electric field is applied in at least two directions.

33. The optical device of claim 29, wherein the substrates are disposed parallel to each other and on one or both of the substrates, the electrodes are constructed in a manner such that the electric field is applied in at least two directions.

34. The optical device of claim 26, wherein the electrodes are disposed in a matrix form to form pixel electrodes, and each pixel has an active device that is a thin film transistor (TFT).

35. The optical device of claim 27, wherein the electrodes are disposed in a matrix form to form pixel electrodes, and each pixel has an active device that is a thin film transistor (TFT).

* * * * *